United States Patent
Robin et al.

(10) Patent No.: US 11,679,291 B2
(45) Date of Patent: Jun. 20, 2023

(54) COMPOSITIONS AND USES OF Z-1- CHLORO-2,3,3,3-TETRAFLUOROPROP-1-ENE

(71) Applicant: THE CHEMOURS COMPANY FC, LLC, Wilmington, DE (US)

(72) Inventors: Mark L. Robin, Middletown, DE (US); Barbara Haviland Minor, Elkton, MD (US); Konstantinos Kontomaris, Wilmington, DE (US); Ernest Byron Wysong, Chadds Ford, PA (US); Jeffrey B. Sowder, Clayton, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 221 days.

(21) Appl. No.: 16/639,171

(22) PCT Filed: Aug. 17, 2018

(86) PCT No.: PCT/US2018/000345
§ 371 (c)(1),
(2) Date: Feb. 14, 2020

(87) PCT Pub. No.: WO2019/036049
PCT Pub. Date: Feb. 21, 2019

(65) Prior Publication Data
US 2020/0230454 A1 Jul. 23, 2020

Related U.S. Application Data

(60) Provisional application No. 62/547,518, filed on Aug. 18, 2017.

(51) Int. Cl.
| | | |
|---|---|---|
| A62D 1/00 | (2006.01) | |
| C08J 9/14 | (2006.01) | |
| C09K 5/04 | (2006.01) | |
| C09K 3/30 | (2006.01) | |
| A62D 1/02 | (2006.01) | |

(52) U.S. Cl.
CPC ......... *A62D 1/0057* (2013.01); *A62D 1/0071* (2013.01); *C08J 9/146* (2013.01); *C08J 2201/03* (2013.01); *C08J 2203/162* (2013.01); *C08J 2203/182* (2013.01); *C08J 2375/04* (2013.01); *C09K 2205/126* (2013.01)

(58) Field of Classification Search
None
See application file for complete search history.

(56) References Cited

U.S. PATENT DOCUMENTS

| | | | |
|---|---|---|---|
| 2,834,748 A | 5/1958 | Bailey et al. | |
| 2,846,458 A | 8/1958 | Haluska | |
| 2,917,480 A | 12/1959 | Bailey et al. | |
| 6,516,837 B2 | 2/2003 | Thomas et al. | |
| 6,589,355 B1 | 7/2003 | Thomas et al. | |
| 7,428,816 B2 | 9/2008 | Singh et al. | |
| 2010/0051853 A1 | 3/2010 | Rao et al. | |
| 2011/0037016 A1 | 2/2011 | Singh et al. | |
| 2013/0292599 A1* | 11/2013 | Robin | C09K 5/045 252/570 |
| 2014/0305667 A1* | 10/2014 | Robin | H01B 3/56 252/364 |
| 2016/0312095 A1 | 10/2016 | Schultz et al. | |
| 2018/0044567 A1* | 2/2018 | Tasaka | C10M 107/02 |
| 2018/0318623 A1* | 11/2018 | Richard | A62C 2/00 |
| 2019/0161661 A1* | 5/2019 | Tasaka | C09K 5/044 |

FOREIGN PATENT DOCUMENTS

| | | | |
|---|---|---|---|
| CN | 104449580 | * | 3/2015 |
| EP | 3492547 | | 6/2019 |
| JP | 2013506731 A | | 2/2013 |
| JP | 2015/105342 | | 6/2015 |
| JP | 2017218508 A | | 12/2017 |
| JP | 2018153463 A | | 10/2018 |
| WO | 2016022141 A1 | | 2/2016 |
| WO | 2016/171256 A1 | | 10/2016 |
| WO | 2017/002925 A1 | | 1/2017 |
| WO | 2018/208832 A1 | | 11/2018 |

OTHER PUBLICATIONS

EP Office Action in European Appln. No. 18797202.1, dated Feb. 10, 2021, 6 pages.
Null, "Vapor-Liquid Equilibrium" Phase Equilibrium in Process Design, Wiley-Interscience Publisher, 1970, pp. 124-126.
Krantz et al., "Anesthesia. XLI. The Anesthetic Properties of Certain Fluorinated Hydrocarbons and Ethers," Anesthesiology, 1953, 14(5):466-472.
PCT International Preliminary Report on Patentability in International Appln. No. PCT/US2018/000345, dated Feb. 18, 2020, 8 pages.
PCT International Search Report and Written Opinion in International Appln. No. PCT/US2018/000345, dated Feb. 5, 2019, 10 pages.
Reid et al., "Fluid Phase Equilibria in Multicomponent Systems," The Properties of Gases and Liquids, 4th edition, published by McGraw Hill, pp. 241-387.
Walas, "Activity Coefficients," Phase Equilibria in Chemical Engineering, published by Butterworth Publishers, 1985, pp. 165-244.

* cited by examiner

Primary Examiner — Tanisha Diggs

(57) ABSTRACT

Disclosed is a mixture comprising the compound Z-1-chloro-2,3,3,3-tetrafluoroprop-1-ene and at least one additional compound selected from the group consisting of HFOs, HFCs, HFEs, CFCs, $CO_2$, olefins, organic acids, alcohols, hydrocarbons, ethers, aldehydes, ketones, and others such as methyl formate, formic acid, trans-1,2 dichloroethylene, carbon dioxide, cis-HFO-1234ze+HFO-1225yez; mixtures of these plus water; mixtures of these plus $CO_2$; mixtures of these trans 1,2-dichloroethylene (DCE); mixtures of these plus methyl formate; mixtures with cis-HFO-1234ze+$CO_2$; mixtures with cis-HFO-1234ze+HFO-1225yez+$CO_2$; mixtures with cis-HFO-1234ze+HFC-245fa; and azeotrope or azeotrope-like compositions. Also disclosed are methods of using the compositions as blowing agents, solvents, heat transfer compositions, aerosol propellant compositions, fire extinguishing and suppressant compositions.

25 Claims, 10 Drawing Sheets

COMPOSITIONS AND USES OF Z-1-CHLORO-2,3,3,3-TETRAFLUOROPROP-1-ENE

CROSS-REFERENCE TO RELATED APPLICATIONS

This application represents a national filing under 35 U.S.C. 371 of International Application No. PCT/US2018/000345 filed Aug. 17, 2018, and claims priority of U.S. Provisional Application No. 62/547,518 filed Aug. 18, 2017.

FIELD OF THE DISCLOSURE

This disclosure relates to compositions, methods and systems having utility in numerous applications, and in particular, uses for compositions containing the compound Z-1-chloro-2,3,3,3-tetrafluoroprop-1-ene (Z-HCFO-1224yd).

BACKGROUND

Many industries have been working for the past few decades to find replacements for the ozone depleting chlorofluorocarbons (CFCs) and hydrochlorofluorocarbons (HCFCs). The CFCs and HCFCs have been employed in a wide range of applications, including their use as aerosol propellants, refrigerants, cleaning agents, expansion agents for thermoplastic and thermoset foams, heat transfer media, gaseous dielectrics, fire extinguishing and suppression agents, power cycle working fluids, polymerization media, particulate removal fluids, carrier fluids, buffing abrasive agents, and displacement drying agents. In the search for replacements for these versatile compounds, many industries have turned to the use of hydrofluorocarbons (HFCs).

HFCs do not contribute to the destruction of stratospheric ozone, but are of concern due to their contribution to the "greenhouse effect," i.e., they contribute to global warming. As a result, HFCs have come under scrutiny and their widespread use may be limited in the future. Thus, there is a need for compositions that do not contribute to the destruction of stratospheric ozone and also have low global warming potentials (GWPs).

SUMMARY

Provided herein are compositions, methods and systems having utility in numerous applications, and in particular, uses for compositions containing the compound Z-1-chloro-2,3,3,3-tetrafluoroprop-1-ene (Z-HCFO-1224yd), which has the following structure:

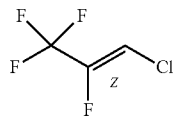

Embodiments of the present invention comprise the compound Z-HCFO-1224yd, either alone or in combination with one or more other compounds as described in detail herein below. Mixtures containing the compound Z-HCFO-1224yd can be azeotropic, azeotrope-like or non-azeotropic (zeotropic).

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

DETAILED DESCRIPTION

Figure 1:
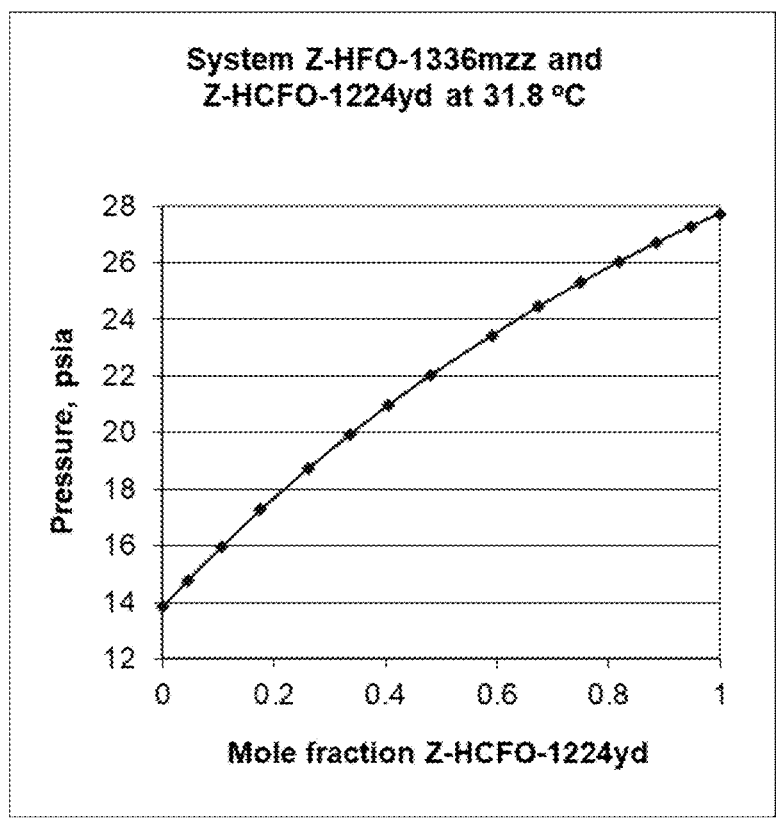
FIG. 1 shows the vapor pressure measured versus the composition in the PTx sample cell for the binary system of Z-1,1,1,4,4,4-hexafluoro-2-butene (Z-HFO-1336mzz) and Z-1-chloro-2,3,3,3-tetrafluoropropene (Z-HCFO-1224yd). The experimental data points are shown as solid points and the solid line is drawn from data calculated using the NRTL equation.

Hydrochlorofluoroolefins have low global warming potentials and are thought to not contribute to the destruction of stratospheric ozone. One such hydrochlorofluoroolefin is 1-chloro-2,3,3,3-tetrafluoroprop-1-ene. 1-chloro-2,3,3,3-tetrafluoroprop-1-ene exists as two different stereoisomers, each of which has a different boiling point and therefore can perform differently in different applications.

Provided herein are compositions comprising the hydrochlorofluoroolefin 1-chloro-2,3,3,3-tetrafluoroprop-1-ene ($CF_3CF$=CHCl, HCFO-1224yd), particularly compositions comprising the Z-isomer Z-HCFO-1224yd.

In some embodiments, the compositions comprise the compound Z-HCFO-1224yd and at least one additional fluoroalkene, such as a fluoroalkene containing from 2 to 6, such as from 3 to 5 carbon atoms, or 3 to 4 carbon atoms. In some embodiments, the fluoroalkene comprises at least one carbon-carbon double bond. In some embodiments, the fluoroalkene comprises three carbon atoms and at least one carbon-carbon double bond. The fluoroalkene compounds of described herein are sometimes referred to herein as hydrofluoroolefins or "HFOs" if they contain at least one hydrogen.

In some embodiments, the compositions comprise Z-HCFO-1224yd and at least one additional compound such as an HFO, HFC, hydrofluoroether (HFE), hydrocarbon, ether, aldehyde, ketone, and others such as methyl formate, formic acid, trans-1,2-dichloroethylene (DCE), carbon dioxide ($CO_2$), cis-HFO-1234ze+HFO-1225yez; mixtures of these plus water; mixtures of these plus $CO_2$; mixtures of these plus DCE; mixtures of these plus methyl formate; mixtures with cis-HFO-1234ze+$CO_2$; mixtures with cis-HFO-1234ze+HFO-1225yez+$CO_2$; and mixtures with cis-HFO-1234ze+HFC-245fa. In such compositions, the amount of the compound Z-HCFO-1224yd can vary, including in all cases constituting the balance of the composition after all other components in composition are accounted for.

In some embodiments, the Z-HCFO-1224yd comprises between about 1 wt % to about 99 wt %; about 30 wt % to about 99 wt %; about 50 wt % to about 99 wt %; about 75 wt % to about 99 wt %; about 85 wt % to about 99 wt %; about 20 wt % to about 80 wt %; about 90 wt % to about 99 wt %; about 95 wt % to about 99 wt %; about 1 wt % to about 20 wt %; about 1 wt % to about 40 wt %; about 1 wt % to about 50 wt %; about 5 wt % to about 20 wt %; about 5 wt % to about 40 wt %; about 5 wt % to about 60 wt %; about 10 wt % to about 80 wt %; about 10 wt % to about 90 wt %; about 20 wt % to about 80 wt %; or about 20 wt % to about 90 wt % of the composition.

The compositions provided herein are environmentally acceptable and do not to contribute to the depletion of the earth's stratospheric ozone layer. In some embodiments, the compounds and compositions provided herein have no substantial ozone depletion potential (ODP), for example, an ODP of not greater than about 0.5, such as an ODP of not greater than about 0.25, or an ODP of not greater than about 0.1. In some embodiments, the compounds and compositions provided herein have a global warming potential (GWP) of not greater than about 150, such as a GWP of not greater than about 50.

As used herein, ODP is defined in the "Scientific Assessment of Ozone Depletion, 2002," a report of the World Meteorological association, incorporated here by reference. As used herein, GWP is defined relative to that of carbon dioxide and over a 100 year time horizon, and defined in the same reference as for the ODP mentioned above.

In some embodiments, Z-HCFO-1224yd is mixed with one or more compounds to form a blend composition. In some embodiments, Z-HCFO-1224yd forms a blend composition with one or more of an HFO, HFE, hydrocarbon, alcohol, ether, aldehyde, ketone, or other compound, such as water, methyl formate, ethyl formate, formic acid, trans-1,2-dichloroethylene, $CO_2$, and others. In some embodiments, the other compound or compounds comprise between about 1% and about 99% by weight of the composition. For example, about 1% to about 90%, about 1% to about 80%, about 1% to about 70%, about 1% to about 60%, about 1% to about 50%, about 1% to about 40%, about 1% to about 30%, about 1% to about 20%, about 1% to about 10%, about 1% to about 5%, about 5% to about 99%, about 5% to about 95%, about 5% to about 75%, about 5% to about 50%, about 5% to about 25%, about 10% to about 99%, about 10% to about 90%, about 10% to about 75%, about 10% to about 50%, about 10% to about 25%, about 25% to about 99%, about 25% to about 90%, about 25% to about 75%, about 25% to about 50%, about 40% to about 60%, about 45% to about 55%, about 50% to about 99%, about 50% to about 75%, about 60% to about 99%, about 60% to about 75%, or about 75% to about 99% by weight of the composition.

In some embodiments, Z-HCFO-1224yd forms a blend composition with the compounds shown in Table 1 below (with all percentages being in percent by weight and being understood to be proceeded by the word "about").

TABLE 1

| | Blend Composition | | |
| --- | --- | --- | --- |
| Compound Mixed with Z-HCFO-1224yd | Preferred Ranges wt % | More Preferred Ranges wt % | Most Preferred Ranges wt % |
| HFOs | | | |
| HFO-1234ze (E&Z) | 1 to 99 | 5 to 95 | 10 to 90 |
| HFO-1234yc | 1 to 99 | 5 to 95 | 10 to 90 |
| HFO-1234yf | 1 to 99 | 5 to 95 | 10 to 90 |
| HFO-1225ye (E&Z) | 1 to 99 | 5 to 95 | 10 to 90 |
| HFO-1225yc | 1 to 99 | 5 to 95 | 10 to 90 |
| HFO-1225zc | 1 to 99 | 5 to 95 | 10 to 90 |
| HFO-1216 | 1 to 99 | 5 to 95 | 10 to 90 |
| HFO-1233zd (E&Z) | 1 to 99 | 5 to 95 | 10 to 90 |
| HFO-1233xf | 1 to 99 | 5 to 95 | 10 to 90 |
| HFO-1243zf | 1 to 99 | 5 to 95 | 10 to 90 |
| HFO-1252zf | 1 to 99 | 5 to 95 | 10 to 90 |
| HFO-1261yf | 1 to 99 | 5 to 95 | 10 to 90 |
| HFO-1270 | 1 to 99 | 5 to 95 | 10 to 90 |
| HFO-1336mzz (E) | 1 to 99 | 5 to 95 | 10 to 90 |
| HFO-1336mzz (Z) | 1 to 99 | 5 to 95 | 10 to 90 |
| HFO-1336mcyf | 1 to 99 | 5 to 95 | 10 to 90 |

TABLE 1-continued

Blend Composition

| Compound Mixed with Z-HCFO-1224yd | Preferred Ranges wt % | More Preferred Ranges wt % | Most Preferred Ranges wt % |
|---|---|---|---|
| HFO-1336ze (E) | 1 to 99 | 5 to 95 | 10 to 90 |
| HFO-1336ze (Z) | 1 to 99 | 5 to 95 | 10 to 90 |
| HFO-1354myc | 1 to 99 | 5 to 95 | 10 to 90 |
| $CF_3CF{=}CHCF_2CF_3$ (HFO-1429myz, E&Z) | 1 to 99 | 5 to 95 | 10 to 90 |
| $CF_3CH{=}CHCF_2CF_3$ (HFO-1438mzz, E&Z) | 1 to 99 | 5 to 95 | 10 to 90 |
| $(CF_3)_2CFCH{=}CHF$ (HFO-1438ezy, E&Z) | 1 to 99 | 5 to 95 | 10 to 90 |
| $(C_2F_5)(CF_3)C{=}CH_2$ | 1 to 99 | 5 to 95 | 10 to 90 |
| $(CF_3)_2CFCH{=}CF_2$ | 1 to 99 | 5 to 95 | 10 to 90 |
| $(CF_3)_2CFCF{=}CHF$ (E&Z) | 1 to 99 | 5 to 95 | 10 to 90 |
| HFCs | | | |
| HFC-245fa | 1 to 99 | 5 to 95 | 10 to 90 |
| HFC-245cb | 1 to 99 | 5 to 95 | 10 to 90 |
| HFC-245ca | 1 to 99 | 5 to 95 | 10 to 90 |
| HFC-245eb | 1 to 99 | 5 to 95 | 10 to 90 |
| HFC-227ea | 1 to 99 | 5 to 95 | 10 to 90 |
| HFC-254eb | 1 to 99 | 5 to 95 | 10 to 90 |
| HFC-254fb | 1 to 99 | 5 to 95 | 10 to 90 |
| HFC-263fb | 1 to 99 | 5 to 95 | 10 to 90 |
| HFC-236ea | 1 to 99 | 5 to 95 | 10 to 90 |
| HFC-236fa | 1 to 99 | 5 to 95 | 10 to 90 |
| HFC-281ea | 1 to 99 | 5 to 95 | 10 to 90 |
| HFC-134 | 1 to 99 | 5 to 95 | 10 to 90 |
| HFC-134a | 1 to 99 | 5 to 95 | 10 to 90 |
| HFC-152 | 1 to 99 | 5 to 95 | 10 to 90 |
| HFC-152a | 1 to 99 | 5 to 95 | 10 to 90 |
| HFC-32 | 1 to 99 | 5 to 95 | 10 to 90 |
| HFC-125 | 1 to 99 | 5 to 95 | 10 to 90 |
| HFC-143 | 1 to 99 | 5 to 95 | 10 to 90 |
| HFC-143a | 1 to 99 | 5 to 95 | 10 to 90 |
| HFC-365mfc | 1 to 99 | 5 to 95 | 10 to 90 |
| HFC-161 | 1 to 99 | 5 to 95 | 10 to 90 |
| HFC-43-10mee | 1 to 99 | 5 to 95 | 10 to 90 |
| HFC-23 | 1 to 99 | 5 to 95 | 10 to 90 |
| HFC-41 | 1 to 99 | 5 to 95 | 10 to 90 |
| HFEs | | | |
| $CHF_2{-}O{-}CHF_2$ | 1 to 99 | 5 to 95 | 10 to 90 |
| $CHF_2{-}O{-}CH_2F$ | 1 to 99 | 5 to 95 | 10 to 90 |
| $CH_2F{-}O{-}CH_2F$ | 1 to 99 | 5 to 95 | 10 to 90 |
| $CH_2F{-}O{-}CH_3$ | 1 to 99 | 5 to 95 | 10 to 90 |
| cyclo-$CF_2{-}CH_2{-}CF_2{-}O$ | 1 to 99 | 5 to 95 | 10 to 90 |
| cyclo-$CF_2{-}CF_2{-}CH_2{-}O$ | 1 to 99 | 5 to 95 | 10 to 90 |
| $CHF_2{-}O{-}CF_2{-}CHF_2$ | 1 to 99 | 5 to 95 | 10 to 90 |
| $CF_3{-}CF_2{-}O{-}CH_2F$ | 1 to 99 | 5 to 95 | 10 to 90 |
| $CHF_2{-}O{-}CHF{-}CF_3$ | 1 to 99 | 5 to 95 | 10 to 90 |
| $CHF_2{-}O{-}CF_2{-}CHF_2$ | 1 to 99 | 5 to 95 | 10 to 90 |
| $CH_2F{-}O{-}CF_2{-}CHF_2$ | 1 to 99 | 5 to 95 | 10 to 90 |
| $CF_3{-}O{-}CF_2{-}CH_3$ | 1 to 99 | 5 to 95 | 10 to 90 |
| $CHF_2{-}CHF{-}O{-}CHF_2$ | 1 to 99 | 5 to 95 | 10 to 90 |
| $CF_3{-}O{-}CHF{-}CH_2F$ | 1 to 99 | 5 to 95 | 10 to 90 |
| $CF_3{-}CHF{-}O{-}CH_2F$ | 1 to 99 | 5 to 95 | 10 to 90 |
| $CF_3{-}O{-}CH_2{-}CHF_2$ | 1 to 99 | 5 to 95 | 10 to 90 |
| $CHF_2{-}O{-}CH_2{-}CF_3$ | 1 to 99 | 5 to 95 | 10 to 90 |
| $CH_2F{-}CF_2{-}O{-}CH_2F$ | 1 to 99 | 5 to 95 | 10 to 90 |
| $CHF_2{-}O{-}CF_2{-}CH_3$ | 1 to 99 | 5 to 95 | 10 to 90 |
| $CHF_2{-}CF_2{-}O{-}CH_3$ | 1 to 99 | 5 to 95 | 10 to 90 |
| $CH_2F{-}O{-}CHF{-}CH_2F$ | 1 to 99 | 5 to 95 | 10 to 90 |
| $CHF_2{-}CHF{-}O{-}CH_2F$ | 1 to 99 | 5 to 95 | 10 to 90 |
| $CF_3{-}O{-}CHF{-}CH_3$ | 1 to 99 | 5 to 95 | 10 to 90 |
| $CF_3{-}CHF{-}O{-}CH_3$ | 1 to 99 | 5 to 95 | 10 to 90 |
| $CHF_2{-}O{-}CH_2{-}CHF_2$ | 1 to 99 | 5 to 95 | 10 to 90 |
| $CF_3{-}O{-}CH_2{-}CH_2F$ | 1 to 99 | 5 to 95 | 10 to 90 |
| $CF_3{-}CH_2{-}O{-}CH_2F$ | 1 to 99 | 5 to 95 | 10 to 90 |
| $CF_2H{-}CF_2{-}CF_2{-}O{-}CH_3$ | 1 to 99 | 5 to 95 | 10 to 90 |
| $CF_3CF_2CF_2{-}O{-}CH_3$ (HFE-7000) | 1 to 99 | 5 to 95 | 10 to 90 |
| $C_4H_9{-}O{-}CH_3$ (HFE-7100) | 1 to 99 | 5 to 95 | 10 to 90 |
| Hydrocarbons | | | |
| methane | 1 to 99 | 5 to 95 | 10 to 90 |
| ethane | 1 to 99 | 5 to 95 | 10 to 90 |

TABLE 1-continued

| | Blend Composition | | |
|---|---|---|---|
| Compound Mixed with Z-HCFO-1224yd | Preferred Ranges wt % | More Preferred Ranges wt % | Most Preferred Ranges wt % |
| propane | 1 to 99 | 5 to 95 | 10 to 90 |
| propylene | 1 to 99 | 5 to 95 | 10 to 90 |
| butane | 1 to 99 | 5 to 95 | 10 to 90 |
| isobutane | 1 to 99 | 5 to 95 | 10 to 90 |
| n-pentane (high HFO) | 1 to 99 | 50 to 99 | 60 to 99 |
| n-pentane (high n-pentane) | 1 to 99 | 1 to 30 | 1 to 20 |
| isopentane (high HFO) | 1 to 99 | 50 to 99 | 60 to 90 |
| isopentane (high isopentane) | 1 to 99 | 1 to 30 | 1 to 20 |
| neopentane (high HFO) | 1 to 99 | 50 to 99 | 60 to 99 |
| neopentane (high neopentane) | 1 to 99 | 1 to 30 | 1 to 20 |
| cyclopentane (high HFO) | 1 to 99 | 50 to 99 | 60 to 99 |
| cyclopentane (high cyclopentane) | 1 to 99 | 1 to 30 | 1 to 20 |
| n-hexane | 1 to 99 | 5 to 95 | 10 to 90 |
| isohexane | 1 to 99 | 5 to 95 | 10 to 90 |
| heptane | 1 to 99 | 5 to 95 | 10 to 90 |
| | Alcohols | | |
| methanol | 1 to 99 | 5 to 95 | 10 to 90 |
| ethanol | 1 to 99 | 5 to 95 | 10 to 90 |
| propanol | 1 to 99 | 5 to 95 | 10 to 90 |
| isopropanol | 1 to 99 | 5 to 95 | 10 to 90 |
| | Ethers | | |
| dimethyl ether | 1 to 99 | 5 to 95 | 10 to 90 |
| methylethyl ether | 1 to 99 | 5 to 95 | 10 to 90 |
| diethyl ether | 1 to 99 | 5 to 95 | 10 to 90 |
| methylpropyl ether | 1 to 99 | 5 to 95 | 10 to 90 |
| methylisopropyl ether | 1 to 99 | 5 to 95 | 10 to 90 |
| ethylpropyl ether | 1 to 99 | 5 to 95 | 10 to 90 |
| ethylisopropyl ether | 1 to 99 | 5 to 95 | 10 to 90 |
| dipropyl ether | 1 to 99 | 5 to 95 | 10 to 90 |
| diisopropyl ether | 1 to 99 | 5 to 95 | 10 to 90 |
| dimethoxymethane | 1 to 99 | 5 to 95 | 10 to 90 |
| diethoxymethane | 1 to 99 | 5 to 95 | 10 to 90 |
| dipropoxymethane | 1 to 99 | 5 to 95 | 10 to 90 |
| dibutoxymethane | 1 to 99 | 5 to 95 | 10 to 90 |
| | Aldehydes | | |
| formaldehyde | 1 to 99 | 5 to 95 | 10 to 90 |
| acetaldehyde | 1 to 99 | 5 to 95 | 10 to 90 |
| propanal | 1 to 99 | 5 to 95 | 10 to 90 |
| butanal | 1 to 99 | 5 to 95 | 10 to 90 |
| isobutanal | 1 to 99 | 5 to 95 | 10 to 90 |
| | Ketones | | |
| Acetone | 1 to 99 | 5 to 95 | 10 to 90 |
| Methylethylketone | 1 to 99 | 5 to 95 | 10 to 90 |
| methylisobutylketone | 1 to 99 | 5 to 95 | 10 to 90 |
| perfluoroethylisopropylketone ($C_2F_5C(O)CF(CF_3)_2$) | 1 to 99 | 5 to 95 | 10 to 90 |
| | Others | | |
| water | 1 to 99 | 5 to 95 | 10 to 90 |
| oxygen | 1 ppm to 99% | 10 ppm to 95% | 100 ppm to 99% |
| ammonia | 1 to 99 | 5 to 95 | 10 to 90 |
| perfluorocyclopropane | 1 to 99 | 5 to 95 | 10 to 90 |
| fluorinated methylcyclopropanes | 1 to 99 | 5 to 95 | 10 to 90 |
| methyl formate | 1 to 99 | 5 to 95 | 10 to 90 |
| ethyl formate | 1 to 99 | 5 to 95 | 10 to 90 |
| formic acid | 1 to 99 | 5 to 95 | 10 to 90 |
| trans-1,2-dichloroethylene (t-DCE) | 1 to 99 | 5 to 95 | 10 to 90 |
| $CO_2$ | 1 to 99 | 5 to 95 | 10 to 90 |
| CFO-1112 (E&Z) | 1 to 99 | 5 to 95 | 10 to 90 |
| CFO-1112a | 1 to 99 | 5 to 95 | 10 to 90 |
| FO-1114 ($CF_2=CF_2$) | 1 to 99 | 5 to 95 | 10 to 90 |
| 1231xf $CH_2=CClCFCl_2$ | 1 to 99 | 5 to 95 | 10 to 90 |
| 1232xf $CH_2=CClCF_2Cl$ | 1 to 99 | 5 to 95 | 10 to 90 |
| HCFO-1232xf | 1 to 99 | 5 to 95 | 10 to 90 |
| HCFO-1223xd | 1 to 99 | 5 to 95 | 10 to 90 |
| HCFO-1233xf | 1 to 99 | 5 to 95 | 10 to 90 |
| HCFO-1233zd (E&Z) | 1 to 99 | 5 to 95 | 10 to 90 |
| HCFO-1224yd (E) | 1 to 99 | 5 to 95 | 10 to 90 |

TABLE 1-continued

| Blend Composition | | | |
|---|---|---|---|
| Compound Mixed with Z-HCFO-1224yd | Preferred Ranges wt % | More Preferred Ranges wt % | Most Preferred Ranges wt % |
| HCFO-1224xe | 1 to 99 | 5 to 95 | 10 to 90 |
| CFC-11 (CFCl$_3$) | 1 to 99 | 5 to 95 | 10 to 90 |
| CFC-12 (CF$_2$Cl$_2$) | 1 to 99 | 5 to 95 | 10 to 90 |
| CFC-13 (CF$_3$Cl) | 1 to 99 | 5 to 95 | 10 to 90 |
| CFC-113 | 1 to 99 | 5 to 95 | 10 to 90 |
| CFC-114 | 1 to 99 | 5 to 95 | 10 to 90 |
| CFC-114a | 1 to 99 | 5 to 95 | 10 to 90 |
| CFC-115 | 1 to 99 | 5 to 95 | 10 to 90 |
| CFC-115B1 (CF$_3$CF$_2$Br) | 1 to 99 | 5 to 95 | 10 to 90 |
| CFC-116 | 1 to 99 | 5 to 95 | 10 to 90 |
| CFC-216 | 1 to 99 | 5 to 95 | 10 to 90 |
| c-CFC-316 | 1 to 99 | 5 to 95 | 10 to 90 |
| c-CFC-318 | 1 to 99 | 5 to 95 | 10 to 90 |
| CFC-218 | 1 to 99 | 5 to 95 | 10 to 90 |
| CO-1110 (CCl$_2$=CCl$_2$) | 1 to 99 | 5 to 95 | 10 to 90 |
| CFO-1111 (CFCl=CCl$_2$) | 1 to 99 | 5 to 95 | 10 to 90 |
| HCFO-1121a (CHF=CCl$_2$) | 1 to 99 | 5 to 95 | 10 to 90 |
| HCFO-1121 (CFCl=CHCl) | 1 to 99 | 5 to 95 | 10 to 90 |
| HCFO-1131a (CH$_2$=CFCl) | 1 to 99 | 5 to 95 | 10 to 90 |
| HCFO-1131 (CHF=CHCl) | 1 to 99 | 5 to 95 | 10 to 90 |
| HFO-1132a (CF$_2$=CH$_2$) | 1 to 99 | 5 to 95 | 10 to 90 |
| HCFO-1122 (CF$_2$=CHCl) | 1 to 99 | 5 to 95 | 10 to 90 |
| HFO-1123 (CF$_2$=CHF) | 1 to 99 | 5 to 95 | 10 to 90 |
| HCFO-1113 (CF$_2$=CFCl) | 1 to 99 | 5 to 95 | 10 to 90 |
| CO-1140 (CH$_2$=CHCl) | 1 to 99 | 5 to 95 | 10 to 90 |
| HCFO-1214ya (CF$_3$CF=CCl$_2$) | 1 to 99 | 5 to 95 | 10 to 90 |
| FO-1216 (CF$_3$CF=CF$_2$) | 1 to 99 | 5 to 95 | 10 to 90 |
| FO-1318my (CF$_2$CF=CFCF$_3$) | 1 to 99 | 5 to 95 | 10 to 90 |
| Ethylene | 1 to 99 | 5 to 95 | 10 to 90 |
| HCFC-22 | 1 to 99 | 5 to 95 | 10 to 90 |
| HCFC-31 | 1 to 99 | 5 to 95 | 10 to 90 |
| HCFC-122 | 1 to 99 | 5 to 95 | 10 to 90 |
| HCFC-122a | 1 to 99 | 5 to 95 | 10 to 90 |
| HCFC-122b | 1 to 99 | 5 to 95 | 10 to 90 |
| HCFC-123 | 1 to 99 | 5 to 95 | 10 to 90 |
| HCFC-124 | 1 to 99 | 5 to 95 | 10 to 90 |
| HCFC-124a | 1 to 99 | 5 to 95 | 10 to 90 |
| HCFC-133a | 1 to 99 | 5 to 95 | 10 to 90 |
| HCFC-141b | 1 to 99 | 5 to 95 | 10 to 90 |
| HCFC-142 | 1 to 99 | 5 to 95 | 10 to 90 |
| HCFC-142a | 1 to 99 | 5 to 95 | 10 to 90 |
| HCFC-142b | 1 to 99 | 5 to 95 | 10 to 90 |
| HCFC-225ca | 1 to 99 | 5 to 95 | 10 to 90 |
| HCFC-225cb | 1 to 99 | 5 to 95 | 10 to 90 |
| HCFC-243ab | 1 to 99 | 5 to 95 | 10 to 90 |
| HCFC-243db | 1 to 99 | 5 to 95 | 10 to 90 |
| HCFC-244bb | 1 to 99 | 5 to 95 | 10 to 90 |
| 3,3,3-Trifluoropropyne | 1 to 99 | 5 to 95 | 10 to 90 |
| HCC-40 (CH$_3$Cl) | 1 to 99 | 5 to 95 | 10 to 90 |
| 2-chloropropane | 1 to 99 | 5 to 95 | 10 to 90 |
| HCC-240db | 1 to 99 | 5 to 95 | 10 to 90 |
| cis-HFO-1234ze + HFO-1225yeZ | 1 to 99 | 5 to 95 | 10 to 90 |
| 2-fluoro-3-(trifluoromethyl)oxirane | 1 to 99 | 5 to 95 | 10 to 90 |
| 2-fluoro-3-(perfluoropropan-2-yl)oxirane | 1 to 99 | 5 to 95 | 10 to 90 |
| 2,3-bis(trifluoromethyl)oxirane | 1 to 99 | 5 to 95 | 10 to 90 |
| 2-(trifluoromethyl)-3-(perfluoroethyl)oxirane | 1 to 99 | 5 to 95 | 10 to 90 |
| 2-(trifluoromethyl)-3-(perfluoropropan-2-yl)oxirane | 1 to 99 | 5 to 95 | 10 to 90 |
| 2,3-bis(perfluoropropyl)oxirane | 1 to 99 | 5 to 95 | 10 to 90 |
| 2-(perfluorobutyl)-3-(perfluoroethyl)oxirane | 1 to 99 | 5 to 95 | 10 to 90 |
| 2,3-bis(perfluorobutyl)oxirane; | 1 to 99 | 5 to 95 | 10 to 90 |
| 2-(2,2,2-trifluoroethoxy)-2-(trifluoromethyl)-3-(perfluoroethyl)oxirane | 1 to 99 | 5 to 95 | 10 to 90 |
| 2,3-dichloro-2,3-bis(trifluoromethyl)oxirane | 1 to 99 | 5 to 95 | 10 to 90 |

TABLE 1-continued

Blend Composition

| Compound Mixed with Z-HCFO-1224yd | Preferred Ranges wt % | More Preferred Ranges wt % | Most Preferred Ranges wt % |
|---|---|---|---|
| 2,2,3,3,4,4-hexafluoro-6-oxa-bicyclo[3.1.0]hexane | 1 to 99 | 5 to 95 | 10 to 90 |
| 2,2,3,3-tetrafluoro-5-oxabicyclo[2.1.0]pentane | 1 to 99 | 5 to 95 | 10 to 90 |
| 2,3-difluoro-2-(perfluoroethyl)-3-(perfluoropropyl)oxirane | 1 to 99 | 5 to 95 | 10 to 90 |
| 2,3-difluoro-2-(trifluoromethyl)-3-(perfluoropentyl)oxirane; | 1 to 99 | 5 to 95 | 10 to 90 |
| Mixtures of any of the above plus water | 1 to 99% H2O | 5 to 95% H2O | 10 to 90% H2O |
| Mixtures of any of the above plus CO2 | 1 to 99% CO2 | 5 to 95% CO2 | 10 to 90% CO2 |
| Mixtures of any of the above plus t-DCE | 1 to 99% t-DCE | 5 to 95% t-DCE | 10 to 90% t-DCE |
| Mixtures of any of the above plus methyl formate | 1 to 99% MF | 5 to 95% MF | 10 to 90% MF |
| Mixtures with cis-HFO-1234ze + CO2 | 1 to 99 | 5 to 95 | 10 to 90 |
| Mixtures with cis-HFO-1234ze + CO2 + 1225yeZ | 1 to 99 | 5 to 95 | 10 to 90 |
| Mixtures with cis-HFO-1234ze + HFC-245fa | 1 to 99 | 5 to 95 | 10 to 90 |

Blowing Agents

Also provided herein are methods and systems comprising Z-HCFO-1224yd as a blowing agent, optionally with one or more additional compounds which include, but are not limited to, other compounds which also act as blowing agents (hereinafter referred to for convenience but not by way of limitation as co-blowing agents), surfactants, polyols, catalysts, flame retardants, polymer modifiers, colorants, dyes, solubility enhancers, rheology modifiers, plasticizing agents, fillers, nucleating agents, viscosity reduction agents, vapor pressure modifiers, stabilizers, and the like. In some embodiments, the blowing agent is used for foams, such as spray foams and panel foams, and includes blends of Z-HCFO-1224yd with hydrocarbons (for example, pentanes, including cyclopentane), and with one or more of HFC-245fa, HFC-365mfc and HCFO-1233zd.

In some embodiments, when used as a blowing agent, the Z-HCFO-1224yd comprises between about 1 wt % to about 99 wt %; about 30 wt % to about 99 wt %; about 50 wt % to about 99 wt %; about 75 wt % to about 99 wt %; about 85 wt % to about 99 wt %; about 20 wt % to about 80 wt %; about 90 wt % to about 99 wt %; about 95 wt % to about 99 wt %; about 1 wt % to about 20 wt %; about 1 wt % to about 40 wt %; about 1 wt % to about 50 wt %; about 5 wt % to about 20 wt %; about 5 wt % to about 40 wt %; about 5 wt % to about 60 wt %; about 10 wt % to about 80 wt %; about 10 wt % to about 90 wt %; about 20 wt % to about 80 wt %; or about 20 wt % to about 90 wt % of the blowing agent composition. Other ranges of amounts are shown in Table 1 and described above, and those amounts are likewise applicable for this use of the composition of the invention.

In some embodiments, dispersing agents, cell stabilizers, surfactants and other additives are also incorporated into the blowing agent compositions. Certain surfactants are optional, but can be added to serve as cell stabilizers. Suitable stabilizers include polysiloxane polyoxyalkylene block copolymers, such as those disclosed in U.S. Pat. Nos. 2,834,748; 2,917,480; and 2,846,458, each of which is incorporated herein by reference. Examples of representative materials, typically polysiloxane polyoxyalkylene block co-polymers, are sold under the names of DC-193, B-8404, and L-5340. Other optional additives for the blowing agent mixture include flame retardants such as tris(2-chloroethyl) phosphate, tris(2-chloropropyl)phosphate, tris(2,3-dibromopropyl)-phosphate, tris(1,3-dichloro-propyl)phosphate, diammonium phosphate, various halogenated aromatic compounds, antimony oxide, aluminum trihydrate, polyvinyl chloride, and the like. With respect to nucleating agents, all known compounds and materials having nucleating functionality are available for use in the present invention, including talc.

In some embodiments, other compounds and/or components that modulate a particular property of the compositions (such as cost for example) are included in the compositions, and the presence of such compounds and components is within the broad scope of the invention.

In some embodiments, the co-blowing agent in accordance with the present invention comprise a physical blowing agent, a chemical blowing agent (which in some embodiments comprises water), or a blowing agent having a combination of physical and chemical blowing agent properties.

A wide range of co-blowing agents can be used in accordance with the present invention. In some embodiments the blowing agent compositions of the present invention include one or more HFCs as co-blowing agents, such as one or more $C_1$-$C_4$ HFCs, and/or one or more hydrocarbons, such as $C_4$-$C_6$ hydrocarbons. In some embodiments, the blowing agent compositions comprises an HFC selected from one or more of difluoromethane (HFC-32), fluoroethane (HFC-161), difluoroethane (HFC-152), trifluoroethane (HFC-143), tetrafluoroethane (HFC-134), pentafluoroethane (HFC-125), pentafluoropropane (HFC-245), hexafluoropropane (HFC-236), heptafluoropropane (HFC-227), pentafluorobutane (HFC-365), hexafluorobutane (HFC-356) and all isomers of all such HFCs.

In some embodiments, the blowing agent composition comprises one or more hydrocarbons, for example, iso, normal and/or cyclopentane for thermoset foams and butane or isobutane for thermoplastic foams. Other materials, such as water, $CO_2$, CFCs (such as trichlorofluoromethane (CFC-11) and dichlorodifluoromethane (CFC-12)), hydrochlorocarbons (HCCs such as dichloroethylene (such as trans-1, 2-dichloroethylene), ethyl chloride and chloropropane), HCFCs, $C_1$-$C_5$ alcohols (such as, for example, ethanol and/or propanol and/or butanol), $C_1$-$C_4$ aldehydes, $C_1$-$C_4$ ketones, $C_1$-$C_4$ ethers (including dimethyl ether and diethyl ether, diethers (such as dimethoxy methane and diethoxy methane), and methyl formate, including combinations of any of these can be included. In some embodiments, such components are not included due to negative environmental impact.

In some embodiments, one or more of the following HFC isomers are used as co-blowing agents in the compositions of the present invention:

1,1,1,2,2-pentafluoroethane (HFC-125)
1,1,2,2-tetrafluoroethane (HFC-134)
1,1,1,2-tetrafluoroethane (HFC-134a)
1,1-difluoroethane (HFC-152a)
1,1,1,2,3,3,3-heptafluoropropane (HFC-227 ea)
1,1,1,3,3,3-hexafluoropropane (HFC-236fa)
1,1,1,3,3-pentafluoropropane (HFC-245 fa) and
1,1,1,3,3-pentafluorobutane (HFC-365mfc).

In some embodiments, the relative amount of any of the above noted additional co-blowing agents, as well as any additional components which may be included in present compositions, can vary widely within the general broad scope of the present invention according to the particular application for the composition, and all such relative amounts are considered to be within the scope hereof.

In some embodiments, the blowing agent composition comprises at least one co-blowing agent and an amount of Z-HCFO-1224yd sufficient to produce a blowing agent composition which is overall nonflammable.

In some embodiments, the blowing agent compositions include Z-HCFO-1224yd in a wide range of amounts. In some embodiments, Z-HCFO-1224yd is present in an amount that is at least about 1% by weight, such as at least about 5% by weight, or about 15% by weight, of the composition.

In some embodiments, the blowing agent composition comprises at least about 50% by weight of Z-HCFO-1224yd. In some embodiments, the blowing agent consists essentially of Z-HCFO-1224yd. In some embodiments, one or more co-blowing agents can be used. In some embodiments, water is used as either a co-blowing agent or in combination with other co-blowing agents (such as, for example, pentane, particularly cyclopentane).

In some embodiments, the blowing agent composition comprises from about 30% to about 95% by weight of Z-HCFO-1224yd and from about 5% to about 90% by weight, such as from about 5% to about 65% by weight of co-blowing agent. In some embodiments, the co-blowing agent comprises $H_2O$, HFCs, hydrocarbons, alcohols (such as $C_2$, $C_3$ and/or $C_4$ alcohols), $CO_2$, and combinations of these. In some embodiments, the co-blowing agent consists essentially of $H_2O$, HFCs, hydrocarbons, alcohols (such as $C_2$, $C_3$ and/or $C_4$ alcohols), $CO_2$, and combinations of these.

In some embodiments, the co-blowing agent comprises $H_2O$. In some embodiments, the composition comprises $H_2O$ in an amount of from about 5% by weight to about 50% by weight of the total blowing agent composition, such as from about 10% by weight to about 40% by weight, or from about 10% to about 20% by weight of the total blowing agent.

In some embodiments, the co-blowing agent comprises $CO_2$. In some embodiments, the composition comprises $CO_2$ in an amount of from about 5% by weight to about 60% by weight of the total blowing agent composition, such as from about 20% by weight to about 50% by weight, or from about 40% to about 50% by weight of the total blowing agent.

In some embodiments, the co-blowing agent comprises alcohols, such as $C_2$, $C_3$ and/or $C_4$ alcohols. In some embodiments, the composition comprises an alcohol in an amount of from about 5% by weight to about 40% by weight of the total blowing agent composition, such as from about 10% by weight to about 40% by weight, or from about 15% to about 25% by weight of the total blowing agent.

In some embodiments, the compositions include one or more HFC co-blowing agents, such as $C_2$, $C_3$, $C_4$ or $C_5$ HFCs. In some embodiments, the compositions comprise difluoroethane, such as HFC-152a, for example, in extruded thermoplastics. In some embodiments, the compositions comprise pentafluoropropane, such as HFC-245. In some embodiments, the HFC co-blowing agent is present in the composition in amounts of from about 5% by weight to about 80% by weight of the total blowing agent composition, such as from about 10% by weight to about 75% by weight, or from about 25% to about 75% by weight of the total blowing agent. In some embodiments, the HFC is a $C_2$-$C_4$ HFC. In some embodiments, the HFC is a $C_3$ HFC. In some embodiments, the HFC is a $C_3$ HFC that is a pentafluorinated $C_3$ HFC, for example, HFC-245fa.

In some embodiments, the compositions include HC co-blowing agents. In some embodiments, the HC co-blowing agent is a $C_3$, $C_4$ or $C_5$ HC. In some embodiments, the HC is present in the composition in amounts of from about 5% by weight to about 80% by weight of the total blowing agent composition, such as from about 20% by weight to about 60% by weight of the total blowing agent.

Foamable Compositions

Provided herein are foamable compositions. As is known to those skilled in the art, foamable compositions generally include one or more components capable of forming foam. As used herein, the term "foam foaming agent" is used to refer to a component, or a combination of components, which are capable of forming a foam structure, such as a generally cellular foam structure. The foamable compositions provided herein include such component(s) and a blowing agent compound. In some embodiments, the blowing agent compound is Z-HCFO-1224yd.

In some embodiments, the foamable composition comprises Z-HCFO-1224yd and one or more components. In some embodiments, the foamable composition comprises Z-HCFO-1224yd and one or more components selected from among HFO-1234ye-E, Z-HFO-1234ye, HFO-1234yf, E-HFO-1234ze, Z-HFO-1234ze, HFO-1336mcyf, E-HFO-1336mzz, Z-HFO-1336mzz, E-HFO-1336ze, Z-HFO-1336ze, E-HFO-1438ezy, Z-HFO-1438ezy, E-HFO-1438mzz, Z-HFO-1438mzz, E-HCFO-1233zd, Z-HCFO-1233zd, HFC-32, HFC-134, HFC-134a, HFC-152a, HFC-227ea, HFC-236ea, HFC-245ca, HFC-245cb, HFC-245ea, HFC-245fa, HFC-365mfc, HFC-43-10mee, 2-methylbutane, 2-methylpentane, 3-methylpentane, butane, cyclo-butane, cyclo-hexane, cyclo-pentane, cyclo-propane, diethyl ether, dimethoxyethane, dimethoxymethane, dimethyl ether (dme), ethanol, iso-hexane (2-methylpentane), iso-butane, iso-pentane (2-methylbutane), isopropanol, methanol, methylcyclopentane, methylethyl ether (methoxyethane), neo-hexane (2,2-dimethylbutane), neo-pentane, n-hexane, pentane, propane, $CO_2$, ethylformate, methyl acetate, methyl formate, methylal, trans-1,2 dichloro-ethylene, and cis-1,2 dichloro-ethylene. In some embodiments, the foamable composition comprises Z-HCFO-1224yd and one or more components selected from among HFO-1234yf, E-HFO-234ze, E-HFO-1336mzz, Z-HFO-1336mzz, E-HFO-1336ze, Z-HFO-1336ze, E-HFO-1438ezy, E-HFO-1438mzz, HFC-134, HFC-134a, HFC-152a, butane, cyclobutane, cyclo-pentane, cyclo-propane, dimethyl ether (dme), ethanol, iso-butane, iso-pentane (2-methylbutane), pentane, propane, $CO_2$, methyl acetate, and methyl formate. In some embodiments, the composition is used as a blowing agent for the expansion of thermoplastic foams. In some embodiments, the foam is a polystyrene foam.

In some embodiments, the amount of Z-HCFO-1224yd in the foamable composition is between about 1 wt % to about 99 wt %, such as about 30 wt % to about 99 wt %; about 50 wt % to about 99 wt %; about 75 wt % to about 99 wt %; about 85 wt % to about 99 wt %; about 20 wt % to about 80 wt %; about 90 wt % to about 99 wt %; about 95 wt % to about 99 wt %; about 1 wt % to about 20 wt %; about 1 wt % to about 40 wt %; about 1 wt % to about 50 wt %; about 5 wt % to about 20 wt %; about 5 wt % to about 40 wt %; about 5 wt % to about 60 wt %; about 10 wt % to about 80 wt %; about 10 wt % to about 90 wt %; about 20 wt % to about 80 wt %; or about 20 wt % to about 90 wt %. Other ranges of amounts are shown in Table 1, and those amounts are likewise applicable for the foamable compositions provided herein.

In some embodiments, the one or more components capable of forming foam comprise a thermosetting composition capable of forming foam and/or a foamable composition. Examples of thermosetting compositions include polyurethane and polyisocyanurate foam compositions, and also phenolic foam compositions. In some embodiments, this reaction and foaming process is enhanced through the use of various additives such as catalysts and surfactant materials that serve to control and adjust cell size and to stabilize the foam structure during formation. In some embodiments, any one or more of the additional components described above with respect to the blowing agent compositions described herein is incorporated into the foamable composition described herein. In such thermosetting foam embodiments, one or more of the present compositions are included as or part of a blowing agent in a foamable composition, or as a part of a two or more part foamable composition, which can include one or more of the components capable of reacting and/or foaming under the proper conditions to form a foam or cellular structure.

In some embodiments, the one or more components capable of foaming comprise thermoplastic materials, such as thermoplastic polymers and/or resins. Examples of thermoplastic foam components include polyolefins, such as monovinyl aromatic compounds of the formula Ar—CH=$CH_2$, wherein Ar is an aromatic hydrocarbon radical of the benzene series such as polystyrene (PS). Other examples of suitable polyolefin resins include the various ethylene resins including the ethylene homopolymers such as polyethylene and ethylene copolymers, polypropylene (PP) and polyethylene-terephthalate (PET). In some embodiments, the thermoplastic foamable composition is an extrudable composition.

Any presently known and available method and system for forming foam is readily adaptable for use in connection with the present invention. For example, in some embodiments the methods of the present invention require incorporating a blowing agent in accordance with the present invention into a foamable or foam forming composition and then foaming the composition. In some embodiments, the method comprises a step or series of steps which include causing volumetric expansion of the blowing agent in accordance with the present invention.

In some embodiments, the presently used systems and devices for incorporation of blowing agent and for foaming are readily adaptable for use in accordance with the present invention. One advantage of the present invention is the provision of an improved blowing agent which is generally compatible with existing foaming methods and systems.

Thus, it will be appreciated by those skilled in the art that the present invention comprises methods and systems for foaming all types of foams, including thermosetting foams, thermoplastic foams and formed-in-place foams. In some embodiments, the present blowing agents are used in connection with conventional foaming equipment, such as polyurethane foaming equipment, at conventional processing conditions. The present methods therefore include polyol premix type operations, blending type operations, third stream blowing agent addition, and blowing agent addition at the foam head.

With respect to thermoplastic foams, in some embodiments the methods comprise introducing a blowing agent in accordance with the present invention into a thermoplastic material, for example, a thermoplastic polymer such as polyolefin, and then subjecting the thermoplastic material to conditions effective to cause foaming. In some embodiments, the step of introducing the blowing agent into the thermoplastic material comprises introducing the blowing agent into a screw extruder containing the thermoplastic. In some embodiments, the step of causing foaming comprises lowering the pressure on the thermoplastic material and thereby causing expansion of the blowing agent and contributing to the foaming of the material.

It will be appreciated by those skilled in the art, especially in view of the disclosure contained herein, that the order and manner in which the blowing agent of the present invention is formed and/or added to the foamable composition does not generally affect the operability of the present invention. For example, in the case of extrudable foams, in some embodiments the various components of the blowing agent, and even the components of the foamable composition, are not mixed in advance of introduction to the extrusion equipment. In some embodiments, the components are not added to the same location in the extrusion equipment. In some embodiments, the blowing agent is introduced either directly or as part of a premix, which is then further added to other parts of the foamable composition.

In some embodiments, one or more components of the blowing agent is introduced at a first location in the extruder, which is upstream of the place of addition of one or more other components of the blowing agent, with the expectation that the components will come together in the extruder and/or operate more effectively in this manner. In some embodiments, two or more components of the blowing agent are combined in advance and introduced together into the foamable composition, either directly or as part of premix which is then further added to other parts of the foamable composition.

Azeotropes and Azeotrope-Like Compositions

Also provided herein are azeotropic and azeotrope-like compositions which include Z-1-chloro-2,3,3,3-tetrafluoropropene (Z-HCFO-1224yd) and an additional compound or compounds. These compositions have near-zero ozone depletion potentials (ODPs) and low global warming potential. These compositions are useful as aerosol propellants, refrigerants, cleaning agents, expansion agents ("blowing agents") for the production of thermoplastic and thermoset foams, heat transfer media, gaseous dielectrics, solvents, fire extinguishing and suppression agents, power cycle working fluids, polymerization media, particulate removal fluids, carrier fluids, buffing abrasive agents, and displacement drying agents.

Binary azeotropic or azeotrope-like compositions of substantially constant-boiling mixtures can be characterized, depending upon the conditions chosen, in a number of ways. For example, it is well known by those skilled in the art, that, at different pressures the composition of a given azeotrope or azeotrope-like composition will vary at least to some degree, as will the boiling point temperature. Thus, an azeotropic or azeotrope-like composition of two compounds represents a unique type of relationship but with a variable composition that depends on temperature and/or pressure. Therefore, compositional ranges, rather than fixed compositions, are often used to define azeotropes and azeotrope-like compositions.

By "azeotropic" composition is meant a constant boiling liquid admixture of two or more substances that behaves as a single substance. In some embodiments, an azeotropic composition is characterized in that the vapor produced by partial evaporation or distillation of the liquid has the same composition as the liquid from which it was evaporated or distilled, that is, the admixture distills/refluxes without compositional change. In some embodiments, constant boiling compositions are characterized as azeotropic because they exhibit either a maximum or minimum boiling point, as compared with that of the non-azeotropic mixtures of the same components. In some embodiments, azeotropic compositions are characterized by a minimum or a maximum in the vapor pressure of the mixture relative to the vapor pressure of the neat components at a constant temperature.

By "azeotrope-like" composition is meant a constant boiling, or substantially constant boiling, liquid admixture of two or more substances that behaves as a single substance. In some embodiments, an azeotrope-like composition can be characterized in that the vapor produced by partial evaporation or distillation of the liquid has substantially the same composition as the liquid from which it was evaporated or distilled, that is, the admixture distills/refluxes without substantial composition change. In some embodiments, an azeotrope-like composition can be characterized in that the bubble point vapor pressure and the dew point vapor pressure of the composition at a particular temperature are substantially the same. In some embodiments, an azeotrope-like composition can be characterized by the area that is adjacent to the maximum or minimum vapor pressure in a plot of composition vapor pressure at a given temperature as a function of mole fraction of components in the composition.

In one embodiment, it is recognized in the art that a composition is azeotrope-like if, after 50 weight percent of the composition is removed such as by evaporation or boiling off, the difference in vapor pressure between the original composition and the composition remaining after 50 weight percent of the original composition has been removed is less than about 10 percent, when measured in absolute units. By absolute units, it is meant measurements of pressure and, for example, psia, atmospheres, bars, torr, dynes per square centimeter, millimeters of mercury, inches of water and other equivalent terms well known in the art. If an azeotrope is present, there is no difference in vapor pressure between the original composition and the composition remaining after 50 weight percent of the original composition has been removed.

For compositions that are azeotropic, in some embodiments there is some range of compositions around the azeotrope point that, for a maximum boiling azeotrope, have boiling points at a particular pressure higher than the pure components of the composition at that pressure and have vapor pressures at a particular temperature lower than the pure components of the composition at that temperature, and that, for a minimum boiling azeotrope, have boiling points at a particular pressure lower than the pure components of the composition at that pressure and have vapor pressures at a particular temperature higher than the pure components of the composition at that temperature. Boiling temperatures and vapor pressures above or below that of the pure components are caused by unexpected intermolecular forces between and among the molecules of the compositions, which can be a combination of repulsive and attractive forces such as van der Waals forces and hydrogen bonding.

In some embodiments, the range of compositions that have a maximum or minimum boiling point at a particular pressure, or a maximum or minimum vapor pressure at a particular temperature, may or may not be coextensive with the range of compositions that have a change in vapor pressure of less than about 10% when 50 weight percent of the composition is evaporated. In those cases where the range of compositions that have maximum or minimum boiling temperatures at a particular pressure, or maximum or minimum vapor pressures at a particular temperature, are broader than the range of compositions that have a change in vapor pressure of less than about 10% when 50 weight percent of the composition is evaporated, the unexpected intermolecular forces are nonetheless believed important in that the refrigerant compositions having those forces that are not substantially constant boiling may exhibit unexpected increases in the capacity or efficiency versus the components of the refrigerant composition.

It is recognized in the art that both the boiling point and the amount of each component of an azeotropic composition can change when the azeotrope liquid composition is subjected to boiling at different pressures. Thus, in some embodiments, an azeotropic composition may be defined in terms of the unique relationship that exists among components or in terms of the exact amounts of each component of the composition characterized by a fixed boiling point at a specific pressure. In some embodiments, an azeotrope or azeotrope-like composition of two compounds can be characterized by defining compositions characterized by a boiling point at a given pressure, thus providing identifying characteristics without unduly limiting the scope of the invention by a specific numerical composition, which is limited by and is only as accurate as the analytical equipment available.

It is recognized in this field that when the relative volatility of a system approaches 1.0, the system is defined as forming an azeotrope-like composition. Relative volatility is the ratio of the volatility of component 1 to the volatility of component 2. The ratio of the mole fraction of a component in vapor to that in liquid is the volatility of the component.

To determine the relative volatility of any two compounds, a method known as the PTx method can be used. In this procedure, the total absolute pressure in a cell of known volume is measured at a constant temperature for various compositions of the two compounds. Use of the PTx Method is described in detail in "Phase Equilibrium in Process Design," Wiley-Interscience Publisher, 1970, written by Harold R. Null, pages 124-126, hereby incorporated by reference.

These measurements can be converted into equilibrium vapor and liquid compositions in the PTx cell by using an activity coefficient equation model, such as the non-random, two-liquid (NRTL) equation, to represent liquid phase non-idealities. Use of an activity coefficient equation, such as the NRTL equation is described in detail in "The Properties of Gases and Liquids," 4th edition, published by McGraw Hill, written by Reid, Prausnitz and Poling, pages 241-387, and in "Phase Equilibria in Chemical Engineering," published by Butterworth Publishers, 1985, written by Stanley M. Walas, pages 165-244, both of which are hereby incorporated by reference. Without wishing to be bound by any theory or explanation, it is believed that the NRTL equation, together with the PTx cell data, can sufficiently predict the relative volatilities of the Z-HFO-1224yd-containing compositions of the present invention and can therefore predict the behavior of these mixtures in multi-stage separation equipment such as distillation columns.

As used herein, "effective amount" is the amount of each component of the compositions provided herein which, when combined, results in the formation of an azeotropic or azeotrope-like composition. This definition includes the amounts of each component, which amounts may vary depending on the pressure applied to the composition so long as the azeotropic or azeotrope-like compositions continue to exist at the different pressures, but with possible different boiling points. Therefore, effective amount includes the amounts, such as may be expressed in weight percentages, of each component of the compositions of the instant invention which form azeotropic or azeotrope-like compositions at temperatures or pressures other than as described herein.

In some embodiments, the azeotrope or azeotrope-like compositions comprise Z-HCFO-1224yd and one or more components selected from methyl formate, methyl ethyl ether, diethyl ether, cyclobutane, isopentane (2-methylbutane), ethylene oxide, Z-1,1,1,4,4,4-hexafluoro-2-butene (Z-HFO-1336mzz), E-1,1,1,4,4,4-hexafluoro-2-butene (E-HFO-1336mzz), Z-1-chloro-3,3,3-trifluoropropene (Z-HCFO-1233zd), E-1-chloro-3,3,3-trifluoropropene (E-HCFO-1233zd), Z-1,1,1,4,4,5,5,5-octafluoro-2-pentene (Z-HFO-1439mzz), E-1,1,1,4,4,5,5,5-octafluoro-2-pentene (E-HFO-1439mzz), 1,1,1,2,3-pentafluoropropane (HFC-245eb), E-HFO-1234ye, Z-HFO-1234ye, Z-HFO-1234ze, HFO-1243yf, HFO-1336mcyf, E-HFO-1336ze, Z-HFO-1336ze, E-HFO-1438ezy, Z-HFO1438ezy, E-HFO-1438mzz, HCFO-1233xf, HFC-236ea, HFC-245fa, HFC-356mff, HFC-245ca, HFC-245ea, HCFC-123, CFC-11, HFE-236eaEbg, HFE-E347mmyl, and HFE-1-methoxyheptafluoropropane (hfe-7000).

In some embodiments, the azeotrope or azeotrope-like composition comprises Z-HCFO-1224yd and methyl formate. In some embodiments, the azeotrope or azeotrope-like composition comprises Z-HCFO-1224yd and Z-1,1,1,4,4,4-hexafluoro-2-butene (Z-HFO-1336mzz). In some embodiments, the azeotrope or azeotrope-like composition comprises Z-HCFO-1224yd and E-1,1,1,4,4,4-hexafluoro-2-butene (E-HFO-1336mzz). In some embodiments, the azeotrope or azeotrope-like composition comprises Z-HCFO-1224yd and Z-1-chloro-3,3,3-trifluoropropene (Z-HCFO-1233zd). In some embodiments, the azeotrope or azeotrope-like composition comprises Z-HCFO-1224yd and E-1-chloro-3,3,3-trifluoropropene (E-HCFO-1233zd). In some embodiments, the azeotrope or azeotrope-like composition comprises Z-HCFO-1224yd and Z-1,1,1,4,4,5,5,5-octafluoro-2-pentene (Z-HFO-1439mzz). In some embodiments, the azeotrope or azeotrope-like composition comprises Z-HCFO-1224yd and E-1,1,1,4,4,5,5,5-octafluoro-2-pentene (E-HFO-1439mzz). In some embodiments, the azeotrope or azeotrope-like composition comprises Z-HCFO-1224yd and 1,1,1,2,3-pentafluoropropane (HFC-245eb).

In some embodiments, the Z-HCFO-1224yd comprises between about 1 mol % and about 99 mol % of the azeotrope or azeotrope-like composition, such as between about 1 mol % and about 2 mol %, 1 mol % and about 3 mol %, 1 mol % and about 4 mol %, 1 mol % and about 6 mol %, 1 mol % and about 8 mol %, 1 mol % and about 10 mol %, 1 mol % and about 11 mol %, 1 mol % and about 12 mol %, 1 mol % and about 15 mol %, 1 mol % and about 20 mol %, 1 mol % and about 22 mol %, 5 mol % and about 6 mol %, 5 mol % and about 8 mol %, 5 mol % and about 10 mol %, 5 mol % and about 11 mol %, 5 mol % and about 12 mol %, 5 mol % and about 15 mol %, 5 mol % and about 20 mol %, 5 mol % and about 22 mol %, 5 mol % and about 95 mol %, 38 mol % and about 95 mol %, 38 mol % and about 99 mol %, 49 mol % and about 95 mol %, 49 mol % and about 99 mol %, 50 mol % and about 95 mol %, 50 mol % and about 99 mol %, 53 mol % and about 95 mol %, 53 mol % and about 99 mol %, 55 mol % and about 95 mol %, 55 mol % and about 99 mol %, 58 mol % and about 95 mol %, 58 mol % and about 99 mol %, 60 mol % and about 95 mol %, 60 mol % and about 99 mol %, 62 mol % and about 95 mol %, 62 mol % and about 99 mol %, 69 mol % and about 95 mol %, 69 mol % and about 99 mol %, 70 mol % and about 95 mol %, 70 mol % and about 99 mol %, 74 mol % and about 95 mol %, 74 mol % and about 99 mol %, 76 mol % and about 95 mol %, 76 mol % and about 99 mol %, 80 mol % and about 95 mol %, 80 mol % and about 99 mol %, 81 mol % and about 95 mol %, 81 mol % and about 99 mol %, 84 mol % and about 95 mol %, 84 mol % and about 99 mol %, 86 mol % and about 95 mol %, 86 mol % and about 99 mol %, 88 mol % and about 95 mol %, 88 mol % and about 99 mol %, 89 mol % and about 95 mol %, or 89 mol % and about 99 mol % of the azeotrope or azeotrope-like composition. In some embodiments, the Z-HCFO-1224yd comprises about 66 mol %, 67 mol %, 68 mol %, 69 mol %, 70 mol %, 71 mol %, 72 mol %, 73 mol %, 74 mol %, 75 mol %, 76 mol %, 77 mol %, 78 mol %, 79 mol %, 80 mol %, 81 mol %, 82 mol %, 83 mol %, 84 mol %, 85 mol %, 86 mol %, 87 mol %, 88 mol %, 89 mol %, 90 mol %, 91 mol %, 92 mol %, 93 mol %, 94 mol %, 95 mol %, 96 mol %, 97 mol %, 98 mol %, or 99 mol % of the azeotrope or azeotrope-like composition.

In some embodiments, the azeotrope or azeotrope-like composition comprising Z-HCFO-1224yd is formed at a temperature range from about −40° C. to about 130° C. In some embodiments, the azeotrope or azeotrope-like composition comprising Z-HCFO-1224yd is formed at a temperature of about −40° C., −30° C., −20° C., −10° C., 0° C., 10° C., 20° C., 30° C., 31.7° C., 31.75° C., 31.8° C., 40° C., 50° C., 60° C., 70° C., 80° C., 90° C., 100° C., 110° C., 120° C., or about 130° C.

In some embodiments, the azeotrope or azeotrope-like composition comprising Z-HCFO-1224yd is formed at a pressure of from about 0.98 psia (130 kPa) to about 333 psia (2296 kPa). In some embodiments, the azeotrope or azeotrope-like composition comprising Z-HCFO-1224yd is formed at a pressure of about 0.98 psia, 1.84 psia, 3.23 psia, 5.37 psia, 8.48 psia, 12.87 psia, 18.84 psia, 26.75 psia, 28.37 psia, 37.02 psia, 50.09 psia, 66.46 psia, 86.71 psia, 111.45 psia, 141.40 psia, 177.37 psia, 220.34 psia, 271.53 psia, or 332.68 psia. In some embodiments, the azeotrope or azeotrope-like composition comprising Z-HCFO-1224yd is formed at a pressure of from about 1 atm to about 31 atm. In some embodiments, the azeotrope or azeotrope-like composition comprising Z-HCFO-1224yd is formed at a pressure of about 1 atm, 2 atm, 3 atm, 4 atm, 5 atm, 6 atm, 7 atm, 8 atm, 9 atm, 10 atm, 11 atm, 12 atm, 13 atm, 14 atm, 15 atm, 16 atm, 17 atm, 18 atm, 19 atm, 20 atm, 21 atm, 22 atm, 23 atm, 24 atm, 25 atm, 26 atm, 27 atm, 28 atm, 29 atm, 30 atm, or 31 atm.

In some embodiments, the azeotrope-like composition consists essentially of (i) Z-1-chloro-2,3,3,3-tetrafluoroprop-1-ene (Z-HCFO-1224yd) and (ii) methyl formate. In some embodiments, the azeotrope-like composition consists essentially of (i) 5-95 mole % Z-1-chloro-2,3,3,3-tetrafluoroprop-1-ene (Z-HCFO-1224yd) and (ii) 5-95 mole % methyl formate at a temperature from −40° C. to about 140° C. In some embodiments, the azeotrope-like composition consists essentially of (i) 85-99 mole % Z-1-chloro-2,3,3,3-tetrafluoroprop-1-ene (Z-HCFO-1224yd) and (ii) 1-15 mole % methyl formate at 20° C. In some embodiments, the azeotrope-like composition is as shown in Table 12A or 12B.

In some embodiments, the azeotrope-like composition consists essentially of (i) Z-1-chloro-2,3,3,3-tetrafluoroprop-1-ene (Z-HCFO-1224yd) and (ii) E-1-chloro-3,3,3-trifluoropropene (E-1233yd). In some embodiments, the azeotrope-like composition consists essentially of (i) 5-95 mole % Z-1-chloro-2,3,3,3-tetrafluoroprop-1-ene (Z-HCFO-1224yd) and (ii) 5-95 mole % E-1-chloro-3,3,3-trifluoropropene (E-1233yd) at a temperature from −40° C. to about 140° C. In some embodiments, the azeotrope-like composition is as shown in Table 13.

In some embodiments, the azeotrope-like composition consists essentially of (i) Z-1-chloro-2,3,3,3-tetrafluoroprop-1-ene (Z-HCFO-1224yd) and (ii) E-1,1,1,4,4,4-hexafluoro-2-butene (E-HFO-1336mzz). In some embodiments, the azeotrope-like composition consists essentially of (i) 5-95 mole % Z-1-chloro-2,3,3,3-tetrafluoroprop-1-ene (Z-HCFO-1224yd) and (ii) 5-95 mole % E-1,1,1,4,4,4-hexafluoro-2-butene (E-HFO-1336mzz) at a temperature from −40° C. to about 140° C. In some embodiments, the azeotrope-like composition is as shown in Table 14A or 14B.

In some embodiments, the azeotrope-like composition consists essentially of (i) Z-1-chloro-2,3,3,3-tetrafluoroprop-1-ene (Z-HCFO-1224yd) and (ii) E-1,1,1,4,4,5,5,5-octafluoro-2-pentene (E-HFO-1438mzz). In some embodiments, the azeotrope-like composition consists essentially of (i) 1-99 mole % Z-1-chloro-2,3,3,3-tetrafluoroprop-1-ene (Z-HCFO-1224yd) and (ii) 1-99 mole % E-1,1,1,4,4,5,5,5-octafluoro-2-pentene (E-HFO-1438mzz) at a temperature from −40° C. to about 140° C. In some embodiments, (i) 1-12 mole % and 89-99 mole % Z-1-chloro-2,3,3,3-tetrafluoroprop-1-ene (Z-HCFO-1224yd) and (ii) 1-11 mole % and 88-99 mole % E-1,1,1,4,4,5,5,5-octafluoro-2-pentene (E-HFO-1438mzz) at a temperature of 20° C. In some embodiments, the azeotrope-like composition is as shown in Table 15A or 15B.

In some embodiments, the azeotrope composition consists essentially of (i) Z-1-chloro-2,3,3,3-tetrafluoroprop-1-ene (Z-HCFO-1224yd) and (ii) 2-chloro-3,3,3-trifluoropropene (HCFO-1233xf). In some embodiments, the azeotrope composition consists essentially of 16 mole % Z-1-chloro-2,3,3,3-tetrafluoroprop-1-ene (Z-HCFO-1224yd) and 84 mole % 2-chloro-3,3,3-trifluoropropene (HCFO-1233xf) at a temperature 31.8° C.

The azeotrope or azeotrope-like compositions provided herein can be prepared by any convenient method. In some embodiments, the azeotrope or azeotrope-like compositions are prepared by mixing or combining the desired amounts. In some embodiments, the azeotrope or azeotrope-like compositions are prepared by weighing the desired component amounts and thereafter combining them in an appropriate container.

Specific examples illustrating the invention are given below in the Examples. Unless otherwise stated therein, all percentages are by weight. It is to be understood that these examples are merely illustrative and in no way are to be interpreted as limiting the scope of the invention.

Uses of the Compositions

The compositions provided herein can be used in a wide variety of applications as substitutes for CFCs and for compositions containing less desirable HCFCs. In some embodiments, the compositions are useful as blowing agents, refrigerants, heating agents, power cycle agents, cleaning agents, aerosol propellants, sterilization agents, lubricants, flavor and fragrance extractants, flammability reducing agents, and flame suppression agents. Each of these uses will be discussed in greater detail below.

Methods of Forming Foams

Provided herein are methods of forming foams, such as panel foams and spray foams. In some embodiments, the foams are made from polyurethane and polyisocyanurate. In some embodiments, the methods comprise providing a blowing agent composition described herein, adding (directly or indirectly) the blowing agent composition to a foamable composition, and reacting the foamable composition under the conditions effective to form a foam or cellular structure, as is well known in the art. Any of the methods well known in the art, such as those described in "Polyurethanes Chemistry and Technology," Volumes I and II, Saunders and Frisch, 1962, John Wiley and Sons, New York, N.Y., which is incorporated herein by reference, can be used or adapted for use in accordance with the foam embodiments of the present invention.

In some embodiments of the method, the amount of Z-HCFO-1224yd in the composition is from about 1 wt % to about 99 wt %, such as about 30 wt % to about 99 wt %; about 50 wt % to about 99 wt %; about 75 wt % to about 99 wt %; about 85 wt % to about 99 wt %; about 20 wt % to about 80 wt %; about 90 wt % to about 99 wt %; about 95 wt % to about 99 wt %; about 1 wt % to about 20 wt %; about 1 wt % to about 40 wt %; about 1 wt % to about 50 wt %; about 5 wt % to about 20 wt %; about 5 wt % to about 40 wt %; about 5 wt % to about 60 wt %; about 10 wt % to about 80 wt %; about 10 wt % to about 90 wt %; about 20 wt % to about 80 wt %; about 20 wt % to about 90 wt %. Other ranges of amounts are shown in Table 1, and those amounts are likewise applicable for the methods provided herein.

In some embodiments, the blowing agent composition provided herein comprises Z-1-chloro-2,3,3,3-tetrafluoroprop-1-ene and one or more compounds selected from Z-1,1,1,4,4,4-hexafluoro-2-butene, E-1,1,1,4,4,4-hexafluoro-2-butene, and E-1-chloro-3,3,3-trifluoropropene.

In some embodiments, the blowing agent composition provided herein comprises Z-1-chloro-2,3,3,3-tetrafluoroprop-1-ene and Z-1,1,1,4,4,4-hexafluoro-2-butene.

In some embodiments, the blowing agent composition provided herein comprises Z-1-chloro-2,3,3,3-tetrafluoroprop-1-ene and E-1,1,1,4,4,4-hexafluoro-2-butene.

In some embodiments, the blowing agent composition provided herein comprises Z-1-chloro-2,3,3,3-tetrafluoroprop-1-ene and E-1-chloro-3,3,3-trifluoropropene.

In some embodiments, the blowing agent composition provided herein comprises further comprises water.

In some embodiments, the methods comprise preparing polyurethane or polyisocyanurate foams by combining an isocyanate, a polyol or mixture of polyols, a blowing agent or mixture of blowing agents comprising one or more of the present compositions, and other materials such as catalysts, surfactants, and optionally, flame retardants, colorants, or other additives.

In some embodiments, the components for polyurethane or polyisocyanurate foams are provided in pre-blended formulations. In some embodiments, the foam formulation is pre-blended into two components. In some embodiments, the isocyanate and optionally certain surfactants and blowing agents comprise the first component, commonly referred to as the "A" component. In some embodiments, the polyol or polyol mixture, surfactant, catalysts, blowing agents, flame retardant, and other isocyanate reactive components comprise the second component, commonly referred to as the "B" component. In some embodiments, polyurethane or polyisocyanurate foams are readily prepared by bringing together the A and B side components either by hand mix for small preparations and machine mix techniques to form blocks, slabs, laminates, pour-in-place panels and other items, spray applied foams, froths, and the like. In some embodiments, other ingredients such as fire retardants, colorants, auxiliary blowing agents, and even other polyols are added as one or more additional streams to the mix head or reaction site. In some embodiments, they are all incorporated into one B-component as described above.

In some embodiments, the present application provides a composition which is a blend of an A-side composition provided herein and a B-side composition provided herein.

In some embodiments, the composition which is a blend of an A-side and a B-side comprises a blowing agent component which is a blend of Z-1-chloro-2,3,3,3-tetrafluoroprop-1-ene and Z-1,1,1,4,4,4-hexafluoro-2-butene.

In some embodiments, the composition which is a blend of an A-side and a B-side comprises about 5 weight percent to about 15 weight percent Z-1-chloro-2,3,3,3-tetrafluoroprop-1-ene and about 5 weight percent to about 15 weight percent Z-1,1,1,4,4,4-hexafluoro-2-butene.

In some embodiments, the composition which is a blend of an A-side and a B-side comprises about 5 weight percent to about 10 weight percent Z-1-chloro-2,3,3,3-tetrafluoroprop-1-ene and about 5 weight percent to about 15 weight percent Z-1,1,1,4,4,4-hexafluoro-2-butene.

In some embodiments, the composition which is a blend of an A-side and a B-side comprises about 5 weight percent to about 7 weight percent Z-1-chloro-2,3,3,3-tetrafluoroprop-1-ene and about 5 weight percent to about 15 weight percent Z-1,1,1,4,4,4-hexafluoro-2-butene.

In some embodiments, the composition which is a blend of an A-side and a B-side comprises about 10 weight percent to about 15 weight percent Z-1-chloro-2,3,3,3-tetrafluoroprop-1-ene and about 5 weight percent to about 15 weight percent Z-1,1,1,4,4,4-hexafluoro-2-butene.

In some embodiments, the composition which is a blend of an A-side and a B-side comprises about 11 weight percent to about 13 weight percent Z-1-chloro-2,3,3,3-tetrafluoroprop-1-ene and about 5 weight percent to about 15 weight percent Z-1,1,1,4,4,4-hexafluoro-2-butene.

In some embodiments, the composition which is a blend of an A-side and a B-side comprises about 13 weight percent to about 15 weight percent Z-1-chloro-2,3,3,3-tetrafluoroprop-1-ene and about 5 weight percent to about 15 weight percent Z-1,1,1,4,4,4-hexafluoro-2-butene.

In some embodiments, the composition which is a blend of an A-side and a B-side comprises about 5 weight percent to about 15 weight percent Z-1-chloro-2,3,3,3-tetrafluoroprop-1-ene and about 5 weight percent to about 10 weight percent Z-1,1,1,4,4,4-hexafluoro-2-butene.

In some embodiments, the composition which is a blend of an A-side and a B-side comprises about 5 weight percent to about 10 weight percent Z-1-chloro-2,3,3,3-tetrafluoroprop-1-ene and about 5 weight percent to about 10 weight percent Z-1,1,1,4,4,4-hexafluoro-2-butene.

In some embodiments, the composition which is a blend of an A-side and a B-side comprises about 5 weight percent to about 7 weight percent Z-1-chloro-2,3,3,3-tetrafluoroprop-1-ene and about 5 weight percent to about 10 weight percent Z-1,1,1,4,4,4-hexafluoro-2-butene.

In some embodiments, the composition which is a blend of an A-side and a B-side comprises about 10 weight percent to about 15 weight percent Z-1-chloro-2,3,3,3-tetrafluoroprop-1-ene and about 5 weight percent to about 10 weight percent Z-1,1,1,4,4,4-hexafluoro-2-butene.

In some embodiments, the composition which is a blend of an A-side and a B-side comprises about 11 weight percent to about 13 weight percent Z-1-chloro-2,3,3,3-tetrafluoroprop-1-ene and about 5 weight percent to about 10 weight percent Z-1,1,1,4,4,4-hexafluoro-2-butene.

In some embodiments, the composition which is a blend of an A-side and a B-side comprises about 13 weight percent to about 15 weight percent Z-1-chloro-2,3,3,3-tetrafluoroprop-1-ene and about 5 weight percent to about 10 weight percent Z-1,1,1,4,4,4-hexafluoro-2-butene.

In some embodiments, the composition which is a blend of an A-side and a B-side comprises about 5 weight percent to about 15 weight percent Z-1-chloro-2,3,3,3-tetrafluoroprop-1-ene and about 6 weight percent to about 8 weight percent Z-1,1,1,4,4,4-hexafluoro-2-butene.

In some embodiments, the composition which is a blend of an A-side and a B-side comprises about 5 weight percent to about 10 weight percent Z-1-chloro-2,3,3,3-tetrafluoroprop-1-ene and about 6 weight percent to about 8 weight percent Z-1,1,1,4,4,4-hexafluoro-2-butene.

In some embodiments, the composition which is a blend of an A-side and a B-side comprises about 5 weight percent to about 7 weight percent Z-1-chloro-2,3,3,3-tetrafluoroprop-1-ene and about 6 weight percent to about 8 weight percent Z-1,1,1,4,4,4-hexafluoro-2-butene.

In some embodiments, the composition which is a blend of an A-side and a B-side comprises about 10 weight percent to about 15 weight percent Z-1-chloro-2,3,3,3-tetrafluoroprop-1-ene and about 6 weight percent to about 8 weight percent Z-1,1,1,4,4,4-hexafluoro-2-butene.

In some embodiments, the composition which is a blend of an A-side and a B-side comprises about 11 weight percent to about 13 weight percent Z-1-chloro-2,3,3,3-tetrafluoroprop-1-ene and about 6 weight percent to about 8 weight percent Z-1,1,1,4,4,4-hexafluoro-2-butene.

In some embodiments, the composition which is a blend of an A-side and a B-side comprises about 13 weight percent to about 15 weight percent Z-1-chloro-2,3,3,3-tetrafluoroprop-1-ene and about 6 weight percent to about 8 weight percent Z-1,1,1,4,4,4-hexafluoro-2-butene.

In some embodiments, a foam prepared from a blowing agent composition Z-1-chloro-2,3,3,3-tetrafluoroprop-1-ene and Z-1,1,1,4,4,4-hexafluoro-2-butene as described herein exhibits a K-factor of from about 0.113 Btu·in/ft$^2$·h·° F. to about 0.158 Btu·in/ft$^2$·h·° F. at a temperature of about 20° F.

In some embodiments, a foam prepared from a blowing agent composition Z-1-chloro-2,3,3,3-tetrafluoroprop-1-ene and Z-1,1,1,4,4,4-hexafluoro-2-butene as described herein exhibits a K-factor of from about 0.113 Btu·in/ft$^2$·h·°F. to about 0.119 Btu·in/ft$^2$·h·°F. at a temperature of about 20°F.

In some embodiments, a foam prepared from a blowing agent composition Z-1-chloro-2,3,3,3-tetrafluoroprop-1-ene and Z-1,1,1,4,4,4-hexafluoro-2-butene as described herein exhibits a K-factor of from about 0.137 Btu·in/ft$^2$·h·°F. to about 0.143 Btu·in/ft$^2$·h·°F. at a temperature of about 20°F. In some embodiments, the foam exhibits a K-factor of from about 0.137 Btu·in/ft$^2$·h·°F. to about 0.143 Btu·in/ft$^2$·h·°F. at a temperature of about 20°F. up to about 30 days after forming of the foam.

In some embodiments, a foam prepared from a blowing agent composition Z-1-chloro-2,3,3,3-tetrafluoroprop-1-ene and Z-1,1,1,4,4,4-hexafluoro-2-butene as described herein exhibits a K-factor of from about 0.143 Btu·in/ft$^2$·h·°F. to about 0.149 Btu·in/ft$^2$·h·°F. at a temperature of about 20°F. In some embodiments, the foam exhibits a K-factor of from about 0.143 Btu·in/ft$^2$·h·°F. to about 0.149 Btu·in/ft$^2$·h·°F. at a temperature of about 20°F. up to about 60 days after forming of the foam. In some embodiments, the foam exhibits a K-factor of from about 0.143 Btu·in/ft$^2$·h·°F. to about 0.149 Btu·in/ft$^2$·h·°F. at a temperature of about 20°F. from about 30 days to about 60 days after forming of the foam.

In some embodiments, a foam prepared from a blowing agent composition Z-1-chloro-2,3,3,3-tetrafluoroprop-1-ene and Z-1,1,1,4,4,4-hexafluoro-2-butene as described herein exhibits a K-factor of from about 0.150 Btu·in/ft$^2$·h·°F. to about 0.156 Btu·in/ft$^2$·h·°F. at a temperature of about 20°F. In some embodiments, the foam exhibits a K-factor of from about 0.150 Btu·in/ft$^2$·h·°F. to about 0.156 Btu·in/ft$^2$·h·°F. at a temperature of about 20°F. up to about 120 days after forming of the foam. In some embodiments, the foam exhibits a K-factor of from about 0.150 Btu·in/ft$^2$·h·°F. to about 0.156 Btu·in/ft$^2$·h·°F. at a temperature of about 20°F. from about 60 days to about 120 days after forming of the foam.

In some embodiments, a foam prepared from a blowing agent composition Z-1-chloro-2,3,3,3-tetrafluoroprop-1-ene and Z-1,1,1,4,4,4-hexafluoro-2-butene as described herein exhibits a K-factor of from about 0.116 Btu·in/ft$^2$·h·°F. to about 0.122 Btu·in/ft$^2$·h·°F. at a temperature of about 35°F.

In some embodiments, a foam prepared from a blowing agent composition Z-1-chloro-2,3,3,3-tetrafluoroprop-1-ene and Z-1,1,1,4,4,4-hexafluoro-2-butene as described herein exhibits a K-factor of from about 0.116 Btu·in/ft$^2$·h·°F. to about 0.119 Btu·in/ft$^2$·h·°F. at a temperature of about 35°F.

In some embodiments, a foam prepared from a blowing agent composition Z-1-chloro-2,3,3,3-tetrafluoroprop-1-ene and Z-1,1,1,4,4,4-hexafluoro-2-butene as described herein exhibits a K-factor of from about 0.137 Btu·in/ft$^2$·h·°F. to about 0.143 Btu·in/ft$^2$·h·°F. at a temperature of about 35°F. In some embodiments, the foam exhibits a K-factor of from about 0.137 Btu·in/ft$^2$·h·°F. to about 0.143 Btu·in/ft$^2$·h·°F. at a temperature of about 35°F. up to about 30 days after forming of the foam.

In some embodiments, a foam prepared from a blowing agent composition Z-1-chloro-2,3,3,3-tetrafluoroprop-1-ene and Z-1,1,1,4,4,4-hexafluoro-2-butene as described herein exhibits a K-factor of from about 0.145 Btu·in/ft$^2$·h·°F. to about 0.151 Btu·in/ft$^2$·h·°F. at a temperature of about 35°F. In some embodiments, the foam exhibits a K-factor of from about 0.145 Btu·in/ft$^2$·h·°F. to about 0.151 Btu·in/ft$^2$·h·°F. at a temperature of about 35°F. up to about 60 days after forming of the foam. In some embodiments, the foam exhibits a K-factor of from about 0.145 Btu·in/ft$^2$·h·°F. to about 0.151 Btu·in/ft$^2$·h·°F. at a temperature of about 35°F. from about 30 days to about 60 days after forming of the foam.

In some embodiments, a foam prepared from a blowing agent composition Z-1-chloro-2,3,3,3-tetrafluoroprop-1-ene and Z-1,1,1,4,4,4-hexafluoro-2-butene as described herein exhibits a K-factor of from about 0.152 Btu·in/ft$^2$·h·°F. to about 0.159 Btu·in/ft$^2$·h·°F. at a temperature of about 35°F. In some embodiments, the foam exhibits a K-factor of from about 0.152 Btu·in/ft$^2$·h·°F. to about 0.159 Btu·in/ft$^2$·h·°F. at a temperature of about 35°F. up to about 120 days after forming of the foam. In some embodiments, the foam exhibits a K-factor of from about 0.152 Btu·in/ft$^2$·h·°F. to about 0.159 Btu·in/ft$^2$·h·°F. at a temperature of about 35°F. from about 60 days to about 120 days after forming of the foam.

In some embodiments, a foam prepared from a blowing agent composition Z-1-chloro-2,3,3,3-tetrafluoroprop-1-ene and Z-1,1,1,4,4,4-hexafluoro-2-butene as described herein exhibits a K-factor of from about 0.122 Btu·in/ft$^2$·h·°F. to about 0.165 Btu·in/ft$^2$·h·°F. at a temperature of about 50°F.

In some embodiments, a foam prepared from a blowing agent composition Z-1-chloro-2,3,3,3-tetrafluoroprop-1-ene and Z-1,1,1,4,4,4-hexafluoro-2-butene as described herein exhibits a K-factor of from about 0.122 Btu·in/ft$^2$·h·°F. to about 0.126 Btu·in/ft$^2$·h·°F. at a temperature of about 50°F.

In some embodiments, a foam prepared from a blowing agent composition Z-1-chloro-2,3,3,3-tetrafluoroprop-1-ene and Z-1,1,1,4,4,4-hexafluoro-2-butene as described herein exhibits a K-factor of from about 0.144 Btu·in/ft$^2$·h·°F. to about 0.148 Btu·in/ft$^2$·h·°F. at a temperature of about 50°F. In some embodiments, the foam exhibits a K-factor of from about 0.144 Btu·in/ft$^2$·h·°F. to about 0.148 Btu·in/ft$^2$·h·°F. at a temperature of about 50°F. up to about 30 days after forming of the foam.

In some embodiments, a foam prepared from a blowing agent composition Z-1-chloro-2,3,3,3-tetrafluoroprop-1-ene and Z-1,1,1,4,4,4-hexafluoro-2-butene as described herein exhibits a K-factor of from about 0.150 Btu·in/ft$^2$·h·°F. to about 0.155 Btu·in/ft$^2$·h·°F. at a temperature of about 50°F. In some embodiments, the foam exhibits a K-factor of from about 0.150 Btu·in/ft$^2$·h·°F. to about 0.155 Btu·in/ft$^2$·h·°F. at a temperature of about 50°F. up to about 60 days after forming of the foam. In some embodiments, the foam exhibits a K-factor of from about 0.150 Btu·in/ft$^2$·h·°F. to about 0.155 Btu·in/ft$^2$·h·°F. at a temperature of about 50°F. from about 30 days to about 60 days after forming of the foam.

In some embodiments, a foam prepared from a blowing agent composition Z-1-chloro-2,3,3,3-tetrafluoroprop-1-ene and Z-1,1,1,4,4,4-hexafluoro-2-butene as described herein exhibits a K-factor of from about 0.158 Btu·in/ft$^2$·h·°F. to about 0.164 Btu·in/ft$^2$·h·°F. at a temperature of about 50°F. In some embodiments, the foam exhibits a K-factor of from about 0.158 Btu·in/ft$^2$·h·°F. to about 0.164 Btu·in/ft$^2$·h·°F. at a temperature of about 50°F. up to about 120 days after forming of the foam. In some embodiments, the foam exhibits a K-factor of from about 0.158 Btu·in/ft$^2$·h·°F. to about 0.164 Btu·in/ft$^2$·h·°F. at a temperature of about 50°F. from about 60 days to about 120 days after forming of the foam.

In some embodiments, a foam prepared from a blowing agent composition Z-1-chloro-2,3,3,3-tetrafluoroprop-1-ene and Z-1,1,1,4,4,4-hexafluoro-2-butene as described herein exhibits a K-factor of from about 0.132 Btu·in/ft$^2$·h·°F. to about 0.175 Btu·in/ft$^2$·h·°F. at a temperature of about 75°F.

In some embodiments, a foam prepared from a blowing agent composition Z-1-chloro-2,3,3,3-tetrafluoroprop-1-ene and Z-1,1,1,4,4,4-hexafluoro-2-butene as described herein exhibits a K-factor of from about 0.132 Btu·in/ft²·h·° F. to about 0.137 Btu·in/ft²·h·° F. at a temperature of about 75° F.

In some embodiments, a foam prepared from a blowing agent composition Z-1-chloro-2,3,3,3-tetrafluoroprop-1-ene and Z-1,1,1,4,4,4-hexafluoro-2-butene as described herein exhibits a K-factor of from about 0.155 Btu·in/ft²·h·° F. to about 0.161 Btu·in/ft²·h·° F. at a temperature of about 75° F. In some embodiments, the foam exhibits a K-factor of from about 0.155 Btu·in/ft²·h·° F. to about 0.161 Btu·in/ft²·h·° F. at a temperature of about 75° F. up to about 30 days after forming of the foam.

In some embodiments, a foam prepared from a blowing agent composition Z-1-chloro-2,3,3,3-tetrafluoroprop-1-ene and Z-1,1,1,4,4,4-hexafluoro-2-butene as described herein exhibits a K-factor of from about 0.164 Btu·in/ft²·h·° F. to about 0.168 Btu·in/ft²·h·° F. at a temperature of about 75° F. In some embodiments, the foam exhibits a K-factor of from about 0.164 Btu·in/ft²·h·° F. to about 0.168 Btu·in/ft²·h·° F. at a temperature of about 75° F. up to about 60 days after forming of the foam. In some embodiments, the foam exhibits a K-factor of from about 0.164 Btu·in/ft²·h·° F. to about 0.168 Btu·in/ft²·h·° F. at a temperature of about 75° F. from about 30 days to about 60 days after forming of the foam.

In some embodiments, a foam prepared from a blowing agent composition Z-1-chloro-2,3,3,3-tetrafluoroprop-1-ene and Z-1,1,1,4,4,4-hexafluoro-2-butene as described herein exhibits a K-factor of from about 0.168 Btu·in/ft²·h·° F. to about 0.172 Btu·in/ft²·h·° F. at a temperature of about 75° F. In some embodiments, the foam exhibits a K-factor of from about 0.168 Btu·in/ft²·h·° F. to about 0.172 Btu·in/ft²·h·° F. at a temperature of about 75° F. up to about 90 days after forming of the foam. In some embodiments, the foam exhibits a K-factor of from about 0.168 Btu·in/ft²·h·° F. to about 0.172 Btu·in/ft²·h·° F. at a temperature of about 75° F. from about 60 days to about 90 days after forming of the foam.

In some embodiments, a foam prepared from a blowing agent composition Z-1-chloro-2,3,3,3-tetrafluoroprop-1-ene and Z-1,1,1,4,4,4-hexafluoro-2-butene as described herein exhibits a K-factor of from about 0.170 Btu·in/ft²·h·° F. to about 0.175 Btu·in/ft²·h·° F. at a temperature of about 75° F. In some embodiments, the foam exhibits a K-factor of from about 0.170 Btu·in/ft²·h·° F. to about 0.175 Btu·in/ft²·h·° F. at a temperature of about 75° F. up to about 120 days after forming of the foam. In some embodiments, the foam exhibits a K-factor of from about 0.170 Btu·in/ft²·h·° F. to about 0.175 Btu·in/ft²·h·° F. at a temperature of about 75° F. from about 90 days to about 120 days after forming of the foam.

In some embodiments, the composition which is a blend of an A-side and a B-side comprises a blowing agent component which is a blend of Z-1-chloro-2,3,3,3-tetrafluoroprop-1-ene and E-1,1,1,4,4,4-hexafluoro-2-butene.

In some embodiments, the composition which is a blend of an A-side and a B-side comprises a blowing agent component which is a blend of Z-1-chloro-2,3,3,3-tetrafluoroprop-1-ene and E-1,1,1,4,4,4-hexafluoro-2-butene.

In some embodiments, the composition which is a blend of an A-side and a B-side comprises about 5 weight percent to about 15 weight percent Z-1-chloro-2,3,3,3-tetrafluoroprop-1-ene and about 5 weight percent to about 15 weight percent E-1,1,1,4,4,4-hexafluoro-2-butene.

In some embodiments, the composition which is a blend of an A-side and a B-side comprises about 5 weight percent to about 10 weight percent Z-1-chloro-2,3,3,3-tetrafluoroprop-1-ene and about 5 weight percent to about 15 weight percent E-1,1,1,4,4,4-hexafluoro-2-butene.

In some embodiments, the composition which is a blend of an A-side and a B-side comprises about 5 weight percent to about 7 weight percent Z-1-chloro-2,3,3,3-tetrafluoroprop-1-ene and about 5 weight percent to about 15 weight percent E-1,1,1,4,4,4-hexafluoro-2-butene.

In some embodiments, the composition which is a blend of an A-side and a B-side comprises about 10 weight percent to about 15 weight percent Z-1-chloro-2,3,3,3-tetrafluoroprop-1-ene and about 5 weight percent to about 15 weight percent E-1,1,1,4,4,4-hexafluoro-2-butene.

In some embodiments, the composition which is a blend of an A-side and a B-side comprises about 11 weight percent to about 13 weight percent Z-1-chloro-2,3,3,3-tetrafluoroprop-1-ene and about 5 weight percent to about 15 weight percent E-1,1,1,4,4,4-hexafluoro-2-butene.

In some embodiments, the composition which is a blend of an A-side and a B-side comprises about 13 weight percent to about 15 weight percent Z-1-chloro-2,3,3,3-tetrafluoroprop-1-ene and about 5 weight percent to about 15 weight percent E-1,1,1,4,4,4-hexafluoro-2-butene.

In some embodiments, the composition which is a blend of an A-side and a B-side comprises about 5 weight percent to about 15 weight percent Z-1-chloro-2,3,3,3-tetrafluoroprop-1-ene and about 5 weight percent to about 10 weight percent E-1,1,1,4,4,4-hexafluoro-2-butene.

In some embodiments, the composition which is a blend of an A-side and a B-side comprises about 5 weight percent to about 10 weight percent Z-1-chloro-2,3,3,3-tetrafluoroprop-1-ene and about 5 weight percent to about 10 weight percent E-1,1,1,4,4,4-hexafluoro-2-butene.

In some embodiments, the composition which is a blend of an A-side and a B-side comprises about 5 weight percent to about 7 weight percent Z-1-chloro-2,3,3,3-tetrafluoroprop-1-ene and about 5 weight percent to about 10 weight percent E-1,1,1,4,4,4-hexafluoro-2-butene.

In some embodiments, the composition which is a blend of an A-side and a B-side comprises about 10 weight percent to about 15 weight percent Z-1-chloro-2,3,3,3-tetrafluoroprop-1-ene and about 5 weight percent to about 10 weight percent E-1,1,1,4,4,4-hexafluoro-2-butene.

In some embodiments, the composition which is a blend of an A-side and a B-side comprises about 11 weight percent to about 13 weight percent Z-1-chloro-2,3,3,3-tetrafluoroprop-1-ene and about 5 weight percent to about 10 weight percent E-1,1,1,4,4,4-hexafluoro-2-butene.

In some embodiments, the composition which is a blend of an A-side and a B-side comprises about 13 weight percent to about 15 weight percent Z-1-chloro-2,3,3,3-tetrafluoroprop-1-ene and about 5 weight percent to about 10 weight percent E-1,1,1,4,4,4-hexafluoro-2-butene.

In some embodiments, the composition which is a blend of an A-side and a B-side comprises about 5 weight percent to about 15 weight percent Z-1-chloro-2,3,3,3-tetrafluoroprop-1-ene and about 6 weight percent to about 8 weight percent E-1,1,1,4,4,4-hexafluoro-2-butene.

In some embodiments, the composition which is a blend of an A-side and a B-side comprises about 5 weight percent to about 10 weight percent Z-1-chloro-2,3,3,3-tetrafluoroprop-1-ene and about 6 weight percent to about 8 weight percent E-1,1,1,4,4,4-hexafluoro-2-butene.

In some embodiments, the composition which is a blend of an A-side and a B-side comprises about 5 weight percent to about 7 weight percent Z-1-chloro-2,3,3,3-tetrafluoroprop-1-ene and about 6 weight percent to about 8 weight percent E-1,1,1,4,4,4-hexafluoro-2-butene.

In some embodiments, the composition which is a blend of an A-side and a B-side comprises about 10 weight percent to about 15 weight percent Z-1-chloro-2,3,3,3-tetrafluoroprop-1-ene and about 6 weight percent to about 8 weight percent E-1,1,1,4,4,4-hexafluoro-2-butene.

In some embodiments, the composition which is a blend of an A-side and a B-side comprises about 11 weight percent to about 13 weight percent Z-1-chloro-2,3,3,3-tetrafluoroprop-1-ene and about 6 weight percent to about 8 weight percent E-1,1,1,4,4,4-hexafluoro-2-butene.

In some embodiments, the composition which is a blend of an A-side and a B-side comprises about 13 weight percent to about 15 weight percent Z-1-chloro-2,3,3,3-tetrafluoroprop-1-ene and about 6 weight percent to about 8 weight percent E-1,1,1,4,4,4-hexafluoro-2-butene.

In some embodiments, a foam prepared from a blowing agent composition Z-1-chloro-2,3,3,3-tetrafluoroprop-1-ene and E-1,1,1,4,4,4-hexafluoro-2-butene as described herein exhibits a K-factor of from about 0.111 Btu·in/ft$^2$·h·° F. to about 0.144 Btu·in/ft$^2$·h·° F. at a temperature of about 20° F.

In some embodiments, a foam prepared from a blowing agent composition Z-1-chloro-2,3,3,3-tetrafluoroprop-1-ene and E-1,1,1,4,4,4-hexafluoro-2-butene as described herein exhibits a K-factor of from about 0.110 Btu·in/ft$^2$·h·° F. to about 0.114 Btu·in/ft$^2$·h·° F. at a temperature of about 20° F.

In some embodiments, a foam prepared from a blowing agent composition Z-1-chloro-2,3,3,3-tetrafluoroprop-1-ene and E-1,1,1,4,4,4-hexafluoro-2-butene as described herein exhibits a K-factor of from about 0.127 Btu·in/ft$^2$·h·° F. to about 0.131 Btu·in/ft$^2$·h·° F. at a temperature of about 20° F. In some embodiments, the foam exhibits a K-factor of from about 0.127 Btu·in/ft$^2$·h·° F. to about 0.131 Btu·in/ft$^2$·h·° F. at a temperature of about 20° F. up to about 30 days after forming of the foam.

In some embodiments, a foam prepared from a blowing agent composition Z-1-chloro-2,3,3,3-tetrafluoroprop-1-ene and E-1,1,1,4,4,4-hexafluoro-2-butene as described herein exhibits a K-factor of from about 0.138 Btu·in/ft$^2$·h·° F. to about 0.134 Btu·in/ft$^2$·h·° F. at a temperature of about 20° F. In some embodiments, the foam exhibits a K-factor of from about 0.138 Btu·in/ft$^2$·h·° F. to about 0.134 Btu·in/ft$^2$·h·° F. at a temperature of about 20° F. up to about 60 days after forming of the foam. In some embodiments, the foam exhibits a K-factor of from about 0.138 Btu·in/ft$^2$·h·° F. to about 0.134 Btu·in/ft$^2$·h·° F. at a temperature of about 20° F. from about 30 days to about 60 days after forming of the foam.

In some embodiments, a foam prepared from a blowing agent composition Z-1-chloro-2,3,3,3-tetrafluoroprop-1-ene and E-1,1,1,4,4,4-hexafluoro-2-butene as described herein exhibits a K-factor of from about 0.140 Btu·in/ft$^2$·h·° F. to about 0.145 Btu·in/ft$^2$·h·° F. at a temperature of about 20° F. In some embodiments, the foam exhibits a K-factor of from about 0.140 Btu·in/ft$^2$·h·° F. to about 0.145 Btu·in/ft$^2$·h·° F. at a temperature of about 20° F. up to about 120 days after forming of the foam. In some embodiments, the foam exhibits a K-factor of from about 0.140 Btu·in/ft$^2$·h·° F. to about 0.145 Btu·in/ft$^2$·h·° F. at a temperature of about 20° F. from about 60 days to about 120 days after forming of the foam.

In some embodiments, a foam prepared from a blowing agent composition Z-1-chloro-2,3,3,3-tetrafluoroprop-1-ene and E-1,1,1,4,4,4-hexafluoro-2-butene as described herein exhibits a K-factor of from about 0.115 Btu·in/ft$^2$·h·° F. to about 0.150 Btu·in/ft$^2$·h·° F. at a temperature of about 35° F.

In some embodiments, a foam prepared from a blowing agent composition Z-1-chloro-2,3,3,3-tetrafluoroprop-1-ene and E-1,1,1,4,4,4-hexafluoro-2-butene as described herein exhibits a K-factor of from about 0.115 Btu·in/ft$^2$·h·° F. to about 0.119 Btu·in/ft$^2$·h·° F. at a temperature of about 35° F.

In some embodiments, a foam prepared from a blowing agent composition Z-1-chloro-2,3,3,3-tetrafluoroprop-1-ene and E-1,1,1,4,4,4-hexafluoro-2-butene as described herein exhibits a K-factor of from about 0.131 Btu·in/ft$^2$·h·° F. to about 0.135 Btu·in/ft$^2$·h·° F. at a temperature of about 35° F. In some embodiments, the foam exhibits a K-factor of from about 0.131 Btu·in/ft$^2$·h·° F. to about 0.135 Btu·in/ft$^2$·h·° F. at a temperature of about 35° F. up to about 30 days after forming of the foam.

In some embodiments, a foam prepared from a blowing agent composition Z-1-chloro-2,3,3,3-tetrafluoroprop-1-ene and E-1,1,1,4,4,4-hexafluoro-2-butene as described herein exhibits a K-factor of from about 0.138 Btu·in/ft$^2$·h·° F. to about 0.142 Btu·in/ft$^2$·h·° F. at a temperature of about 35° F. In some embodiments, the foam exhibits a K-factor of from about 0.138 Btu·in/ft$^2$·h·° F. to about 0.142 Btu·in/ft$^2$·h·° F. at a temperature of about 35° F. up to about 60 days after forming of the foam. In some embodiments, the foam exhibits a K-factor of from about 0.138 Btu·in/ft$^2$·h·° F. to about 0.142 Btu·in/ft$^2$·h·° F. at a temperature of about 20° F. from about 30 days to about 60 days after forming of the foam.

In some embodiments, a foam prepared from a blowing agent composition Z-1-chloro-2,3,3,3-tetrafluoroprop-1-ene and E-1,1,1,4,4,4-hexafluoro-2-butene as described herein exhibits a K-factor of from about 0.146 Btu·in/ft$^2$·h·° F. to about 0.152 Btu·in/ft$^2$·h·° F. at a temperature of about 35° F. In some embodiments, the foam exhibits a K-factor of from about 0.146 Btu·in/ft$^2$·h·° F. to about 0.152 Btu·in/ft$^2$·h·° F. at a temperature of about 35° F. up to about 120 days after forming of the foam. In some embodiments, the foam exhibits a K-factor of from about 0.146 Btu·in/ft$^2$·h·° F. to about 0.152 Btu·in/ft$^2$·h·° F. at a temperature of about 35° F. from about 60 days to about 120 days after forming of the foam.

In some embodiments, a foam prepared from a blowing agent composition Z-1-chloro-2,3,3,3-tetrafluoroprop-1-ene and E-1,1,1,4,4,4-hexafluoro-2-butene as described herein exhibits a K-factor of from about 0.120 Btu·in/ft$^2$·h·° F. to about 0.156 Btu·in/ft$^2$·h·° F. at a temperature of about 50° F.

In some embodiments, a foam prepared from a blowing agent composition Z-1-chloro-2,3,3,3-tetrafluoroprop-1-ene and E-1,1,1,4,4,4-hexafluoro-2-butene as described herein exhibits a K-factor of from about 0.120 Btu·in/ft$^2$·h·° F. to about 0.124 Btu·in/ft$^2$·h·° F. at a temperature of about 50° F.

In some embodiments, a foam prepared from a blowing agent composition Z-1-chloro-2,3,3,3-tetrafluoroprop-1-ene and E-1,1,1,4,4,4-hexafluoro-2-butene as described herein exhibits a K-factor of from about 0.137 Btu·in/ft$^2$·h·° F. to about 0.141 Btu·in/ft$^2$·h·° F. at a temperature of about 50° F. In some embodiments, the foam exhibits a K-factor of from about 0.137 Btu·in/ft$^2$·h·° F. to about 0.141 Btu·in/ft$^2$·h·° F. at a temperature of about 50° F. up to about 30 days after forming of the foam.

In some embodiments, a foam prepared from a blowing agent composition Z-1-chloro-2,3,3,3-tetrafluoroprop-1-ene and E-1,1,1,4,4,4-hexafluoro-2-butene as described herein exhibits a K-factor of from about 0.144 Btu·in/ft$^2$·h·° F. to about 0.148 Btu·in/ft$^2$·h·° F. at a temperature of about 50° F. In some embodiments, the foam exhibits a K-factor of from about 0.144 Btu·in/ft²·h·° F. to about 0.148 Btu·in/ft²·h·° F. at a temperature of about 50° F. up to about 60 days after forming of the foam. In some embodiments, the foam exhibits a K-factor of from about 0.144 Btu·in/ft²·h·° F. to about 0.148 Btu·in/ft²·h·° F. at a temperature of about 50° F. from about 30 days to about 60 days after forming of the foam.

In some embodiments, a foam prepared from a blowing agent composition Z-1-chloro-2,3,3,3-tetrafluoroprop-1-ene and E-1,1,1,4,4,4-hexafluoro-2-butene as described herein exhibits a K-factor of from about 0.152 Btu·in/ft²·h·° F. to about 0.156 Btu·in/ft²·h·° F. at a temperature of about 50° F. In some embodiments, the foam exhibits a K-factor of from about 0.152 Btu·in/ft²·h·° F. to about 0.156 Btu·in/ft²·h·° F. at a temperature of about 50° F. up to about 120 days after forming of the foam. In some embodiments, the foam exhibits a K-factor of from about 0.152 Btu·in/ft²·h·° F. to about 0.156 Btu·in/ft²·h·° F. at a temperature of about 50° F. from about 60 days to about 120 days after forming of the foam.

In some embodiments, a foam prepared from a blowing agent composition Z-1-chloro-2,3,3,3-tetrafluoroprop-1-ene and E-1,1,1,4,4,4-hexafluoro-2-butene as described herein exhibits a K-factor of from about 0.130 Btu·in/ft²·h·° F. to about 0.168 Btu·in/ft²·h·° F. at a temperature of about 75° F.

In some embodiments, a foam prepared from a blowing agent composition Z-1-chloro-2,3,3,3-tetrafluoroprop-1-ene and E-1,1,1,4,4,4-hexafluoro-2-butene as described herein exhibits a K-factor of from about 0.130 Btu·in/ft²·h·° F. to about 0.135 Btu·in/ft²·h·° F. at a temperature of about 75° F.

In some embodiments, a foam prepared from a blowing agent composition Z-1-chloro-2,3,3,3-tetrafluoroprop-1-ene and E-1,1,1,4,4,4-hexafluoro-2-butene as described herein exhibits a K-factor of from about 0.148 Btu·in/ft²·h·° F. to about 0.153 Btu·in/ft²·h·° F. at a temperature of about 75° F. In some embodiments, the foam exhibits a K-factor of from about 0.148 Btu·in/ft²·h·° F. to about 0.153 Btu·in/ft²·h·° F. at a temperature of about 75° F. up to about 30 days after forming of the foam.

In some embodiments, a foam prepared from a blowing agent composition Z-1-chloro-2,3,3,3-tetrafluoroprop-1-ene and E-1,1,1,4,4,4-hexafluoro-2-butene as described herein exhibits a K-factor of from about 0.155 Btu·in/ft²·h·° F. to about 0.161 Btu·in/ft²·h·° F. at a temperature of about 75° F. In some embodiments, the foam exhibits a K-factor of from about 0.155 Btu·in/ft²·h·° F. to about 0.161 Btu·in/ft²·h·° F. at a temperature of about 75° F. up to about 60 days after forming of the foam. In some embodiments, the foam exhibits a K-factor of from about 0.155 Btu·in/ft²·h·° F. to about 0.161 Btu·in/ft²·h·° F. at a temperature of about 75° F. from about 30 days to about 60 days after forming of the foam.

In some embodiments, a foam prepared from a blowing agent composition Z-1-chloro-2,3,3,3-tetrafluoroprop-1-ene and E-1,1,1,4,4,4-hexafluoro-2-butene as described herein exhibits a K-factor of from about 0.164 Btu·in/ft²·h·° F. to about 0.168 Btu·in/ft²·h·° F. at a temperature of about 75° F. In some embodiments, the foam exhibits a K-factor of from about 0.164 Btu·in/ft²·h·° F. to about 0.168 Btu·in/ft²·h·° F. at a temperature of about 75° F. up to about 120 days after forming of the foam. In some embodiments, the foam exhibits a K-factor of from about 0.164 Btu·in/ft²·h·° F. to about 0.168 Btu·in/ft²·h·° F. at a temperature of about 75° F. from about 60 days to about 120 days after forming of the foam.

In some embodiments, the composition which is a blend of an A-side and a B-side comprises a blowing agent component which is a blend of Z-1-chloro-2,3,3,3-tetrafluoroprop-1-ene and E-1-chloro-3,3,3-trifluoropropene.

In some embodiments, the composition which is a blend of an A-side and a B-side comprises about 5 weight percent to about 15 weight percent Z-1-chloro-2,3,3,3-tetrafluoroprop-1-ene and about 5 weight percent to about 15 weight percent E-1-chloro-3,3,3-trifluoropropene.

In some embodiments, the composition which is a blend of an A-side and a B-side comprises about 5 weight percent to about 10 weight percent Z-1-chloro-2,3,3,3-tetrafluoroprop-1-ene and about 5 weight percent to about 15 weight percent E-1-chloro-3,3,3-trifluoropropene.

In some embodiments, the composition which is a blend of an A-side and a B-side comprises about 5 weight percent to about 7 weight percent Z-1-chloro-2,3,3,3-tetrafluoroprop-1-ene and about 5 weight percent to about 15 weight percent E-1-chloro-3,3,3-trifluoropropene.

In some embodiments, the composition which is a blend of an A-side and a B-side comprises about 10 weight percent to about 15 weight percent Z-1-chloro-2,3,3,3-tetrafluoroprop-1-ene and about 5 weight percent to about 15 weight percent E-1-chloro-3,3,3-trifluoropropene.

In some embodiments, the composition which is a blend of an A-side and a B-side comprises about 11 weight percent to about 13 weight percent Z-1-chloro-2,3,3,3-tetrafluoroprop-1-ene and about 5 weight percent to about 15 weight percent E-1-chloro-3,3,3-trifluoropropene.

In some embodiments, the composition which is a blend of an A-side and a B-side comprises about 13 weight percent to about 15 weight percent Z-1-chloro-2,3,3,3-tetrafluoroprop-1-ene and about 5 weight percent to about 15 weight percent E-1-chloro-3,3,3-trifluoropropene.

In some embodiments, the composition which is a blend of an A-side and a B-side comprises about 5 weight percent to about 15 weight percent Z-1-chloro-2,3,3,3-tetrafluoroprop-1-ene and about 5 weight percent to about 10 weight percent E-1-chloro-3,3,3-trifluoropropene.

In some embodiments, the composition which is a blend of an A-side and a B-side comprises about 5 weight percent to about 10 weight percent Z-1-chloro-2,3,3,3-tetrafluoroprop-1-ene and about 5 weight percent to about 10 weight percent E-1-chloro-3,3,3-trifluoropropene.

In some embodiments, the composition which is a blend of an A-side and a B-side comprises about 5 weight percent to about 7 weight percent Z-1-chloro-2,3,3,3-tetrafluoroprop-1-ene and about 5 weight percent to about 10 weight percent E-1-chloro-3,3,3-trifluoropropene.

In some embodiments, the composition which is a blend of an A-side and a B-side comprises about 10 weight percent to about 15 weight percent Z-1-chloro-2,3,3,3-tetrafluoroprop-1-ene and about 5 weight percent to about 10 weight percent E-1-chloro-3,3,3-trifluoropropene.

In some embodiments, the composition which is a blend of an A-side and a B-side comprises about 11 weight percent to about 13 weight percent Z-1-chloro-2,3,3,3-tetrafluoroprop-1-ene and about 5 weight percent to about 10 weight percent E-1-chloro-3,3,3-trifluoropropene.

In some embodiments, the composition which is a blend of an A-side and a B-side comprises about 13 weight percent to about 15 weight percent Z-1-chloro-2,3,3,3-tetrafluoroprop-1-ene and about 5 weight percent to about 10 weight percent E-1-chloro-3,3,3-trifluoropropene.

In some embodiments, the composition which is a blend of an A-side and a B-side comprises about 5 weight percent to about 15 weight percent Z-1-chloro-2,3,3,3-tetrafluoroprop-1-ene and about 6 weight percent to about 8 weight percent E-1-chloro-3,3,3-trifluoropropene.

In some embodiments, the composition which is a blend of an A-side and a B-side comprises about 5 weight percent to about 10 weight percent Z-1-chloro-2,3,3,3-tetrafluoroprop-1-ene and about 6 weight percent to about 8 weight percent E-1-chloro-3,3,3-trifluoropropene.

In some embodiments, the composition which is a blend of an A-side and a B-side comprises about 5 weight percent to about 7 weight percent Z-1-chloro-2,3,3,3-tetrafluoroprop-1-ene and about 6 weight percent to about 8 weight percent E-1-chloro-3,3,3-trifluoropropene.

In some embodiments, the composition which is a blend of an A-side and a B-side comprises about 10 weight percent to about 15 weight percent Z-1-chloro-2,3,3,3-tetrafluoroprop-1-ene and about 6 weight percent to about 8 weight percent E-1-chloro-3,3,3-trifluoropropene.

In some embodiments, the composition which is a blend of an A-side and a B-side comprises about 11 weight percent to about 13 weight percent Z-1-chloro-2,3,3,3-tetrafluoroprop-1-ene and about 6 weight percent to about 8 weight percent E-1-chloro-3,3,3-trifluoropropene.

In some embodiments, the composition which is a blend of an A-side and a B-side comprises about 13 weight percent to about 15 weight percent Z-1-chloro-2,3,3,3-tetrafluoroprop-1-ene and about 6 weight percent to about 8 weight percent E-1-chloro-3,3,3-trifluoropropene.

In some embodiments, a foam prepared from a blowing agent composition Z-1-chloro-2,3,3,3-tetrafluoroprop-1-ene and E-1-chloro-3,3,3-trifluoropropene as described herein exhibits a K-factor of from about 0.109 $Btu \cdot in/ft^2 \cdot h \cdot °F.$ to about 0.145 $Btu \cdot in/ft^2 \cdot h \cdot °F.$ at a temperature of about 20° F.

In some embodiments, a foam prepared from a blowing agent composition Z-1-chloro-2,3,3,3-tetrafluoroprop-1-ene and E-1-chloro-3,3,3-trifluoropropene as described herein exhibits a K-factor of from about 0.109 $Btu \cdot in/ft^2 \cdot h \cdot °F.$ to about 0.113 $Btu \cdot in/ft^2 \cdot h \cdot °F.$ at a temperature of about 20° F.

In some embodiments, a foam prepared from a blowing agent composition Z-1-chloro-2,3,3,3-tetrafluoroprop-1-ene and E-1-chloro-3,3,3-trifluoropropene as described herein exhibits a K-factor of from about 0.132 $Btu \cdot in/ft^2 \cdot h \cdot °F.$ to about 0.136 $Btu \cdot in/ft^2 \cdot h \cdot °F.$ at a temperature of about 20° F. In some embodiments, the foam exhibits a K-factor of from about 0.132 $Btu \cdot in/ft^2 \cdot h \cdot °F.$ to about 0.136 $Btu \cdot in/ft^2 \cdot h \cdot °F.$ at a temperature of about 20° F. up to about 30 days after forming of the foam.

In some embodiments, a foam prepared from a blowing agent composition Z-1-chloro-2,3,3,3-tetrafluoroprop-1-ene and E-1-chloro-3,3,3-trifluoropropene as described herein exhibits a K-factor of from about 0.140 $Btu \cdot in/ft^2 \cdot h \cdot °F.$ to about 0.145 $Btu \cdot in/ft^2 \cdot h \cdot °F.$ at a temperature of about 20° F. In some embodiments, the foam exhibits a K-factor of from about 0.140 $Btu \cdot in/ft^2 \cdot h \cdot °F.$ to about 0.145 $Btu \cdot in/ft^2 \cdot h \cdot °F.$ at a temperature of about 20° F. up to about 60 days after forming of the foam. In some embodiments, the foam exhibits a K-factor of from about 0.140 $Btu \cdot in/ft^2 \cdot h \cdot °F.$ to about 0.145 $Btu \cdot in/ft^2 \cdot h \cdot °F.$ at a temperature of about 20° F. from about 30 days to about 60 days after forming of the foam.

In some embodiments, a foam prepared from a blowing agent composition Z-1-chloro-2,3,3,3-tetrafluoroprop-1-ene and E-1-chloro-3,3,3-trifluoropropene as described herein exhibits a K-factor of from about 0.112 $Btu \cdot in/ft^2 \cdot h \cdot °F.$ to about 0.148 $Btu \cdot in/ft^2 \cdot h \cdot °F.$ at a temperature of about 35° F.

In some embodiments, a foam prepared from a blowing agent composition Z-1-chloro-2,3,3,3-tetrafluoroprop-1-ene and E-1-chloro-3,3,3-trifluoropropene as described herein exhibits a K-factor of from about 0.112 $Btu \cdot in/ft^2 \cdot h \cdot °F.$ to about 0.116 $Btu \cdot in/ft^2 \cdot h \cdot °F.$ at a temperature of about 35° F.

In some embodiments, a foam prepared from a blowing agent composition Z-1-chloro-2,3,3,3-tetrafluoroprop-1-ene and E-1-chloro-3,3,3-trifluoropropene as described herein exhibits a K-factor of from about 0.135 $Btu \cdot in/ft^2 \cdot h \cdot °F.$ to about 0.139 $Btu \cdot in/ft^2 \cdot h \cdot °F.$ at a temperature of about 35° F. In some embodiments, the foam exhibits a K-factor of from about 0.135 $Btu \cdot in/ft^2 \cdot h \cdot °F.$ to about 0.139 $Btu \cdot in/ft^2 \cdot h \cdot °F.$ at a temperature of about 35° F. up to about 30 days after forming of the foam.

In some embodiments, a foam prepared from a blowing agent composition Z-1-chloro-2,3,3,3-tetrafluoroprop-1-ene and E-1-chloro-3,3,3-trifluoropropene as described herein exhibits a K-factor of from about 0.144 $Btu \cdot in/ft^2 \cdot h \cdot °F.$ to about 0.148 $Btu \cdot in/ft^2 \cdot h \cdot °F.$ at a temperature of about 35° F. In some embodiments, the foam exhibits a K-factor of from about 0.144 $Btu \cdot in/ft^2 \cdot h \cdot °F.$ to about 0.148 $Btu \cdot in/ft^2 \cdot h \cdot °F.$ at a temperature of about 35° F. up to about 60 days after forming of the foam. In some embodiments, the foam exhibits a K-factor of from about 0.144 $Btu \cdot in/ft^2 \cdot h \cdot °F.$ to about 0.148 $Btu \cdot in/ft^2 \cdot h \cdot °F.$ at a temperature of about 35° F. from about 30 days to about 60 days after forming of the foam.

In some embodiments, a foam prepared from a blowing agent composition Z-1-chloro-2,3,3,3-tetrafluoroprop-1-ene and E-1-chloro-3,3,3-trifluoropropene as described herein exhibits a K-factor of from about 0.116 $Btu \cdot in/ft^2 \cdot h \cdot °F.$ to about 0.155 $Btu \cdot in/ft^2 \cdot h \cdot °F.$ at a temperature of about 50° F.

In some embodiments, a foam prepared from a blowing agent composition Z-1-chloro-2,3,3,3-tetrafluoroprop-1-ene and E-1-chloro-3,3,3-trifluoropropene as described herein exhibits a K-factor of from about 0.116 $Btu \cdot in/ft^2 \cdot h \cdot °F.$ to about 0.118 $Btu \cdot in/ft^2 \cdot h \cdot °F.$ at a temperature of about 50° F.

In some embodiments, a foam prepared from a blowing agent composition Z-1-chloro-2,3,3,3-tetrafluoroprop-1-ene and E-1-chloro-3,3,3-trifluoropropene as described herein exhibits a K-factor of from about 0.135 $Btu \cdot in/ft^2 \cdot h \cdot °F.$ to about 0.139 $Btu \cdot in/ft^2 \cdot h \cdot °F.$ at a temperature of about 50° F. In some embodiments, the foam exhibits a K-factor of from about 0.135 $Btu \cdot in/ft^2 \cdot h \cdot °F.$ to about 0.139 $Btu \cdot in/ft^2 \cdot h \cdot °F.$ at a temperature of about 50° F. up to about 30 days after forming of the foam.

In some embodiments, a foam prepared from a blowing agent composition Z-1-chloro-2,3,3,3-tetrafluoroprop-1-ene and E-1-chloro-3,3,3-trifluoropropene as described herein exhibits a K-factor of from about 0.144 $Btu \cdot in/ft^2 \cdot h \cdot °F.$ to about 0.148 $Btu \cdot in/ft^2 \cdot h \cdot °F.$ at a temperature of about 50° F. In some embodiments, the foam exhibits a K-factor of from about 0.144 $Btu \cdot in/ft^2 \cdot h \cdot °F.$ to about 0.148 $Btu \cdot in/ft^2 \cdot h \cdot °F.$ at a temperature of about 50° F. up to about 60 days after forming of the foam. In some embodiments, the foam exhibits a K-factor of from about 0.144 $Btu \cdot in/ft^2 \cdot h \cdot °F.$ to about 0.148 $Btu \cdot in/ft^2 \cdot h \cdot °F.$ at a temperature of about 50° F. from about 30 days to about 60 days after forming of the foam.

In some embodiments, a foam prepared from a blowing agent composition Z-1-chloro-2,3,3,3-tetrafluoroprop-1-ene and E-1-chloro-3,3,3-trifluoropropene as described herein exhibits a K-factor of from about 0.128 $Btu \cdot in/ft^2 \cdot h \cdot °F.$ to about 0.166 $Btu \cdot in/ft^2 \cdot h \cdot °F.$ at a temperature of about 75° F.

In some embodiments, a foam prepared from a blowing agent composition Z-1-chloro-2,3,3,3-tetrafluoroprop-1-ene and E-1-chloro-3,3,3-trifluoropropene as described herein exhibits a K-factor of from about 0.128 $Btu \cdot in/ft^2 \cdot h \cdot °F.$ to about 0.132 $Btu \cdot in/ft^2 \cdot h \cdot °F.$ at a temperature of about 75° F.

In some embodiments, a foam prepared from a blowing agent composition Z-1-chloro-2,3,3,3-tetrafluoroprop-1-ene and E-1-chloro-3,3,3-trifluoropropene as described herein exhibits a K-factor of from about 0.152 Btu·in/ft$^2$·h·°F. to about 0.156 Btu·in/ft$^2$·h·°F. at a temperature of about 75°F. In some embodiments, the foam exhibits a K-factor of from about 0.152 Btu·in/ft$^2$·h·°F. to about 0.156 Btu·in/ft$^2$·h·°F. at a temperature of about 75°F. up to about 30 days after forming of the foam.

In some embodiments, a foam prepared from a blowing agent composition Z-1-chloro-2,3,3,3-tetrafluoroprop-1-ene and E-1-chloro-3,3,3-trifluoropropene as described herein exhibits a K-factor of from about 0.162 Btu·in/ft$^2$·h·°F. to about 0.167 Btu·in/ft$^2$·h·°F. at a temperature of about 75°F. In some embodiments, the foam exhibits a K-factor of from about 0.162 Btu·in/ft$^2$·h·°F. to about 0.167 Btu·in/ft$^2$·h·°F. at a temperature of about 75°F. up to about 60 days after forming of the foam. In some embodiments, the foam exhibits a K-factor of from about 0.162 Btu·in/ft$^2$·h·°F. to about 0.167 Btu·in/ft$^2$·h·°F. at a temperature of about 75°F. from about 30 days to about 60 days after forming of the foam.

In some embodiments, the composition which is a blend of an A-side and a B-side further comprises water.

In some embodiments, the composition which is a blend of an A-side and a B-side further comprises about 1 weight percent to about 5 weight percent water.

In some embodiments, the composition which is a blend of an A-side and a B-side further comprises about 1 weight percent to about 3 weight percent water.

In some embodiments, the composition which is a blend of an A-side and a B-side further comprises about 1 weight percent to about 2 weight percent water.

In some embodiments of the methods and systems provided herein, a one component foam is formed containing a blowing agent in accordance with the present invention. In some embodiments the foam is a polyurethane foam containing a blowing agent in accordance with the present invention. In some embodiments, a portion of the blowing agent is contained in the foam forming agent, for example, by being dissolved in a foam forming agent which is liquid at the pressure within the container, and a second portion of the blowing agent is present as a separate gas phase. In such systems, the contained/dissolved blowing agent performs, in large part, to cause the expansion of the foam, and the separate gas phase operates to impart propulsive force to the foam forming agent.

In some embodiments, the one component systems is packaged in a container, such as an aerosol type can. In some embodiments, the blowing agent described herein provides for expansion of the foam. In some embodiments, the blowing agent described herein provides for the energy to transport the foam/foamable material from the package. In some embodiments, the blowing agent described herein provides for expansion of the foam and the energy to transport the foam/foamable material from the package. In some embodiments, such systems and methods comprise charging the package with a fully formulated system (such as an isocyanate/polyol system) and incorporating a gaseous blowing agent in accordance with the present invention into the package, such as an aerosol type can.

In some embodiments, it is desirable to utilize the present compositions when in the supercritical or near supercritical state as a blowing agent.

Also provided herein are foams, including, but not limited to, closed cell foams, open cell foams, spray foams, panel foams, rigid foams, flexible foams, integral skins and the like, prepared from a polymer foam formulation containing a blowing agent comprising or consisting essentially of Z-HCFO-1224yd, either alone or in combination with one or more other compounds.

One advantage of the foams, for example, thermoset foams, such as polyurethane foams, in accordance with the present invention, is the ability to achieve exceptional thermal performance. In some embodiments, thermal performance is measured by the K-factor or lambda, for example, under low temperature conditions. The foams provided herein, such as the thermoset foams provided herein, can be used in a wide variety of application. In some embodiments, the foams include appliance foams, including refrigerator foams, freezer foams, refrigerator/freezer foams, panel foams, and other cold or cryogenic manufacturing applications.

In some embodiments, the foams provide one or more exceptional features, characteristics and/or properties, including: thermal insulation efficiency (particularly for thermoset foams), dimensional stability, compressive strength, aging of thermal insulation properties, all in addition to the low ozone depletion potential and low global warming potential associated with many of the blowing agents described herein. In some embodiments, provided are thermoset foams, including such foams formed into foam articles, which exhibit improved thermal conductivity relative to foams made using the same blowing agent (or a commonly used blowing agent such as HFC-245fa) in the same amount but without Z-HCFO-1224yd.

In some embodiments, the foams exhibit improved mechanical properties relative to foams produced with blowing agents outside the scope of the present invention. In some embodiments, provided are foams and foam articles having a compressive strength which is superior to, and at least about 10 relative percent, or at least about 15 relative percent greater than a foam produced under substantially identical conditions by utilizing a blowing agent consisting of cyclopentane.

In some embodiments, the foams produced according to the methods provided herein have compressive strengths that are on a commercial basis comparable to the compressive strength produced by making a foam under substantially the same conditions except wherein the blowing agent consists of HFC-245fa. In some embodiments, the foams provided herein exhibit a compressive strength of at least about 12.5% yield (in the parallel and perpendicular directions), or at least about 13% yield in each of said directions.

Methods and Systems

Table 1 above describes compositions which comprise or consist essentially of Z-HCFO-1224yd. In some embodiments, the compositions are useful in connection with numerous methods and systems, including as heat transfer fluids in methods and systems for transferring heat, such as refrigerants used in refrigeration, air conditioning, including vehicle air conditioning systems, and heat pump systems. In some embodiments, the compositions are useful in systems and methods of generating aerosols, such as those comprising or consisting of the aerosol propellant in such systems and methods. In some embodiments, methods of forming foams and methods of extinguishing and suppressing fire are also provided. In some embodiments, provided are methods of removing residue from articles in which the present compositions are used as solvent compositions in such methods and systems.

Heat Transfer Methods

Provided herein are heat transfer methods using the compositions provided herein. In some embodiments, the heat transfer method comprises providing a composition comprising or consisting essentially of Z-HCFO-1224yd and causing heat to be transferred to or from the composition changing the phase of the composition. In some embodiments, the composition comprising or consisting essentially of Z-HCFO-1224yd is a blend as described in Table 1. In some embodiments, the composition comprising or consisting essentially of Z-HCFO-1224yd is a blend as described in Table 2 below. In some embodiments, the method provides cooling by absorbing heat from a fluid or article, such as by evaporating the present refrigerant composition in the vicinity of the body or fluid to be cooled to produce vapor comprising or consisting essentially of Z-HCFO-1224yd.

In some embodiments of the heat transfer methods, the composition is a blend of Z-HCFO-1224yd and one or more additional compounds. In some embodiments of the heat transfer methods, Z-HCFO-1224yd forms a blend composition with one or more of an HFO, HFE, hydrocarbon, alcohol, ether, aldehyde, ketone, or other compound, such as water, methyl formate, ethyl formate, formic acid, trans-1, 2-dichloroethylene, $CO_2$, and others. In some embodiments of the heat transfer methods, the other compound or compounds comprise between about 1% and about 99% by weight of the composition. For example, about 1% to about 90%, about 1% to about 80%, about 1% to about 70%, about 1% to about 60%, about 1% to about 50%, about 1% to about 40%, about 1% to about 30%, about 1% to about 20%, about 1% to about 10%, about 1% to about 5%, about 5% to about 99%, about 5% to about 95%, about 5% to about 75%, about 5% to about 50%, about 5% to about 25%, about 10% to about 99%, about 10% to about 90%, about 10% to about 75%, about 10% to about 50%, about 10% to about 25%, about 25% to about 99%, about 25% to about 90%, about 25% to about 75%, about 25% to about 50%, about 40% to about 60%, about 45% to about 55%, about 50% to about 99%, about 50% to about 75%, about 60% to about 99%, about 60% to about 75%, or about 75% to about 99% by weight of the composition.

In some embodiments of the heat transfer methods, the composition comprising Z-HCFO-1224yd is a blend composition with the compounds shown in Table 2 below (with all percentages being in percent by weight and being understood to be proceeded by the word "about").

TABLE 2

| Blend Composition | | | |
|---|---|---|---|
| Compound Mixed with Z-HCFO-1224yd | Preferred Ranges wt % | More Preferred Ranges wt % | Most Preferred Ranges wt % |
| HFOs | | | |
| HFO-1234ze (E&Z) | 10 to 90 | 25 to 75 | 40-60, 45-55 or 50/50 |
| HFO-1234yf | 10 to 90 | 25 to 75 | 40-60, 45-55 or 50/50 |
| HFO-1225ye (E&Z) | 10 to 90 | 25 to 75 | 40-60, 45-55 or 50/50 |
| HFO-1225yc | 10 to 90 | 25 to 75 | 40-60, 45-55 or 50/50 |
| HFO-1216 | 10 to 90 | 25 to 75 | 40-60, 45-55 or 50/50 |
| HFO-1233zd (E&Z) | 10 to 90 | 25 to 75 | 40-60, 45-55 or 50/50 |
| HFO-1233xf | 10 to 90 | 25 to 75 | 40-60, 45-55 or 50/50 |
| HFO-1243zf | 10 to 90 | 25 to 75 | 40-60, 45-55 or 50/50 |
| HFO-1336mzz (E&Z) | 10 to 90 | 25 to 75 | 40-60, 45-55 or 50/50 |
| $(CF_3)_2CFCH=CHF$ (E&Z) | 10 to 90 | 25 to 75 | 40-60, 45-55 or 50/50 |
| $(C_2F_5)(CF_3)C=CH_2$ | 10 to 90 | 25 to 75 | 40-60, 45-55 or 50/50 |
| $(CF_3)_2CFCH=CF_2$ | 10 to 90 | 25 to 75 | 40-60, 45-55 or 50/50 |
| $(CF_3)_2CFCF=CHF$ (E&Z) | 10 to 90 | 25 to 75 | 40-60, 45-55 or 50/50 |
| HFCs | | | |
| HFC-245fa | 10 to 90 | 25 to 75 | 40-60, 45-55 or 50/50 |
| HFC-245cb | 10 to 90 | 25 to 75 | 40-60, 45-55 or 50/50 |
| HFC-245ca | 10 to 90 | 25 to 75 | 40-60, 45-55 or 50/50 |
| HFC-245eb | 10 to 90 | 25 to 75 | 40-60, 45-55 or 50/50 |
| HFC-227ea | 10 to 90 | 25 to 75 | 40-60, 45-55 or 50/50 |
| HFC-254eb | 10 to 90 | 25 to 75 | 40-60, 45-55 or 50/50 |
| HFC-236ea | 10 to 90 | 25 to 75 | 40-60, 45-55 or 50/50 |
| HFC-236fa | 10 to 90 | 25 to 75 | 40-60, 45-55 or 50/50 |
| HFC-134 | 10 to 90 | 25 to 75 | 40-60, 45-55 or 50/50 |
| HFC-134a | 10 to 90 | 25 to 75 | 40-60, 45-55 or 50/50 |
| HFC-152 | 10 to 90 | 25 to 75 | 40-60, 45-55 or 50/50 |
| HFC-152a | 10 to 90 | 25 to 75 | 40-60, 45-55 or 50/50 |
| HFC-32 | 10 to 90 | 25 to 75 | 40-60, 45-55 or 50/50 |
| HFC-125 | 10 to 90 | 25 to 75 | 40-60, 45-55 or 50/50 |
| HFC-143a | 10 to 90 | 25 to 75 | 40-60, 45-55 or 50/50 |
| HFC-365mfc | 10 to 90 | 25 to 75 | 40-60, 45-55 or 50/50 |
| HFC-161 | 10 to 90 | 25 to 75 | 40-60, 45-55 or 50/50 |
| HFC-43-10mee | 10 to 90 | 25 to 75 | 40-60, 45-55 or 50/50 |
| HFC-23 | 10 to 90 | 25 to 75 | 40-60, 45-55 or 50/50 |
| HFEs | | | |
| $CHF_2-O-CHF_2$ | 10 to 90 | 25 to 75 | 40-60, 45-55 or 50/50 |
| $CHF_2-O-CH_2F$ | 10 to 90 | 25 to 75 | 40-60, 45-55 or 50/50 |
| $CH_2F-O-CH_2F$ | 10 to 90 | 25 to 75 | 40-60, 45-55 or 50/50 |
| $CH_2F-O-CH_3$ | 10 to 90 | 25 to 75 | 40-60, 45-55 or 50/50 |
| cyclo-$CF_2-CH_2-CF_2-O$ | 10 to 90 | 25 to 75 | 40-60, 45-55 or 50/50 |
| cyclo-$CF_2-CF_2-CH_2-O$ | 10 to 90 | 25 to 75 | 40-60, 45-55 or 50/50 |
| $CHF_2-O-CF_2-CHF_2$ | 10 to 90 | 25 to 75 | 40-60, 45-55 or 50/50 |
| $CF_3-CF_2-O-CH_2F$ | 10 to 90 | 25 to 75 | 40-60, 45-55 or 50/50 |
| $CHF_2-O-CHF-CF_3$ | 10 to 90 | 25 to 75 | 40-60, 45-55 or 50/50 |
| $CHF_2-O-CF_2-CHF_2$ | 10 to 90 | 25 to 75 | 40-60, 45-55 or 50/50 |

TABLE 2-continued

| Blend Composition | | | |
|---|---|---|---|
| Compound Mixed with Z-HCFO-1224yd | Preferred Ranges wt % | More Preferred Ranges wt % | Most Preferred Ranges wt % |
| $CH_2F\text{—}O\text{—}CF_2\text{—}CHF_2$ | 10 to 90 | 25 to 75 | 40-60, 45-55 or 50/50 |
| $CF_3\text{—}O\text{—}CF_2\text{—}CH_3$ | 10 to 90 | 25 to 75 | 40-60, 45-55 or 50/50 |
| $CHF_2\text{—}CHF\text{—}O\text{—}CHF_2$ | 10 to 90 | 25 to 75 | 40-60, 45-55 or 50/50 |
| $CF_3\text{—}O\text{—}CHF\text{—}CH_2F$ | 10 to 90 | 25 to 75 | 40-60, 45-55 or 50/50 |
| $CF_3\text{—}CHF\text{—}O\text{—}CH_2F$ | 10 to 90 | 25 to 75 | 40-60, 45-55 or 50/50 |
| $CF_3\text{—}O\text{—}CH_2\text{—}CHF_2$ | 10 to 90 | 25 to 75 | 40-60, 45-55 or 50/50 |
| $CHF_2\text{—}O\text{—}CH_2\text{—}CF_3$ | 10 to 90 | 25 to 75 | 40-60, 45-55 or 50/50 |
| $CH_2F\text{—}CF_2\text{—}O\text{—}CH_2F$ | 10 to 90 | 25 to 75 | 40-60, 45-55 or 50/50 |
| $CHF_2\text{—}O\text{—}CF_2\text{—}CH_3$ | 10 to 90 | 25 to 75 | 40-60, 45-55 or 50/50 |
| $CHF_2\text{—}CF_2\text{—}O\text{—}CH_3$ | 10 to 90 | 25 to 75 | 40-60, 45-55 or 50/50 |
| $CH_2F\text{—}O\text{—}CHF\text{—}CH_2F$ | 10 to 90 | 25 to 75 | 40-60, 45-55 or 50/50 |
| $CHF_2\text{—}CHF\text{—}O\text{—}CH_2F$ | 10 to 90 | 25 to 75 | 40-60, 45-55 or 50/50 |
| $CF_3\text{—}O\text{—}CHF\text{—}CH_3$ | 10 to 90 | 25 to 75 | 40-60, 45-55 or 50/50 |
| $CF_3\text{—}CHF\text{—}O\text{—}CH_3$ | 10 to 90 | 25 to 75 | 40-60, 45-55 or 50/50 |
| $CHF_2\text{—}O\text{—}CH_2\text{—}CHF_2$ | 10 to 90 | 25 to 75 | 40-60, 45-55 or 50/50 |
| $CF_3\text{—}O\text{—}CH_2\text{—}CH_2F$ | 10 to 90 | 25 to 75 | 40-60, 45-55 or 50/50 |
| $CF_3\text{—}CH_2\text{—}O\text{—}CH_2F$ | 10 to 90 | 25 to 75 | 40-60, 45-55 or 50/50 |
| $CF_2H\text{—}CF_2\text{—}CF_2\text{—}O\text{—}CH_3$ | 10 to 90 | 25 to 75 | 40-60, 45-55 or 50/50 |
| Hydrocarbons | | | |
| propane | 10 to 90 | 25 to 75 | 40-60, 45-55 or 50/50 |
| propylene | 10 to 90 | 25 to 75 | 40-60, 45-55 or 50/5 |
| butane | 10 to 90 | 25 to 75 | 40-60, 45-55 or 50/50 |
| isobutane | 10 to 90 | 25 to 75 | 40-60, 45-55 or 50/50 |
| n-pentane (high HFO) | 10 to 90 | 25 to 75 | 40-60, 45-55 or 50/50 |
| n-pentane (high n-pentane) | 10 to 90 | 25 to 75 | 40-60, 45-55 or 50/50 |
| isopentane (high HFO) | 10 to 90 | 25 to 75 | 40-60, 45-55 or 50/50 |
| isopentane (high isopentane) | 10 to 90 | 25 to 75 | 40-60, 45-55 or 50/50 |
| neopentane (high HFO) | 10 to 90 | 25 to 75 | 40-60, 45-55 or 50/50 |
| neopentane (high neopentane) | 10 to 90 | 25 to 75 | 40-60, 45-55 or 50/50 |
| cyclopentane (high HFO) | 10 to 90 | 25 to 75 | 40-60, 45-55 or 50/50 |
| cyclopentane (high cyclopentane) | 10 to 90 | 25 to 75 | 40-60, 45-55 or 50/50 |
| n-hexane | 10 to 90 | 25 to 75 | 40-60, 45-55 or 50/50 |
| isohexane | 10 to 90 | 25 to 75 | 40-60, 45-55 or 50/50 |
| heptane | 10 to 90 | 25 to 75 | 40-60, 45-55 or 50/50 |
| Ethers | | | |
| dimethyl ether | 10 to 90 | 25 to 75 | 40-60, 45-55 or 50/50 |
| methylethyl ether | 10 to 90 | 25 to 75 | 40-60, 45-55 or 50/50 |
| diethyl ether | 10 to 90 | 25 to 75 | 40-60, 45-55 or 50/50 |
| methylpropyl ether | 10 to 90 | 25 to 75 | 40-60, 45-55 or 50/50 |
| methylisopropyl ether | 10 to 90 | 25 to 75 | 40-60, 45-55 or 50/50 |
| ethylpropyl ether | 10 to 90 | 25 to 75 | 40-60, 45-55 or 50/50 |
| ethylisopropyl ether | 10 to 90 | 25 to 75 | 40-60, 45-55 or 50/50 |
| dipropyl ether | 10 to 90 | 25 to 75 | 40-60, 45-55 or 50/50 |
| diisopropyl ether | 10 to 90 | 25 to 75 | 40-60, 45-55 or 50/50 |
| dimethoxymethane | 10 to 90 | 25 to 75 | 40-60, 45-55 or 50/50 |
| diethoxymethane | 10 to 90 | 25 to 75 | 40-60, 45-55 or 50/50 |
| dipropoxymethane | 10 to 90 | 25 to 75 | 40-60, 45-55 or 50/50 |
| dibutoxymethane | 10 to 90 | 25 to 75 | 40-60, 45-55 or 50/50 |
| Aldehydes | | | |
| formaldehyde | 10 to 90 | 25 to 75 | 40-60, 45-55 or 50/50 |
| acetaldehyde | 10 to 90 | 25 to 75 | 40-60, 45-55 or 50/50 |
| propanal | 10 to 90 | 25 to 75 | 40-60, 45-55 or 50/50 |
| butanal | 10 to 90 | 25 to 75 | 40-60, 45-55 or 50/50 |
| isobutanal | 10 to 90 | 25 to 75 | 40-60, 45-55 or 50/50 |
| Ketones | | | |
| Acetone | 10 to 90 | 25 to 75 | 40-60, 45-55 or 50/50 |
| Methylethylketone | 10 to 90 | 25 to 75 | 40-60, 45-55 or 50/50 |
| methylisobutylketone | 10 to 90 | 25 to 75 | 40-60, 45-55 or 50/50 |
| perfluoroethylisopropylketone $(C_2F_5C(O)CF(CF_3)_2$ | 10 to 90 | 25 to 75 | 40-60, 45-55 or 50/50 |
| Others | | | |
| water | 10 to 90 | 25 to 75 | 40-60, 45-55 or 50/50 |
| methyl formate | 10 to 90 | 25 to 75 | 40-60, 45-55 or 50/50 |
| ethyl formate | 10 to 90 | 25 to 75 | 40-60, 45-55 or 50/50 |
| formic acid | 10 to 90 | 25 to 75 | 40-60, 45-55 or 50/50 |
| trans-1,2-dichloroethylene (t-DCE) | 10 to 90 | 25 to 75 | 40-60, 45-55 or 50/50 |
| $CO_2$ | 10 to 90 | 25 to 75 | 40-60, 45-55 or 50/50 |
| HCFO-1232xf | 10 to 90 | 25 to 75 | 40-60, 45-55 or 50/50 |

TABLE 2-continued

Blend Composition

| Compound Mixed with Z-HCFO-1224yd | Preferred Ranges wt % | More Preferred Ranges wt % | Most Preferred Ranges wt % |
|---|---|---|---|
| HCFO-1223xd | 10 to 90 | 25 to 75 | 40-60, 45-55 or 50/50 |
| HCFO-1233xf | 10 to 90 | 25 to 75 | 40-60, 45-55 or 50/50 |
| HCFO-1233zd (E&Z) | 10 to 90 | 25 to 75 | 40-60, 45-55 or 50/50 |
| HCFO-1224yd (E) | 10 to 90 | 25 to 75 | 40-60, 45-55 or 50/50 |
| CFC-13 (CF$_3$Cl) | 10 to 90 | 25 to 75 | 40-60, 45-55 or 50/50 |
| HCFO-1121a (CHF=CCl$_2$) | 10 to 90 | 25 to 75 | 40-60, 45-55 or 50/50 |
| HCFO-1121 (CFCl=CHCl) | 10 to 90 | 25 to 75 | 40-60, 45-55 or 50/50 |
| HCFO-1131a (CH$_2$=CFCl) | 10 to 90 | 25 to 75 | 40-60, 45-55 or 50/50 |
| HCFO-1131 (CHF=CHCl) | 10 to 90 | 25 to 75 | 40-60, 45-55 or 50/50 |
| HCFO-1122 (CF$_2$=CHCl) | 10 to 90 | 25 to 75 | 40-60, 45-55 or 50/50 |
| HCFO-1113 (CF$_2$=CFCl) | 10 to 90 | 25 to 75 | 40-60, 45-55 or 50/50 |
| CH$_2$=CHCl | 10 to 90 | 25 to 75 | 40-60, 45-55 or 50/50 |
| CH$_3$Cl | 10 to 90 | 25 to 75 | 40-60, 45-55 or 50/50 |
| HCFC-133a (CF$_3$CH$_2$Cl) | 10 to 90 | 25 to 75 | 40-60, 45-55 or 50/50 |
| CFC-115 (CF$_3$CF$_2$Cl) | 10 to 90 | 25 to 75 | 40-60, 45-55 or 50/50 |
| 3,3,3-Trifluoropropyne | 10 to 90 | 25 to 75 | 40-60, 45-55 or 50/50 |
| HCFC-124 (CF$_3$CHFCl) | 10 to 90 | 25 to 75 | 40-60, 45-55 or 50/50 |
| HCC-40 (CH$_3$Cl) | 10 to 90 | 25 to 75 | 40-60, 45-55 or 50/50 |
| HCFC-22 (CF$_2$HCl) | 10 to 90 | 25 to 75 | 40-60, 45-55 or 50/50 |
| cis-HFO-1234ze + HFO-1225yeZ | 10 to 90 | 25 to 75 | 40-60, 45-55 or 50/50 |
| 2-fluoro-3-(trifluoromethyl)oxirane | 10 to 90 | 25 to 75 | 40-60, 45-55 or 50/50 |
| 2-fluoro-3-(perfluoropropan-2-yl)oxirane | 10 to 90 | 25 to 75 | 40-60, 45-55 or 50/50 |
| 2,3-bis(trifluoromethyl)oxirane | 10 to 90 | 25 to 75 | 40-60, 45-55 or 50/50 |
| 2-(trifluoromethyl)-3-(perfluoroethyl)oxirane | 10 to 90 | 25 to 75 | 40-60, 45-55 or 50/50 |
| 2-(trifluoromethyl)-3-(perfluoropropan-2-yl)oxirane | 10 to 90 | 25 to 75 | 40-60, 45-55 or 50/50 |
| 2,3-bis(perfluoropropyl)oxirane | 10 to 90 | 25 to 75 | 40-60, 45-55 or 50/50 |
| 2-(perfluorobutyl)-3-(perfluoroethyl)oxirane | 10 to 90 | 25 to 75 | 40-60, 45-55 or 50/50 |
| 2,3-bis(perfluorobutyl)oxirane; | 10 to 90 | 25 to 75 | 40-60, 45-55 or 50/50 |
| 2-(2,2,2-trifluoroethoxy)-2-(trifluoromethyl)-3-(perfluoroethyl)oxirane | 10 to 90 | 25 to 75 | 40-60, 45-55 or 50/50 |
| 2,3-dichloro-2,3-bis(trifluoromethyl)oxirane | 10 to 90 | 25 to 75 | 40-60, 45-55 or 50/50 |
| 2,2,3,3,4,4-hexafluoro-6-oxa-bicyclo[3.1.0]hexane | 10 to 90 | 25 to 75 | 40-60, 45-55 or 50/50 |
| 2,2,3,3-tetrafluoro-5-oxabicyclo[2.1.0]pentane | 10 to 90 | 25 to 75 | 40-60, 45-55 or 50/50 |
| 2,3-difluoro-2-(perfluoroethyl)-3-(perfluoropropyl)oxirane | 10 to 90 | 25 to 75 | 40-60, 45-55 or 50/50 |
| 2,3-difluoro-2-(trifluoromethyl)-3-(perfluoropentyl)oxirane; | 10 to 90 | 25 to 75 | 40-60, 45-55 or 50/50 |
| Mixtures of any of the above plus water | 1 to 99% H$_2$O | 5 to 95% H$_2$O | 10 to 90% H$_2$O |
| Mixtures of any of the above plus CO2 | 1 to 99% CO$_2$ | 5 to 95% CO$_2$ | 10 to 90% CO$_2$ |
| Mixtures of any of the above plus t-DCE | 1 to 99% t-DCE | 5 to 95% t-DCE | 10 to 90% t-DCE |
| Mixtures of any of the above plus methyl formate | 1 to 99% MF | 5 to 95% MF | 10 to 90% MF |
| Mixtures with cis-HFO-1234ze + CO$_2$ | 10 to 90 | 5 to 95 | 10 to 90 |
| Mixtures with cis-HFO-1234ze + CO$_2$ + 1225yeZ | 10 to 90 | 5 to 95 | 10 to 90 |
| Mixtures with cis-HFO-1234ze + HFC-245fa | 10 to 90 | 5 to 95 | 10 to 90 |

In some embodiments, the methods further include compressing the refrigerant vapor, for example, with a compressor or similar equipment, to produce vapor of the present composition at a relatively elevated pressure. In some embodiments, the step of compressing the vapor results in the addition of heat to the vapor, thus causing an increase in the temperature of the relatively high-pressure vapor. In some embodiments, the present methods include removing from this relatively high temperature, high pressure vapor at least a portion of the heat added by the evaporation and compression steps. In some embodiments, the heat removal step includes condensing the high temperature, high-pressure vapor while the vapor is in a relatively high-pressure condition to produce a relatively high-pressure liquid comprising or consisting essentially of Z-HCFO-1224yd. In some embodiments, this relatively high-pressure liquid then undergoes a nominally isoenthalpic reduction in pressure to produce a relatively low temperature, low-pressure liquid. In some embodiments, it is this reduced temperature refrigerant liquid which is then vaporized by heat transferred from the body or fluid to be cooled.

In some embodiments, the compositions provided herein are used in a method for producing cooling which comprises evaporating a refrigerant comprising or consisting essentially of Z-HCFO-1224yd in the vicinity of a liquid or body to be cooled. In some embodiments, the refrigerant comprising or consisting essentially of Z-HCFO-1224yd is a blend as described in Table 2.

In some embodiments, the compositions provided herein are used in a method for producing heating which comprises condensing a refrigerant comprising or consisting essentially of Z-HCFO-1224yd in the vicinity of a liquid or body to be heated. In some embodiments, the refrigerant comprising or consisting essentially of Z-HCFO-1224yd is a blend as described in Table 2. In some embodiments, the methods are similar to the refrigeration cycle described above, except that their primary objective is the release of heat at the condenser instead of the withdrawal of heat at the evaporator.

In some embodiments of the heat transfer methods, the Z-HCFO-1224yd comprises from about 1 wt % to about 99 wt %, such as about 30 wt % to about 99 wt %; about 50 wt % to about 99 wt %; about 75 wt % to about 99 wt %; about 85 wt % to about 99 wt %; about 20 wt % to about 80 wt %; about 90 wt % to about 99 wt %; about 95 wt % to about 99 wt %; about 1 wt % to about 20 wt %; about 1 wt % to about 40 wt %; about 1 wt % to about 50 wt %; about 5 wt % to about 20 wt %; about 5 wt % to about 40 wt %; about 5 wt % to about 60 wt %; about 10 wt % to about 80 wt %; about 10 wt % to about 90 wt %; about 20 wt % to about 80 wt %; or about 20 wt % to about 90 wt % of the composition. Other ranges of amounts are shown in Table 2, and those amounts are likewise applicable for this use of the composition of the invention.

Refrigerant Compositions and Systems

In some embodiments, the present methods, systems and compositions comprising or consisting essentially of Z-HCFO-1224yd are adaptable for use in connection with air conditioning systems and devices, including automotive air conditioning systems, commercial refrigeration systems and devices (including medium and low temperature refrigeration systems and transport refrigeration), chillers, residential refrigerator and freezers, general air conditioning systems, including residential and window air conditioners, chillers, and heat pumps. In some embodiments, the compositions are blends as described in Table 2, above. In some embodiments, condenser temperatures range from about 20° C. to 55° C. In some embodiments, evaporator temperatures range from >0° C. to 15° C. for air conditioners, about −15° C. to 0° C. for heat pumps, about −20° C. to 5° C. for medium temperature refrigeration and about −45° C. to −20° C. for low temperature refrigeration. This also includes high temperature heat pumps (with condenser temperatures greater than about 55° C., 70° C., or 100° C.) and the like.

Many existing refrigeration systems are currently adapted for use in connection with existing refrigerants, and the compositions of the present invention are believed to be adaptable for use in many of such systems, either with or without system modification. In some embodiments, the compositions of the present invention provide an advantage as a replacement in systems which are currently based on refrigerants having a relatively high capacity. In some embodiments, where it is desired to use a lower capacity refrigerant composition of the present invention for reasons of efficiency, for example, to replace a refrigerant of higher capacity, such embodiments of the present compositions provide a potential advantage. Thus, in some embodiments, compositions comprising or consisting essentially of Z-HCFO-1224yd, are used as a replacement for existing refrigerants, such as CFC-11, CFC-12, CFC-113, CFC-114 or CFC-114a, HCFC-123, HCFC-22, HFC-134a, HFC-236fa, HFC-245fa, R-404A, R-407C, R-407A, R-407F, R-407H, R410A and R507, among others. In some embodiments, the composition comprising or consisting essentially of Z-HCFO-1224yd is a blend as described in Table 2. In some embodiments, the refrigerants of the present invention potentially permit the beneficial use of larger displacement compressors, thereby resulting in better energy efficiency than other refrigerants, such as HCFC-123 or HFC-134a. Therefore, the refrigerant compositions of the present invention, particularly compositions comprising or consisting essentially of Z-HCFO-1224yd, provide the possibility of achieving a competitive advantage on an energy basis for refrigerant replacement applications.

In some embodiments, the refrigerant composition is an azeotrope of azeotrope-like composition comprising Z-HCFO-1224yd and one or more additional components. In some embodiments, the refrigerant composition is an azeotrope of azeotrope-like composition comprising Z-HCFO-1224yd and one or more additional components selected from among E-HFO-1234ye, Z-HFO-1234ye, Z-HFO-1234ze, HFO-1336mcyf, E-HFO-1336mzz, Z-HFO-1336mzz, E-HFO-1336ze, Z-HFO-1336ze, E-HFO-1438ezy, E-HFO-1438mzz, E-HCFO-1233zd, HFC-236ea, HFC-245fa, HFC-245ca, HFC-245ea, HCFC-123, and CFC-11. In some embodiments, the refrigerant composition is an azeotrope of azeotrope-like composition comprising Z-HCFO-1224yd and one or more additional components selected from among Z-HFO-1234ye, E-HFO-1336mzz, Z-HFO-1336mzz, HFC-236ea, HFC-245fa, HFC-245ca, HFC-245ea, HCFC-123, and CFC-11. In some embodiments, the azeotrope or azeotrope-like composition is used as a refrigerant for centrifugal or positive displacement chillers. In some embodiments, the azeotrope or azeotrope-like composition is used as a refrigerant with a flooded evaporator.

In some embodiments, the azeotrope or azeotrope-like composition is used as a replacement refrigerant. In some embodiments, the azeotrope or azeotrope-like composition is used as a replacement refrigerant for chillers designed for CFC-114 or HFC-236fa. In some embodiments, the azeotrope or azeotrope-like composition comprises Z-HCFO-1224yd and one or more additional components selected from among E-HFO-1234ye, Z-HFO-1234ze, HFO-1243yf, HFO-1336mcyf, E-HFO-1336mzz, E-HFO-1336ze, HFC-236ea, HFC-236fa, and CFC-114.

In some embodiments, the refrigerant compositions provided herein comprise Z-HCFO-1224yd in an amount that is at least about 50% by weight, and such as at least about 70% by weight, of the composition.

In some embodiments, the compositions provided herein include other components for the purpose of enhancing or providing certain functionality to the composition, or in some cases to reduce the cost of the composition. In some embodiments, refrigerant compositions provided herein, for example, those used in vapor compression systems, include a lubricant. In some embodiments, the lubricant is present in amounts of from about 5 to about 50 percent by weight of the composition, such as from about 30 to about 50 percent by weight of the composition. In some embodiments, the compositions also include a compatibilizer, such as propane, for the purpose of aiding compatibility and/or solubility of the lubricant. In some embodiments, compatibilizers, including propane, butanes and pentanes, are present in amounts of from about 0.5 to about 5 percent by weight of the composition.

In some embodiments, combinations of surfactants and solubilizing agents are added to the compositions to aid oil solubility, such as disclosed by U.S. Pat. No. 6,516,837, the disclosure of which is incorporated by reference. Commonly used refrigeration lubricants such as polyol esters (POEs) and polyalkylene glycols (PAGs), polyvinyl ethers (PVEs), fluorinated and perfluorinated oils (e.g., perfluoropolyethers, PFPEs), polycarbonates, silicone oil, mineral oil, alkyl benzenes (ABs) and poly(alpha-olefin) (PAO) that are used in refrigeration machinery with hydrofluorocarbon (HFC) refrigerants can be used with the refrigerant compositions provided herein.

In some embodiments, the compositions comprising or consisting essentially of Z-HCFO-1224yd have advantage (either in original systems or when used as a replacement for refrigerants such as R-12 and R-500) in chillers typically used in connection with commercial air conditioning systems. In some embodiments, the composition comprising or consisting essentially of Z-HCFO-1224yd is a blend as set forth in Table 2. In some embodiments, the compositions comprising Z-HCFO-1224yd include from about 0.5% to about 5% of a flammability suppressant. In some embodiments, the flammability suppressant is $CF_3I$.

In some embodiments, the compositions comprising or consisting essentially of Z-HCFO-1224yd further comprise a lubricant. Any of a variety of conventional lubricants can be used in the compositions comprising or consisting essentially of Z-HCFO-1224yd. An important requirement for the lubricant is that, when in use in a refrigerant system, there must be sufficient lubricant returning to the compressor of the system such that the compressor is lubricated. Thus, in some embodiments, suitability of a lubricant for any given system is determined partly by the refrigerant/lubricant characteristics and partly by the characteristics of the system in which it is intended to be used. Examples of suitable lubricants include, but are not limited to, mineral oil, alkyl benzenes, polyol esters, including polyalkylene glycols, PAG oil, and the like. Mineral oil, which comprises paraffin oil or naphthenic oil, is commercially available. Commercially available mineral oils include Witco LP 250 (registered trademark) from Witco, Zerol 300 (registered trademark) from Shrieve Chemical, Sunisco 3GS from Witco, and Calumet RO 15 from Calumet. Commercially available alkyl benzene lubricants include Zerol 150 (registered trademark). Commercially available esters include neopentyl glycol dipelargonate which is available as Emery 2917 (registered trademark) and Hatcol 2370 (registered trademark). Other useful esters include phosphate esters, dibasic acid esters, and fluoroesters.

In some embodiments, perfluoropolyethers (PFPEs), such as Krytox®, Galden®, Fomblin® and the like serve as refrigerant lubricants or performance enhancing additives.

In some embodiments, the lubricant includes polyalkylene glycols and polyol esters. In some embodiments, the lubricant includes polyalkylene glycols. In some embodiments, the lubricant includes polyol ethers.

Any of a wide range of methods for introducing the present refrigerant compositions to a refrigeration system can be used in the present invention. In some embodiments, the method comprises attaching a refrigerant container to the low-pressure side of a refrigeration system and turning on the refrigeration system compressor to pull the refrigerant into the system. In some embodiments, the refrigerant container is placed on a scale such that the amount of refrigerant composition entering the system can be monitored. In some embodiments, when a desired amount of refrigerant composition has been introduced into the system, charging is stopped. In some embodiments, a wide range of charging tools, known to those of skill in the art, is commercially available. Accordingly, in light of the above disclosure, those of skill in the art will be readily able to introduce the refrigerant compositions of the present invention into refrigeration systems according to the present invention without undue experimentation.

Power Cycle Use

Rankine cycle systems are known to be a simple and reliable means to convert heat energy into mechanical shaft power. Organic working fluids are useful in place of water/steam when low-grade thermal energy is encountered. Water/steam systems operating with low-grade thermal energy (typically 400° F. and lower) will have associated high volumes and low pressures. To keep system size small and efficiency high, organic working fluids with boiling points near room temperature are employed. Such fluids would have higher gas densities lending to higher capacity and favorable transport and heat transfer properties lending to higher efficiency as compared to water at low operating temperatures. In industrial settings there are more opportunities to use flammable working fluids such as toluene and pentane, particularly when the industrial setting has large quantities of flammables already on site in processes or storage. For instances where the risk associated with use of a flammable working fluid is not acceptable, such as power generation in populous areas or near buildings, other fluids such as CFC-113 and CFC-11 can be used. Although these materials are non-flammable, they were a risk to the environment because of their ozone-depletion potential. Ideally, the organic working fluid should be environmentally acceptable, non-flammable, of a low order of toxicity, and operate at pressures above atmospheric pressure.

Organic Rankine Cycle (ORC) systems are often used to recover waste heat from industrial processes. In combined heat and power (cogeneration) applications, waste heat from combustion of fuel used to drive the prime mover of a generator set is recovered and used to make hot water for building heat, for example, or for supplying heat to operate an absorption chiller to provide cooling. In some cases, the demand for hot water is small or does not exist. The most difficult case is when the thermal requirement is variable and load matching becomes difficult, confounding efficient operation of the combined heat and power system. In such an instance, it is more useful to convert the waste heat to shaft power by using an organic Rankine cycle system. The shaft power can be used to operate pumps, for example, or it may be used to generate electricity. By using this approach, the overall system efficiency is higher and fuel utilization is greater. Air emissions from fuel combustion can be decreased since more electric power can be generated for the same amount of fuel input.

In some embodiments, the process that produces waste heat is selected from the group consisting of fuel cells, internal combustion engines, internal combustion engines, external combustion engines, and gas turbines. Other sources of waste heat can be found in association with operations at oil refineries, petrochemical plants, oil and gas pipelines, chemical industry, commercial buildings, hotels, shopping malls, supermarkets, bakeries, food processing industries, restaurants, paint curing ovens, furniture making, plastics molders, cement kilns, lumber kilns (drying), calcining operations, steel industry, glass industry, foundries, smelting, air-conditioning, refrigeration, and central heating. See U.S. Pat. No. 7,428,816, the disclosure of which is hereby incorporated herein by reference.

Provided herein are compositions comprising Z-HCFO-1224yd for ORC power cycle use. In some embodiments, the composition are those described below in Table 3 (with all percentages being in percent by weight and being understood to be proceeded by the word "about").

TABLE 3

ORC Blends

| Compound Mixed with Z-HCFO-1224yd | Preferred Ranges wt % | More Preferred Ranges wt % | Most Preferred Ranges wt % |
|---|---|---|---|
| HFOs | | | |
| HFO-1234ze (E&Z) | 1 to 99 | 5 to 95 | 10 to 90 |
| HFO-1234yf | 1 to 99 | 5 to 95 | 10 to 90 |
| HFO-1225ye (E&Z) | 1 to 99 | 5 to 95 | 10 to 90 |
| HFO-1225yc | 1 to 99 | 5 to 95 | 10 to 90 |
| HFO-1233zd (E&Z) | 1 to 99 | 5 to 95 | 10 to 90 |
| HFO-1233xf | 1 to 99 | 5 to 95 | 10 to 90 |
| HFO-1336mzz (E&Z) | 1 to 99 | 5 to 95 | 10 to 90 |
| $(CF_3)_2CFCH=CHF$ (E&Z) | 1 to 99 | 5 to 95 | 10 to 90 |
| $(C_2F_5)(CF_3)C=CH_2$ | 1 to 99 | 5 to 95 | 10 to 90 |
| $(CF_3)_2CFCH=CF_2$ | 1 to 99 | 5 to 95 | 10 to 90 |
| $(CF_3)_2CFCF=CHF$ (E&Z) | 1 to 99 | 5 to 95 | 10 to 90 |
| HFCs | | | |
| HFC-245fa | 1 to 99 | 5 to 95 | 10 to 90 |
| HFC-245cb | 1 to 99 | 5 to 95 | 10 to 90 |
| HFC-245ca | 1 to 99 | 5 to 95 | 10 to 90 |
| HFC-227ea | 1 to 99 | 5 to 95 | 10 to 90 |
| HFC-236ea | 1 to 99 | 5 to 95 | 10 to 90 |
| HFC-236fa | 1 to 99 | 5 to 95 | 10 to 90 |
| HFC-134 | 1 to 99 | 5 to 95 | 10 to 90 |
| HFC-134a | 1 to 99 | 5 to 95 | 10 to 90 |
| HFC-152 | 1 to 99 | 5 to 95 | 10 to 90 |
| HFC-152a | 1 to 99 | 5 to 95 | 10 to 90 |
| HFC-32 | 1 to 99 | 5 to 95 | 10 to 90 |
| HFC-125 | 1 to 99 | 5 to 95 | 10 to 90 |
| HFC-143a | 1 to 99 | 5 to 95 | 10 to 90 |
| HFC-365mfc | 1 to 99 | 5 to 95 | 10 to 90 |
| HFC-161 | 1 to 99 | 5 to 95 | 10 to 90 |
| HFC-43-10mee | 1 to 99 | 5 to 95 | 10 to 90 |
| HFEs | | | |
| $CHF_2-O-CHF_2$ | 1 to 99 | 5 to 95 | 10 to 90 |
| $CHF_2-O-CH_2F$ | 1 to 99 | 5 to 95 | 10 to 90 |
| $CH_2F-O-CH_2F$ | 1 to 99 | 5 to 95 | 10 to 90 |
| $CH_2F-O-CH_3$ | 1 to 99 | 5 to 95 | 10 to 90 |
| cyclo-$CF_2-CH_2-CF_2-O$ | 1 to 99 | 5 to 95 | 10 to 90 |
| cyclo-$CF_2-CF_2-CH_2-O$ | 1 to 99 | 5 to 95 | 10 to 90 |
| $CHF_2-O-CF_2-CHF_2$ | 1 to 99 | 5 to 95 | 10 to 90 |
| $CF_3-CF_2-O-CH_2F$ | 1 to 99 | 5 to 95 | 10 to 90 |
| $CHF_2-O-CHF-CF_3$ | 1 to 99 | 5 to 95 | 10 to 90 |
| $CHF_2-O-CF_2-CHF_2$ | 1 to 99 | 5 to 95 | 10 to 90 |
| $CH_2F-O-CF_2-CHF_2$ | 1 to 99 | 5 to 95 | 10 to 90 |
| $CF_3-O-CF_2-CH_3$ | 1 to 99 | 5 to 95 | 10 to 90 |
| $CHF_2-CHF-O-CHF_2$ | 1 to 99 | 5 to 95 | 10 to 90 |
| $CF_3-O-CHF-CH_2F$ | 1 to 99 | 5 to 95 | 10 to 90 |
| $CF_3-CHF-O-CH_2F$ | 1 to 99 | 5 to 95 | 10 to 90 |
| $CF_3-O-CH_2-CHF_2$ | 1 to 99 | 5 to 95 | 10 to 90 |
| $CHF_2-O-CH_2-CF_3$ | 1 to 99 | 5 to 95 | 10 to 90 |
| $CH_2F-CF_2-O-CH_2F$ | 1 to 99 | 5 to 95 | 10 to 90 |
| $CHF_2-O-CF_2-CH_3$ | 1 to 99 | 5 to 95 | 10 to 90 |
| $CHF_2-CF_2-O-CH_3$ | 1 to 99 | 5 to 95 | 10 to 90 |
| $CH_2F-O-CHF-CH_2F$ | 1 to 99 | 5 to 95 | 10 to 90 |
| $CHF_2-CHF-O-CH_2F$ | 1 to 99 | 5 to 95 | 10 to 90 |
| $CF_3-O-CHF-CH_3$ | 1 to 99 | 5 to 95 | 10 to 90 |
| $CF_3-CHF-O-CH_3$ | 1 to 99 | 5 to 95 | 10 to 90 |
| $CHF_2-O-CH_2-CHF_2$ | 1 to 99 | 5 to 95 | 10 to 90 |
| $CF_3-O-CH_2-CH_2F$ | 1 to 99 | 5 to 95 | 10 to 90 |
| $CF_3-CH_2-O-CH_2F$ | 1 to 99 | 5 to 95 | 10 to 90 |
| $CF_2H-CF_2-CF_2-O-CH_3$ | 1 to 99 | 5 to 95 | 10 to 90 |

TABLE 3-continued

| ORC Blends | | | |
|---|---|---|---|
| Compound Mixed with Z-HCFO-1224yd | Preferred Ranges wt % | More Preferred Ranges wt % | Most Preferred Ranges wt % |
| Hydrocarbons | | | |
| propane | 1 to 99 | 5 to 95 | 10 to 90 |
| butane | 1 to 99 | 5 to 95 | 10 to 90 |
| isobutane | 1 to 99 | 5 to 95 | 10 to 90 |
| n-pentane (high HFO) | 1 to 99 | 50 to 99 | 60 to 99 |
| n-pentane (high n-pentane) | 1 to 99 | 1 to 30 | 1 to 20 |
| isopentane (high HFO) | 1 to 99 | 50 to 99 | 60 to 90 |
| isopentane (high isopentane) | 1 to 99 | 1 to 30 | 1 to 20 |
| neopentane (high HFO) | 1 to 99 | 50 to 99 | 60 to 99 |
| neopentane (high neopentane) | 1 to 99 | 1 to 30 | 1 to 20 |
| cyclopentane (high HFO) | 1 to 99 | 50 to 99 | 60 to 99 |
| cyclopentane (high cyclopentane) | 1 to 99 | 1 to 30 | 1 to 20 |
| n-hexane | 1 to 99 | 5 to 95 | 10 to 90 |
| isohexane | 1 to 99 | 5 to 95 | 10 to 90 |
| heptane | 1 to 99 | 5 to 95 | 10 to 90 |
| Ethers | | | |
| dimethyl ether | 1 to 99 | 5 to 95 | 10 to 90 |
| methylethyl ether | 1 to 99 | 5 to 95 | 10 to 90 |
| diethyl ether | 1 to 99 | 5 to 95 | 10 to 90 |
| methylpropyl ether | 1 to 99 | 5 to 95 | 10 to 90 |
| methylisopropyl ether | 1 to 99 | 5 to 95 | 10 to 90 |
| ethylpropyl ether | 1 to 99 | 5 to 95 | 10 to 90 |
| ethylisopropyl ether | 1 to 99 | 5 to 95 | 10 to 90 |
| dipropyl ether | 1 to 99 | 5 to 95 | 10 to 90 |
| diisopropyl ether | 1 to 99 | 5 to 95 | 10 to 90 |
| dimethoxymethane | 1 to 99 | 5 to 95 | 10 to 90 |
| diethoxymethane | 1 to 99 | 5 to 95 | 10 to 90 |
| dipropoxymethane | 1 to 99 | 5 to 95 | 10 to 90 |
| dibutoxymethane | 1 to 99 | 5 to 95 | 10 to 90 |
| Aldehydes | | | |
| formaldehyde | 1 to 99 | 5 to 95 | 10 to 90 |
| acetaldehyde | 1 to 99 | 5 to 95 | 10 to 90 |
| propanal | 1 to 99 | 5 to 95 | 10 to 90 |
| butanal | 1 to 99 | 5 to 95 | 10 to 90 |
| isobutanal | 1 to 99 | 5 to 95 | 10 to 90 |
| Ketones | | | |
| Acetone | 1 to 99 | 5 to 95 | 10 to 90 |
| Methylethylketone | 1 to 99 | 5 to 95 | 10 to 90 |
| methylisobutylketone | 1 to 99 | 5 to 95 | 10 to 90 |
| perfluoroethylisopropylketone ($C_2F_5C(O)CF(CF_3)_2$) | 1 to 99 | 5 to 95 | 10 to 90 |
| Others | | | |
| water | 1 to 99 | 5 to 95 | 10 to 90 |
| methyl formate | 1 to 99 | 5 to 95 | 10 to 90 |
| ethyl formate | 1 to 99 | 5 to 95 | 10 to 90 |
| formic acid | 1 to 99 | 5 to 95 | 10 to 90 |
| trans-1,2-dichloroethylene (t-DCE) | 1 to 99 | 5 to 95 | 10 to 90 |
| $CO_2$ | 1 to 99 | 5 to 95 | 10 to 90 |
| cis-HFO-1234ze + HFO-1225yeZ | | | |
| 2-fluoro-3-(trifluoromethyl)oxirane | 1 to 99 | 5 to 95 | 10 to 90 |
| 2-fluoro-3-(perfluoropropan-2-yl)oxirane | 1 to 99 | 5 to 95 | 10 to 90 |
| 2,3-bis(trifluoromethyl)oxirane | 1 to 99 | 5 to 95 | 10 to 90 |
| 2-(trifluoromethyl)-3-(perfluoroethyl)oxirane | 1 to 99 | 5 to 95 | 10 to 90 |
| 2-(trifluoromethyl)-3-(perfluoropropan-2-yl)oxirane | 1 to 99 | 5 to 95 | 10 to 90 |
| 2,3-bis(perfluoropropyl)oxirane | 1 to 99 | 5 to 95 | 10 to 90 |
| 2-(perfluorobutyl)-3-(perfluoroethyl)oxirane | 1 to 99 | 5 to 95 | 10 to 90 |
| 2,3-bis(perfluorobutyl)oxirane; | 1 to 99 | 5 to 95 | 10 to 90 |
| 2-(2,2,2-trifluoroethoxy)-2-(trifluoromethyl)-3-(perfluoroethyl)oxirane | 1 to 99 | 5 to 95 | 10 to 90 |
| 2,3-dichloro-2,3-bis(trifluoromethyl)oxirane | 1 to 99 | 5 to 95 | 10 to 90 |
| 2,2,3,3,4,4-hexafluoro-6-oxa-bicyclo[3.1.0]hexane | 1 to 99 | 5 to 95 | 10 to 90 |
| 2,2,3,3-tetrafluoro-5-oxabicyclo[2.1.0]pentane | 1 to 99 | 5 to 95 | 10 to 90 |

TABLE 3-continued

ORC Blends

| Compound Mixed with Z-HCFO-1224yd | Preferred Ranges wt % | More Preferred Ranges wt % | Most Preferred Ranges wt % |
|---|---|---|---|
| 2,3-difluoro-2-(perfluoroethyl)-3-(perfluoropropyl)oxirane | 1 to 99 | 5 to 95 | 10 to 90 |
| 2,3-difluoro-2-(trifluoromethyl)-3-(perfluoropentyl)oxirane; | 1 to 99 | 5 to 95 | 10 to 90 |
| Mixtures of any of the above plus water | 1 to 99% $H_2O$ | 5 to 95% $H_2O$ | 10 to 90% $H_2O$ |
| Mixtures of any of the above plus $CO_2$ | 1 to 99% $CO_2$ | 5 to 95% $CO_2$ | 10 to 90% $CO_2$ |
| Mixtures of any of the above plus t-DCE | 1 to 99% t-DCE | 5 to 95% t-DCE | 10 to 90% t-DCE |
| Mixtures of any of the above plus methyl formate | 1 to 99% MF | 5 to 95% MF | 10 to 90% MF |
| Mixtures with cis-HFO-1234ze + CO2 | 1 to 99 | 5 to 95 | 10 to 90 |
| Mixtures with cis-HFO-1234ze + CO2 + 1225yeZ | 1 to 99 | 5 to 95 | 10 to 90 |
| Mixtures with cis-HFO-1234ze + HFC-245fa | 1 to 99 | 5 to 95 | 10 to 90 |

In some embodiments, the compositions comprise Z-HCFO-1224yd and one or more compounds selected from among E-HFO-1234ye, Z-HFO-1234ye, HFO-1234yf, E-HFO-1234ze, Z-HFO-1234ze, HFO-1243zf, HFO-1336mcyf, E-HFO-1336mzz, Z-HFO-1336mzz, E-HFO-1336ze, Z-HFO-1336ze, E-HFO-1438ezy, Z-HFO-1438ezy, E-HFO-1438mzz, Z-HFO-1438mzz, E-HCFO-1233zd, Z-HCFO-1233zd, HFC-134, HFC-134a, HFC-152a, HFC-227ea, HFC-236ea, HFC-245ca, HFC-245cb, HFC-245ea, HFC-245fa, HFC-365mfc, HFC-43-10mee, butane, cyclobutane, isobutene, isopentane (2-methylbutane), HFE-1-methoxyheptafluoropropane (HFE-7000), and HFE-methoxy-nonafluorobutane (C4F9OCH3; HFE7100). In some embodiments, the compositions comprise Z-HCFO-1224yd and one or more compounds selected from among HFO-1234yf, E-HFO-1234ze, E-HFO-1336mzz, Z-HFO-1336mzz, HFC-134, HFC-134a, HFC-152a, HFC-236ea, HFC-245cb, HFC-245fa, HFC-365mfc, and HFC-43-10mee. In some embodiments, the compositions are used as working fluids for high temperature heat pumps and Organic Rankine Cycles.

In some embodiments, the compositions comprise Z-HCFO-1224yd and one or more compounds selected from among E-HFO-1234ye, Z-HFO-1234ye, Z-HFO-1234ze, HFO-1336mcyf, E-HFO-1336mzz, Z-HFO-1336mzz, E-HFO-1336ze, Z-HFO-1336ze, E-HFO-1438ezy, E-HFO-1438mzz, E-HCFO-1233zd, HFC-236ea, HFC-245ca, HFC-245ea, HFC-245fa, cyclobutane, and isopentane (2-methylbutane). In some embodiments, the compositions comprise Z-HCFO-1224yd and one or more compounds selected from among E-HFO-1336mzz, Z-HFO-1336mzz, HFC-236ea, and HFC-245fa. In some embodiments, the compositions are used as replacement fluids for high temperature heat pumps and Organic Rankine Cycles designed for HFC-235fa.

In some embodiments, the compositions comprising or consisting essentially of Z-HCFO-1224yd are used in a power cycle. In some embodiments, the process comprises recovering waste heat in an Organic Rankine Cycle system in which the working fluid is a composition comprising or consisting essentially of Z-HCFO-1224yd and optionally, one or more additional compounds. In some embodiments, the composition comprising or consisting essentially of Z-HCFO-1224yd is a composition set forth above in Table 3.

Cleaning and Contaminant Removal

Provided herein are methods of removing containments from a product, part, component, substrate, or any other article or portion thereof by applying to the article a composition comprising or consisting essentially of Z-HCFO-1224yd. In some embodiments, the composition comprising or consisting essentially of Z-HCFO-1224yd is a blend as set forth in Table 1 above. The term "article," as used herein, refers to all such products, parts, components, substrates, and the like and is further intended to refer to any surface or portion thereof. As used herein, the term "contaminant" refers to any unwanted material or substance present on the article, even if such substance is placed on the article intentionally. For example, in the manufacture of semiconductor devices it is common to deposit a photoresist material onto a substrate to form a mask for the etching operation and to subsequently remove the photoresist material from the substrate. The term "contaminant" as used herein is intended to cover and encompass such a photo resist material.

In some embodiments of the methods of cleaning and contaminant removal, the amount of Z-HCFO-1224yd in the composition is from about 1 wt % to about 99 wt %, such as about 30 wt % to about 99 wt %; about 50 wt % to about 99 wt %; about 75 wt % to about 99 wt %; about 85 wt % to about 99 wt %; about 20 wt % to about 80 wt %; about 90 wt % to about 99 wt %; about 95 wt % to about 99 wt %; about 1 wt % to about 20 wt %; about 1 wt % to about 40 wt %; about 1 wt % to about 50 wt %; about 5 wt % to about 20 wt %; about 5 wt % to about 40 wt %; about 5 wt % to about 60 wt %; about 10 wt % to about 80 wt %; about 10 wt % to about 90 wt %; about 20 wt % to about 80 wt %; or about 20 wt % to about 90 wt %. Other ranges of amounts are shown in Table 1 above, and those amounts are likewise applicable for this use of the composition of the invention.

In some embodiments, the method comprises applying a composition comprising or consisting essentially of Z-HCFO-1224yd to the article. Numerous and varied cleaning techniques can employ the compositions of the present invention to good advantage. In some embodiments, the composition comprising or consisting essentially of Z-HCFO-1224yd is used in connection with supercritical cleaning techniques. Supercritical cleaning is disclosed in U.S. Pat. No. 6,589,355, which is incorporated herein by reference.

In some embodiments of supercritical cleaning applications, the cleaning composition comprises Z-HCFO-1224yd and another component. In some embodiments the additional component is $CO_2$. In some embodiments, the additional component is known for use in connection with supercritical cleaning applications.

In some embodiments, the cleaning composition comprising Z-HCFO-1224yd is used in connection with particular sub-critical vapor degreasing and solvent cleaning methods. In some embodiments of solvent uses, compositions containing the compound Z-HCFO-1224yd are blended with one or more of cis-1234ze, cis-1233zd, HFC-245fa, methylal (dimethoxymethane), methylethylketone, methylisobutylketone, or HFC-134a. In some embodiments, the blends comprise Z-HCFO-1224yd blended with one or more of pentanes, hexanes, HFC-365, $C_4F_9OCH_3$, $C_4F_9OC_2H_5$, propane, butane, isobutane, or dimethylether. In some embodiments, the blends comprise Z-HCFO-1224yd blended with one or more of trans-1,2-dichloroethylene, trans-HFO-1234ze, trans-HCFO-1233zd, trans-1336, HFC-43-10, HFC-152a, methanol, ethanol, isopropanol, or acetone.

In some embodiments, the cleaning comprises the removal of contaminants from vapor compression systems and their ancillary components when these systems are manufactured and serviced. As used herein, the term "contaminants" refers to processing fluids, lubricants, particulates, sludge, and/or other materials that are used in the manufacture of these systems or generated during their use. In general, these contaminants comprise compounds such as alkylbenzenes, mineral oils, esters, polyalkyleneglycols, polyvinylethers and other compounds that are made primarily of carbon, hydrogen and oxygen. In some embodiments, the compositions comprising or consisting essentially of Z-HCFO-1224yd are useful for this purpose.

Sprayable Compositions and Uses

In some embodiments, the compositions comprising or consisting essentially of Z-HCFO-1224yd are used as propellants in sprayable compositions, either alone or in combination with a propellant. In some embodiments, the composition is a blend as described in Table 1, above. In some embodiments, the Z-HCFO-1224yd is present in the sprayable composition in an amount from about 1 wt % to about 99 wt %, such as about 30 wt % to about 99 wt %; about 50 wt % to about 99 wt %; about 75 wt % to about 99 wt %; about 85 wt % to about 99 wt %; about 20 wt % to about 80 wt %; about 90 wt % to about 99 wt %; about 95 wt % to about 99 wt %; about 1 wt % to about 20 wt %; about 1 wt % to about 40 wt %; about 1 wt % to about 50 wt %; about 5 wt % to about 20 wt %; about 5 wt % to about 40 wt %; about 5 wt % to about 60 wt %; about 10 wt % to about 80 wt %; about 10 wt % to about 90 wt %; about 20 wt % to about 80 wt %; or about 20 wt % to about 90 wt %. Other ranges of amounts are shown in Table 1, and those amounts are likewise applicable for this use of the composition of the invention.

In some embodiments, the sprayable composition includes a material to be sprayed and a propellant comprising or consisting essentially of Z-HCFO-1224yd. In some embodiments, the sprayable composition comprises a blend as described in Table 1. In some embodiments, inert ingredients, solvents, and other materials also present in the sprayable mixture. In some embodiments, the sprayable composition is an aerosol. Suitable materials to be sprayed include, without limitation, cosmetic materials such as deodorants, perfumes, hair sprays, cleansers, and polishing agents as well as medicinal materials such as anti-asthma and anti-halitosis medications.

In some embodiments for aerosol uses, a composition containing Z-HCFO-1224yd is blended with one or more of cis-HFO-1234ze, cis-HCFO-1233zd, HFC-245fa, methylal (dimethoxymethane), methylethylketone, methylisobutylketone, or HFC-134a. In some embodiments, the blends comprise Z-HCFO-1224yd blended with one or more of pentanes, hexanes, HFC-365, $C_4F_9OCH_3$ or $C_4F_9OC_2H_5$. In some embodiments, the blends comprise Z-HCFO-1224yd blended with one or more of trans-1,2-dichloroethylene, trans-HFO-1234ze, trans-HCFO-1233zd, cis-HFO-1336mzz, HFC-43-10, HFC-152a, methanol, ethanol, isopropanol, propane, butane, isobutane, dimethylether or acetone.

In some embodiments for aerosol use, the active ingredient to be sprayed is mixed with inert ingredients, solvents, and other. In some embodiments, the sprayable composition is an aerosol. Suitable active materials to be sprayed include, without limitation, lubricants, insecticides, cleaners, cosmetic materials such as deodorants, perfumes and hair sprays, polishing agents, as well as medicinal materials such as skin cooling agents (sunburn treatment), topical anesthetics and anti-asthma medications.

In some embodiments, provided herein are propellants comprising or consisting essentially of Z-HCFO-1224yd, either alone or in combination with one or more other compounds. In some embodiments, the propellant comprises or consists essentially of a blend as set forth in Table 1, above. In some embodiments, the propellant composition is a sprayable composition. In some embodiments, the propellant composition comprises a material to be sprayed and a propellant comprising or consisting essentially of Z-HCFO-1224yd. In some embodiments, inert ingredients, solvents, and other materials are also present in the sprayable mixture. In some embodiments, the sprayable composition is an aerosol. Suitable materials to be sprayed include, without limitation, lubricants, insecticides, cleaners, cosmetic materials such as deodorants, perfumes and hair sprays, polishing agents as well as medicinal materials such as anti-asthma components, and any other medication or the like, including any other medicament or agent intended to be inhaled. In some embodiments, the medicament or other therapeutic agent is present in the composition in a therapeutic amount, with a substantial portion of the balance of the composition comprising or consisting essentially of Z-HCFO-1224yd.

In some embodiments, the aerosol product is for industrial, consumer or medical use. Aerosol products for industrial, consumer or medical use typically contain one or more propellants along with one or more active ingredients, inert ingredients or solvents. The propellant provides the force that expels the product in aerosolized form. While some aerosol products are propelled with compressed gases like carbon dioxide, nitrogen, nitrous oxide and even air, most commercial aerosols use liquefied gas propellants. The most commonly used liquefied gas propellants are hydrocarbons such as butane, isobutane, and propane. Dimethyl ether and HFC-152a (1,1-difluoroethane) are also used, either alone or in blends with the hydrocarbon propellants. Unfortunately, all of these liquefied gas propellants are highly flammable and their incorporation into aerosol formulations will often result in flammable aerosol products.

In some embodiments, the aerosol products described herein comprise nonflammable, liquefied gas propellants. In some embodiments, the aerosol products described herein comprise or consist essentially of Z-HCFO-1224yd. In some embodiments, the aerosol products describe herein comprise or consist essentially of a blend as set forth in Table 1, above. In some embodiments, the aerosol product is for use in certain industrial aerosol products, including for example spray cleaners, lubricants, and the like, and in medicinal aerosols, including for example to deliver medications to the lungs or mucosal membranes. Examples of this includes metered dose inhalers (MDIs) for the treatment of asthma and other chronic obstructive pulmonary diseases and for delivery of medicaments to accessible mucous membranes or intranasally. In some embodiments, provided are methods for treating ailments, diseases and similar health related problems of an organism (such as a human or animal) comprising applying a composition comprising or consisting essentially of Z-HCFO-1224yd and a medicament or other therapeutic component to the organism in need of treatment. In some embodiments, the step of applying a composition comprising or consisting essentially of Z-HCFO-1224yd comprises providing an MDI containing the composition comprising or consisting essentially of Z-HCFO-1224yd (for example, introducing the composition into the MDI) and then discharging the composition comprising or consisting essentially of Z-HCFO-1224yd from the MDI.

As used herein, the term "nonflammable" refers to compounds and compositions of the present invention which do not exhibit a flashpoint as measured by one of the standard flash point methods, for example, ASTM-1310-86 "Flash point of liquids by tag Open-cup apparatus."

In some embodiments, the compositions comprising or consisting essentially of Z-HCFO-1224yd are used to formulate a variety of industrial aerosols or other sprayable compositions such as contact cleaners, dusters, lubricant sprays, and the like, and consumer aerosols such as personal care products, household products and automotive products. In some embodiments, the aerosol or sprayable composition is a medicinal aerosol, such as a metered dose inhaler. In some embodiments, the medicinal aerosol and/or propellant and/or sprayable compositions includes, in addition to Z-HCFO-1224yd, a medicament such as a beta-agonist, a corticosteroid or other medicament, and, optionally, other ingredients, such as surfactants, solvents, other propellants, flavorants and other excipients.

Sterilization

Many articles, devices and materials, particularly for use in the medical field, must be sterilized prior to use for the health and safety reasons, such as the health and safety of patients and hospital staff. Provided herein are methods of sterilization comprising contacting the articles, devices or material to be sterilized with a composition comprising or consisting essentially of Z-HCFO-1224yd. In some embodiments, the composition is a blend as defined in Table 1, above. In some embodiments, the composition is optionally combined with one or more additional sterilizing agents.

In some embodiments of the sterilization methods, the amount of Z-HCFO-1224yd in the composition is from about 1 wt % to about 99 wt %, such as about 30 wt % to about 99 wt %; about 50 wt % to about 99 wt %; about 75 wt % to about 99 wt %; about 85 wt % to about 99 wt %; about 20 wt % to about 80 wt %; about 90 wt % to about 99 wt %; about 95 wt % to about 99 wt %; about 1 wt % to about 20 wt %; about 1 wt % to about 40 wt %; about 1 wt % to about 50 wt %; about 5 wt % to about 20 wt %; about 5 wt % to about 40 wt %; about 5 wt % to about 60 wt %; about 10 wt % to about 80 wt %; about 10 wt % to about 90 wt %; about 20 wt % to about 80 wt %; or about 20 wt % to about 90 wt %. Other ranges of amounts are shown in Table 1, and those amounts are likewise applicable for this use of the composition of the invention.

While many sterilizing agents are known in the art and are considered to be adaptable for use in connection with the present invention, in some embodiments the sterilizing agent comprises ethylene oxide, formaldehyde, hydrogen peroxide, chlorine dioxide, ozone and combinations of these. In some embodiments, the sterilizing agent is ethylene oxide. Those skilled in the art will be able to readily determine the relative proportions of sterilizing agent and the other compounds, including Z-HCFO-1224yd, to be used in connection with the present sterilizing compositions and methods.

As is known to those skilled in the art, certain sterilizing agents, such as ethylene oxide, are extremely flammable components, and the compound(s) in accordance with the present invention are included in the present compositions in amounts effective, together with other components present in the composition, to reduce the flammability of the sterilizing composition to acceptable levels. In some embodiments, the sterilization methods is either high or low-temperature sterilization. In some embodiments, the sterilization involves the use of a compound or composition comprising Z-HCFO-1224yd at a temperature of from about 250° F. to about 270° F. In some embodiments, the sterilization is in a substantially sealed chamber. In some embodiments, the sterilization process is completed in less than about two hours. In some embodiments, some articles, such as plastic articles and electrical components, cannot withstand such high temperatures and require low-temperature sterilization.

In some embodiments, the sterilization method is a low temperature sterilization method. In some embodiments of the low temperature sterilization method, the article to be sterilized is exposed to a fluid comprising or consisting essentially of Z-HCFO-1224yd at a temperature of from about room temperature to about 200° F., such as at a temperature of from about room temperature to about 100° F.

In some embodiments, the low-temperature sterilization is at least a two-step process performed in a substantially sealed chamber. In some embodiments, the chamber is an air-tight chamber. In some embodiments, the first step (the sterilization step) comprises placing articles that have been cleaned and wrapped in gas permeable bags in the chamber. In some embodiments, air is evacuated from the chamber by pulling a vacuum. In some embodiments, air is evacuated by displacing the air with steam. In some embodiments, air is evacuated from the chamber by pulling a vacuum and displacing the air with steam. In some embodiments, steam is injected into the chamber to achieve a relative humidity that ranges from about 30% to about 70%. In some embodiments, such humidity maximizes the sterilizing effectiveness of the sterilant, which is introduced into the chamber after the desired relative humidity is achieved. In some embodiments, after a period of time sufficient for the sterilant to permeate the wrapping and reach the interstices of the article, the sterilant and steam are evacuated from the chamber.

In some embodiments, the second step of the process (the aeration step) comprises aerating the articles to remove sterilant residues. In some embodiments, the residues are toxic sterilants. In some embodiments, aeration is optional, for example, in those cases in which substantially non-toxic compounds are used. In some embodiments, the substantially non-toxic compounds are compositions comprising Z-HCFO-1224yd. In some embodiments, the aeration process includes air washes, continuous aeration, and a combination of the two. An air wash is a batch process and in some embodiments comprises evacuating the chamber for a relatively short period, for example, 12 minutes, and then introducing air at atmospheric pressure or higher into the chamber.

As used herein the term "non-toxic" refers to compounds and compositions which have an acute toxicity level substantially less than, and preferably at least about 30 relative percent less than, the toxicity level of HFO-1223xd, as measured by the method published in Anesthesiology, Vol. 14, pp. 466-472, 1953, incorporated here by reference.

In some embodiments, this cycle of is repeated any number of times until the desired removal of sterilant is achieved. In some embodiments, continuous aeration involves introducing air through an inlet at one side of the chamber and then drawing it out through an outlet on the other side of the chamber by applying a slight vacuum to the outlet. In some embodiments, the two approaches are combined. In some embodiments, the method comprises performing air washes and then an aeration cycle.

Extraction of Flavors and Fragrances

In some embodiments, the compositions comprising or consisting essentially of Z-HCFO-1224yd are used to carry, extract or separate desirable materials from biomass. In some embodiments, the compositions are blends as described in Table 1, above. In some embodiments, the materials include, but are not limited to, essential oils such as flavors and fragrances, oils which may be used as fuel, medicinals, nutraceuticals, etc. Thus, provided herein are methods of carrying, extracting or separating desirable materials from biomass.

In some embodiments of the extraction methods, the amount of Z-HCFO-1224yd in the composition is from about 1 wt % to about 99 wt %, such as about 30 wt % to about 99 wt %; about 50 wt % to about 99 wt %; about 75 wt % to about 99 wt %; about 85 wt % to about 99 wt %; about 20 wt % to about 80 wt %; about 90 wt % to about 99 wt %; about 95 wt % to about 99 wt %; about 1 wt % to about 20 wt %; about 1 wt % to about 40 wt %; about 1 wt % to about 50 wt %; about 5 wt % to about 20 wt %; about 5 wt % to about 40 wt %; about 5 wt % to about 60 wt %; about 10 wt % to about 80 wt %; about 10 wt % to about 90 wt %; about 20 wt % to about 80 wt %; or about 20 wt % to about 90 wt %. Other ranges of amounts are shown in Table 1, and those amounts are likewise applicable for this use of the composition of the invention.

In some embodiments, the compositions comprising Z-HCFO-1224yd are used as an extractant, carrier, or part of a delivery system for flavor and fragrance formulations. In some embodiments, the formulation is an aerosol formulation. In some embodiments, the compositions comprising Z-HCFO-1224yd is used as an extractant of flavors and fragrances. In some embodiment, the flavors and fragrances are extracted from plant matter.

Flammability Reduction Methods

Provided herein are methods for reducing the flammability of fluids, comprising adding a composition comprising Z-HCFO-1224yd to the fluid. In some embodiments, the composition comprising Z-HCFO-1224yd is a blend as defined in Table 1. In some embodiments, the method reduces the flammability associated with any of a wide range of otherwise flammable fluids. In some embodiments, the flammability associated with fluids such as ethylene oxide, flammable hydrofluorocarbons and hydrocarbons, including: HFC-152a, 1,1,1-trifluoroethane (HFC-143a), difluoromethane (HFC-32), propane, hexane, octane, and the like is reduced. For the purposes of the present invention, a flammable fluid is any fluid exhibiting flammability ranges in air as measured via any standard conventional test method, such as ASTM E-681, and the like.

In some embodiments of the method for reducing flammability, the amount of Z-HCFO-1224yd in the composition is from about 1 wt % to about 99 wt %; about 30 wt % to about 99 wt %; about 50 wt % to about 99 wt %; about 75 wt % to about 99 wt %; about 85 wt % to about 99 wt %; about 20 wt % to about 80 wt %; about 90 wt % to about 99 wt %; about 95 wt % to about 99 wt %; about 1 wt % to about 20 wt %; about 1 wt % to about 40 wt %; about 1 wt % to about 50 wt %; about 5 wt % to about 20 wt %; about 5 wt % to about 40 wt %; about 5 wt % to about 60 wt %; about 10 wt % to about 80 wt %; about 10 wt % to about 90 wt %; about 20 wt % to about 80 wt %; or about 20 wt % to about 90 wt %. Other ranges of amounts are shown in Table 1, and those amounts are likewise applicable for this use of the composition of the invention.

Any suitable amounts of the present compounds or compositions can be added to reduce flammability of a fluid according to the present invention. As will be recognized by those of skill in the art, the amount added will depend, at least in part, on the degree to which the subject fluid is flammable and the degree to which it is desired to reduce the flammability thereof. In some embodiments, the amount of compound or composition comprising Z-HCFO-1224yd added to the flammable fluid is effective to render the resulting fluid substantially non-flammable.

Flame Suppression Methods

The present invention further provides methods of suppressing a flame, comprising contacting a flame with a Z-HCFO-1224yd containing composition. In some embodiments, the composition comprising Z-HCFO-1224yd is a blend as described in Table 1, above. In some embodiments, additional flame suppressing agents are used with the composition comprising Z-HCFO-1224yd, either in admixture, or as a secondary flame suppressing agent. In some embodiments, the compound is a fluoroketone. In some embodiments, the fluoroketone is dodecafluoro-2-methylpentan-3-one, which is sold by the 3M Company under the trade name Novec 1230.

In some embodiments of the flame suppression methods, the amount of Z-HCFO-1224yd in the composition is from about 1 wt % to about 99 wt %, such as about 30 wt % to about 99 wt %; about 50 wt % to about 99 wt %; about 75 wt % to about 99 wt %; about 85 wt % to about 99 wt %; about 20 wt % to about 80 wt %; about 90 wt % to about 99 wt %; about 95 wt % to about 99 wt %; about 1 wt % to about 20 wt %; about 1 wt % to about 40 wt %; about 1 wt % to about 50 wt %; about 5 wt % to about 20 wt %; about 5 wt % to about 40 wt %; about 5 wt % to about 60 wt %; about 10 wt % to about 80 wt %; about 10 wt % to about 90 wt %; about 20 wt % to about 80 wt %; or about 20 wt % to about 90 wt %. Other ranges of amounts are shown in Table 1, and those amounts are likewise applicable for this use of the composition of the invention.

Any suitable method for contacting the flame with the present composition can be used. In some embodiments, a composition comprising Z-HCFO-1224yd is sprayed, poured, and the like onto the flame, or at least a portion of the flame is immersed in the composition.

Etching Methods

Etching gases used in the semiconductor industry are used to etch deposits from a surface. Chemical vapor deposition (CVD) and plasma enhanced chemical vapor deposition (PECVD) chambers need to be regularly cleaned to remove deposits from the chamber walls and platens. This cleaning process reduces the productive capacity of the chamber since the chamber is out of active service during a cleaning cycle. The cleaning process may include, for example, the evacuation of reactant gases and their replacement with a cleaning gas, activation of that gas, followed by a flushing step to remove the cleaning gas from the chamber using an inert carrier gas. The cleaning gases typically work by etching the contaminant build-up from the interior surfaces, thus the etching rate of the cleaning gas is an important parameter in the utility and commercial use of the gases, and some cleaning gases can also be used as etching gases. These gases can generate relatively high amounts of toxic waste gases, which may pose additional GWP or Environmental, Health, and Safety (EHS) issues apart from the GWP of the cleaning or etch gas itself.

Thus, there is a need to reduce the harm of global warming caused by the cleaning and operation of CVD reactors with an effective and inexpensive cleaning/etching gas that has a high etch rate and a lower GWP and ESH impact than incumbent gases. In some embodiments, provided is a clean gas mixture that has low EHS and GWP, so that even if unreacted gases are released, they have reduced environmental impact. In some embodiments, provided are methods of using these gases, comprising activating the gas, either in a remote chamber or in situ in the process chamber, wherein the gas mixture comprises an oxygen source and a hydrofluoroolefin, and contacting the activated gas with the surface deposits for a time sufficient to remove said deposits. In some embodiments, the gas mixture is activated by a radio frequency (RF) source using sufficient power for a sufficient time such that the gas mixture reaches a neutral temperature of about 1000-3,000 K to form an activated gas mixture. In some embodiments, a glow discharge is used to activate the gas. In some embodiments, the activated gas mixture is contacted with the surface deposits and thereby removing at least some of the surface deposits. In some embodiments, the gas mixtures comprise Z-HCFO-1224yd. In some embodiments, the gas mixture comprises Z-HCFO-1224yd alone. In some embodiments, the gas mixture comprises Z-HCFO-1224yd in admixture with one or more of the compounds listed in Table 1.

In some embodiments, the surface deposits removed include those materials commonly deposited by chemical vapor deposition (CVD) or plasma-enhanced chemical vapor deposition (PECVD) or similar processes. Such materials include nitrogen-containing deposits such as, without limitation, silicon nitride, silicon oxynitride, silicon carbonitride (SiCN), silicon boronitride (SiBN), and metal nitrides, such as tungsten nitride, titanium nitride or tantalum nitride. In some embodiments, a surface deposit is silicon nitride.

In some embodiments, surface deposits are removed from the interior of a process chamber that is used in fabricating electronic devices. In some embodiments, the process chamber is a CVD chamber or a PECVD chamber. In some embodiments, the gas mixture is used to remove surface deposits from metals. In some embodiments, the gas mixture is used to clean plasma etching chambers. In some embodiments, the gas mixture is used to remove N-containing thin films from a wafer. In some embodiments, the gas is used in an etching application.

In some embodiments, the process involves an activating step wherein a cleaning gas mixture is activated in a remote chamber. Activation can be accomplished by any means that allows for the achievement of dissociation of a large fraction of the feed gas, such as: radio frequency (RF) energy, direct current (DC) energy, laser illumination, and microwave energy. In some embodiments, a transformer coupled inductively to lower frequency RF power sources in which the plasma has a torroidal configuration and acts as the secondary of the transformer is used. In some embodiments, the use of lower frequency RF power allows the use of magnetic cores that enhance the inductive coupling with respect to capacitive coupling, thereby allowing the more efficient transfer of energy to the plasma without excessive ion bombardment which limits the lifetime of the remote plasma source chamber interior. In some embodiments, the RF power has a frequency lower than 1000 kHz. In some embodiments, the power source is a remote microwave, inductively, or capacitively coupled plasma source. In some embodiments, the gas is activated using a glow discharge.

Dielectric Methods

In some embodiments, Z-HCFO-1224yd is used as a dielectric in an electrical apparatus. In some embodiments, Z-HCFO-1224yd is used alone. In some embodiments, Z-HCFO-1224yd is used in admixture with one or more of the compounds listed in Table 1. In an electrical apparatus for medium- or high-voltages, the functions of electrical insulation and electric arc extinction are typically performed by an insulating gas that is confined inside the apparatus. In the generally accepted sense of the term, "medium-voltage" denotes a voltage that is greater than 1,000 volts AC and strictly greater than 1,500 volts DC, but that does not exceed 52,000 volts AC or exceed 75,000 volts DC, whereas the term "high-voltage" denotes a voltage that is strictly greater than 52,000 volts AC and greater than 75,000 DC.

In some embodiments, the insulating gas used inside these apparatuses contains Z-HCFO-1224yd. In some embodiments, the insulating gas used inside these apparatuses is a mixture of Z-HCFO-1224yd with one or more of the compounds listed in Table 1.

While the present invention has been particularly shown and described with reference to preferred embodiments, it will be readily appreciated by those of ordinary skill in the art that various changes and modifications may be made without departing from the scope of the invention. It is intended that the claims be interpreted to cover the disclosed embodiment, those alternatives which have been discussed above and all equivalents thereto.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

It is to be appreciated that certain features are, for clarity, described herein in the context of separate embodiments, may also be provided in combination in a single embodiment. Conversely, various features that are, for brevity, described in the context of a single embodiment, may also be provided separately or in any sub-combination. Further, reference to values stated in ranges include each and every value within that range.

EXAMPLES

The present disclosure is further defined in the following Examples. It should be understood that these Examples, while indicating preferred embodiments, are given by way of illustration only. From the above discussion and these Examples, one skilled in the art can ascertain the preferred features, and without departing from the spirit and scope thereof, can make various changes and modifications to adapt it to various uses and conditions.

Example 1: Cooling and Heating Performance Data

The cooling and heating performance for pure fluids and compositions containing Z-HCFO-1224yd were measured. Measurements included pressure in the evaporator (Evap) and condenser (Cond), discharge temperature (Disch T), and Average Temperature Glide for the evaporator and condenser (Avg Temp Glide). Relative energy efficiency (COP) and capacity (Cap) for mixtures containing Z-HCFO-1224yd (1224ydZ) as compared to Z-HCFO-1224yd and pure fluids HFC-245fa, HCFC-123 and HCFO-1233zdE were measured. The results are shown in Table 4, below.

The data was based on the following conditions:

| | |
|---|---|
| Evaporator temperature | 4.44° C. |
| Condenser temperature | 37.78° C. |
| Subcool amount | 0 K |
| Return gas temperature | 25° C. |
| Compressor efficiency | 75% |

TABLE 4

| Composition | Wt % | Evap (kPa) | Cond (kPa) | Disch T (C.) | Avg Temp Glide (K) | Cooling Cap Rel to 245fa | Cooling COP Rel to 245fa | Heating Cap Rel to 245fa | Heating COP Rel to 245fa |
|---|---|---|---|---|---|---|---|---|---|
| 1224ydZ | 100 | 54.8 | 239 | 72 | 0 | 100% | 100% | 100% | 100% |
| R-245fa | 100 | 64.6 | 232 | 62 | 0 | 113% | 112% | 111% | 110% |
| R-123 | 100 | 39.9 | 144 | 64 | 0 | 71% | 113% | 70% | 111% |
| 1233zdE | 100 | 57.6 | 199 | 69 | 0 | 100% | 113% | 98% | 111% |
| 1224ydZ/32 | 90/10 | 91.6 | 467 | 87 | 17.4 | 176% | 94% | 178% | 95% |
| 1224ydZ/125 | 90/10 | 68.5 | 339 | 78 | 8.7 | 129% | 95% | 130% | 96% |
| 1224ydZ/134a | 90/10 | 66.8 | 298 | 75 | 4.4 | 122% | 98% | 122% | 99% |
| 1224ydZ/152a | 90/10 | 72.5 | 316 | 76 | 5.3 | 131% | 99% | 131% | 99% |
| 1224ydZ/245fa | 10/90 | 63.6 | 233 | 63 | 0.02 | 112% | 111% | 110% | 109% |
| 1224ydZ/245fa | 50/50 | 59.7 | 236 | 67 | 0.1 | 107% | 106% | 106% | 105% |
| 1224ydZ/245fa | 90/10 | 55.8 | 239 | 71 | 0.02 | 101% | 101% | 101% | 101% |
| 1224ydZ/1234yf | 90/10 | 66.0 | 295 | 74 | 4.3 | 120% | 98% | 120% | 98% |
| 1224ydZ/t-1234ze | 90/10 | 64.1 | 279 | 73 | 2.7 | 116% | 99% | 116% | 99% |
| 1224ydZ/t-DCE | 10/90 | 19.9 | 81.2 | 94 | 4.3 | 40% | 112% | 41% | 110% |
| 1224ydZ/t-DCE | 50/50 | 28.6 | 123 | 85 | 7.4 | 58% | 109% | 57% | 108% |
| 1224ydZ/t-DCE | 90/10 | 46.6 | 203 | 75 | 2.8 | 88% | 103% | 88% | 103% |
| 1224ydZ/1336mzzZ | 10/90 | 32.8 | 129 | 59 | 0.9 | 61% | 111% | 60% | 110% |
| 1224ydZ/1336mzzZ | 50/50 | 41.3 | 171 | 65 | 2.2 | 77% | 107% | 76% | 106% |
| 1224ydZ/1366mzzZ | 90/10 | 51.8 | 224 | 71 | 0.7 | 95% | 102% | 95% | 101% |
| 1224ydZ/1336mzzE | 10/90 | 84.7 | 291 | 61 | 0.3 | 139% | 110% | 137% | 108% |
| 1224ydZ/1336mzzE | 50/50 | 68.9 | 266 | 66 | 0.6 | 119% | 104% | 118% | 104% |
| 1224ydZ/1336mzzE | 90/10 | 57.2 | 244 | 71 | 0.2 | 103% | 101% | 103% | 101% |
| 1224ydZ/1233zdE | 10/90 | 57.3 | 202 | 69 | 0.04 | 100% | 112% | 98% | 110% |
| 1224ydZ/1233zdE | 50/50 | 56.3 | 217 | 71 | 0.1 | 100% | 107% | 99% | 106% |
| 1224ydZ/1233zdE | 90/10 | 55.1 | 234 | 72 | 0.05 | 100% | 101% | 100% | 101% |
| 1224ydZ/1438ezyE | 10/90 | 36.6 | 142 | 54 | 1.1 | 66% | 110% | 65% | 108% |
| 1224ydZ/1438ezyE | 50/50 | 46.8 | 190 | 61 | 1.7 | 85% | 106% | 84% | 105% |
| 1224ydZ/1438ezyE | 90/10 | 53.8 | 231 | 70 | 0.3 | 98% | 101% | 98% | 101% |
| 1224ydZ/1438ezyZ | 10/90 | 21.1 | 81.5 | 53 | 4.6 | 39% | 113% | 38% | 111% |
| 1224ydZ/1438ezyZ | 50/50 | 35.2 | 142 | 61 | 8.0 | 66% | 110% | 65% | 109% |
| 1224ydZ/1438ezyZ | 90/10 | 51.3 | 217 | 69 | 1.7 | 94% | 103% | 94% | 103% |
| 1224ydZ/1336mzzE-Epo | 10/90 | 30.1 | 120 | 60 | 1.3 | 56% | 111% | 56% | 109% |
| 1224ydZ/1336mzzE-Epo | 50/50 | 40.0 | 168 | 65 | 2.8 | 75% | 107% | 74% | 106% |
| 1224ydZ/1336mzzE-Epo | 90/10 | 51.6 | 223 | 71 | 0.9 | 95% | 102% | 95% | 101% |
| 1224ydZ/CFO-1112 | 10/90 | 39.0 | 177 | 91 | 0.3 | 81% | 108% | 80% | 107% |
| 1224ydZ/CFO-1112 | 50/50 | 45.5 | 204 | 82 | 0.6 | 90% | 105% | 89% | 104% |
| 1224ydZ/CFO-1112 | 90/10 | 52.8 | 232 | 74 | 0.2 | 98% | 101% | 98% | 101% |

The results showed that Z-HCFO-1224yd (1224ydZ) is a good alternative to HFC-245fa, HCFC-123 and 1233zdE. It is a particularly close match in capacity to 1233zdE. The mixtures shown were also good alternatives to the pure fluids shown with similar capacities and efficiencies. Mixtures with low temperature glide (<~1K) are particularly suitable for use in centrifugal chillers. Mixtures with high glide are suitable for use in heat exchangers with counter-current flow or cross-countercurrent flow.

Compressor discharge temperatures for the mixtures and pure fluids were also similar.

Example 2: Cooling and Heating Performance Data

The cooling and heating performance for compositions containing Z-HCFO-1224yd were measured. Measurements included pressure in the evaporator (Evap) and condenser (Cond), discharge temperature (Disch T), and Average Temperature Glide for the evaporator and condenser (Avg Temp Glide). Relative energy efficiency (COP) and capacity (Cap) for mixtures containing Z-HCFO-1224yd (1224ydZ) as compared to HFC-236fa, and also to HCFC-124 were measured. The results are shown in Table 5, below.

The data was based on the following conditions:

| Evaporator temperature | 4.44° C. |
| Condenser temperature | 37.78° C. |
| Subcool amount | 0 K |
| Return gas temperature | 25° C. |
| Compressor efficiency | 75% |

TABLE 5

| Composition | Wt % | Evap (kPa) | Cond (kPa) | Disch T (C.) | Avg Temp Glide (K) | Cooling Cap Rel to 236fa | Cooling COP Rel to 236fa | Heating Cap Rel to 236fa | Heating COP Rel to 236fa |
|---|---|---|---|---|---|---|---|---|---|
| 236fa | 100 | 129 | 406 | 57 | 0 | 100% | 100% | 100% | 100% |
| R-124 | 100 | 192 | 558 | 51 | 0 | 133% | 98% | 134% | 98% |
| 1224ydZ/125 | 50/50 | 193 | 756 | 74 | 24.2 | 160% | 89% | 163% | 91% |
| 1224ydZ/134a | 50/50 | 146 | 537 | 74 | 11.9 | 121% | 92% | 122% | 94% |
| 1224ydZ/152a | 50/50 | 166 | 567 | 78 | 10.3 | 133% | 94% | 134% | 95% |
| 1224ydZ/1234yf | 50/50 | 144 | 526 | 69 | 12.4 | 116% | 91% | 118% | 92% |
| 1224ydZ/t-1234ze | 10/90 | 217 | 653 | 67 | 3.4 | 156% | 96% | 157% | 96% |
| 1224ydZ/t-1234ze | 50/50 | 121 | 444 | 71 | 8.0 | 100% | 92% | 101% | 94% |

The results showed that mixtures containing Z-HCFO-1224yd were a close match to both HFC-236fa and HCFC-124. The mixtures shown had similar cooling and heating capacities and efficiencies. Compressor discharge temperatures for the mixtures were also similar.

Example 3: Cooling and Heating Performance Data

The cooling and heating performance for compositions containing Z-HCFO-1224yd were measured. Measurements included pressure in the evaporator (Evap) and condenser (Cond), discharge temperature (Disch T), and Average Temperature Glide for the evaporator and condenser (Avg Temp Glide). Relative energy efficiency (COP) and capacity (Cap) for mixtures containing Z-HCFO-1224yd (1224ydZ) as compared to HFO-1234yf, HFC-134a and HFO-t-1234ze were measured. The results are shown in Table 6, below.

The data was based on the following conditions:

| Evaporator temperature | 4.44° C. |
| Condenser temperature | 37.78° C. |
| Subcool amount | 0 K |
| Return gas temperature | 25° C. |
| Compressor efficiency is | 75% |

TABLE 6

| Composition | Wt % | Evap (kPa) | Cond (kPa) | Disch T (C.) | Avg Temp Glide (K) | Cooling Cap Rel to 1234yf | Cooling COP Rel to 1234yf | Heating Cap Rel to 1234yf | Heating COP Rel to 1234yf |
|---|---|---|---|---|---|---|---|---|---|
| 1234yf | 100 | 364 | 959 | 61 | 0 | 100% | 100% | 100% | 100% |
| 134a | 100 | 342 | 957 | 69 | 0 | 103% | 102% | 103% | 101% |
| t-1234ze | 100 | 254 | 719 | 66 | 0 | 79% | 103% | 78% | 103% |
| 1224ydZ/134a | 10/90 | 284 | 850 | 71 | 4.9 | 90% | 99% | 90% | 99% |
| 1224ydZ/152a | 10/90 | 275 | 796 | 79 | 3.1 | 87% | 101% | 87% | 101% |
| 1224ydZ/1234yf | 10/90 | 297 | 847 | 63 | 5.4 | 87% | 98% | 87% | 98% |

The results showed that mixtures containing Z-HCFO-1224yd were a close match to HFO-1234yf, HFC-134a and HFO-t-1234ze. Mixtures shown had similar cooling and heating capacities and efficiencies. Compressor discharge temperatures for the mixtures were also similar.

Example 4: Cooling and Heating Performance Data

The cooling and heating performance for compositions containing Z-HCFO-1224yd were measured. Measurements included pressure in the evaporator (Evap) and condenser (Cond), discharge temperature (Disch T), and Average Temperature Glide for the evaporator and condenser (Avg Temp Glide). Relative energy efficiency (COP) and capacity (Cap) for mixtures containing Z-HCFO-1224yd (1224ydZ) as compared to R-407C, HCFC-22, and R-410A were measured. The results are shown in Table 7, below.

The data are based on the following conditions.

| | |
|---|---|
| Evaporator temperature | 4.44° C. |
| Condenser temperature | 37.78° C. |
| Subcool amount | 0 K |
| Return gas temperature | 25° C. |
| Compressor efficiency is | 75% |

TABLE 7

| Composition | Wt % | Evap (kPa) | Cond (kPa) | Disch T (C.) | Avg Temp Glide (K) | Cooling Cap Rel to 407 C. | Cooling COP Rel to 407 C. | Heating Cap Rel to 407 C. | Heating COP Rel to 407 C. |
|---|---|---|---|---|---|---|---|---|---|
| R-407C | 100 | 574 | 1536 | 77 | 4.9 | 100% | 100% | 100% | 100% |
| R-22 | 100 | 573 | 1451 | 85 | 0 | 98% | 102% | 98% | 102% |
| R-410A | 100 | 912 | 2267 | 83 | 0.1 | 140% | 94% | 142% | 95% |
| 1224ydZ/32 | 10/90 | 753 | 2069 | 104 | 8.5 | 129% | 91% | 131% | 92% |
| 1224ydZ/32 | 50/50 | 362 | 1186 | 95 | 27.9 | 77% | 98% | 77% | 98% |
| 1224ydZ/125 | 10/90 | 537 | 1533 | 67 | 11.9 | 88% | 91% | 90% | 92% |

The results showed that mixtures containing HCFO-1224yd were a close match to R-407C, R-22 and R-410A. Mixtures shown had similar cooling and heating capacities and efficiencies. Compressor discharge temperatures for the mixtures were also similar.

Example 5: Power Cycle with Z-HCFO-1224yd as the Working Fluid

The cycle efficiency of an ORC system utilizing HFC-245fa as a working fluid was compared to the cycle efficiency of the ORC system utilizing Z-HCFO-1224yd as the working fluid. It was assumed that the maximum feasible working pressure of the ORC system was about 2.5 MPa and that a heat source was available that would allow the temperature of either working fluid at the expander inlet to be maintained at 160° C.

Table 8 is a comparative table showing HFC-245fa and Z-HCFO-1224yd utilized as the working fluids in a subcritical Rankine power cycle. The operating parameters of the ORC system using HFC-245fa as the working fluid are shown under the column labeled "HFC-245fa." The operating parameters of the ORC system using HCFO-1224yd (Z) as the working fluid are shown under the column labeled "Z-HCFO-1224yd."

TABLE 8

| Parameters | Units | HFC-245fa | Z-HCFO-1224yd |
|---|---|---|---|
| Mean Molecular Weight | g/mol | 134.05 | 148.5 |
| GWP | — | 858 | Lower than 1 |
| Tcr | ° C. | 154 | 156 |
| Pcr | MPa | 3.65 | 3.38 |
| Evaporator Temp | ° C. | 133.5 | 140.5 |
| Evaporator Superheat | ° K | 26.5 | 19.5 |
| Condenser Temperature | ° C. | 85 | 85 |
| Condenser Sub-cooling | ° K | 5 | 5 |
| Expander Efficiency | | 0.75 | 0.75 |
| Pump Efficiency | | 0.55 | 0.55 |
| Expander Inlet Temperature | ° C. | 160 | 160 |
| Evaporator Pressure | MPa | 2.5 | 2.5 |
| Condenser Pressure | MPa | 0.89 | 0.87 |
| Expansion Ratio | | 2.8 | 2.9 |
| Expander Exit Temperature | ° C. | 128.9 | 121.5 |
| Cycle Effic | % | 6.02 | 6.56 |
| Cycle Effic vs HFC-245fa | % | | +8.97% |
| Volumetric Capacity | kJ/m3 | 539 | 516 |
| Volumetric Capacity vs. HFC-245fa (@ expander outlet) | | | −4.3% |

The evaporating temperature with HFC-245fa was limited to 133.5° C. to ensure that the pressure within the evaporator remained below the maximum permitted design working pressure for commonly available commercial equipment components (e.g., heat exchangers) for ORC systems.

The above example showed that using Z-HCFO-1224yd achieved an 8.97% higher cycle efficiency versus HFC-245fa when used in an ORC system designed for use with HFC-245fa as the working fluid while reducing the working fluid GWP by more than 99.88%. This shows that the working fluid containing HFC-245fa in an existing ORC system can be replaced by evacuating the working fluid, flushing the ORC system with a lubricant or working fluid containing Z-HCFO-1224yd, and charging the ORC system with a working fluid containing Z-HCFO-1224yd.

Example 6: High Temperature Heat Pump Performance with Z-HCFO-1224yd for Lifting Heat from 80° C. to 126° C.

A heat pump was used to lift heat from 80° C. to 126° C., operating with either Z-HCFO-1224yd or HFC-245fa as the working fluid. The performance data is shown in Table 9, below.

TABLE 9

| | Units | HFC-245fa | Z-HCFO-1224yd |
|---|---|---|---|
| GWP | | 858 | <1 |
| $T_{cr}$ | ° C. | 154 | 156 |
| $P_{cr}$ | MPa | 3.65 | 3.38 |
| $T_{evap}$ | ° C. | 80 | 80 |
| $T_{cond}$ | ° C. | 126 | 126 |

TABLE 9-continued

| | Units | HFC-245fa | Z-HCFO-1224yd |
|---|---|---|---|
| Lift | ° C. | 46 | 46 |
| Suction Superheat | K | 25 | 25 |
| Liquid Subcooling | K | 15 | 15 |
| Compressor Efficiency | | 0.7 | 0.7 |
| $P_{cond}$ | MPa | 2.17 | 1.95 |
| $T_{disch}$ | ° C. | 146 | 147 |
| $COP_h$ | | 5.644 | 5.636 |

As shown in Table 9, Z-HCFO-1224yd virtually matches the $COP_h$ of HFC-245fa, while offering a working fluid GWP lower than the GWP of HFC-245fa by more than 99.88%.

Example 7: Flame Suppression

A composition containing Z-HCFO-1224yd was used as a flame suppression composition. To evaluate total flooding fire suppression applications the NFPA 2001 cup burner was used. Here a small fire of heptane was located in a chimney which had air flowing around the flame to supply the needed oxygen. To this air stream Z-HCFO-1224yd was added until the flame was extinguished. Table 10, below, shows the extinguishing concentration for heptane using Z-HCFO-1224yd as the fire extinguishant.

TABLE 10

| Fuel | % Z-HCFO-1224yd |
|---|---|
| heptane | 5.8 |

Example 8: Z-HCFO-1224yd and 1,1,1,4,4,4-Hexafluoro-2-Butene (Z-HFO-1336Mzz) Azeotrope Compositions The existence of azeotrope-like compositions between the binary pair Z-1,1,1,4,4,4-hexafluoro-2-butene and Z-1-chloro-2,3,3,3-tetrafluoropropene was tested. To determine the relative volatility of each binary pair, the PTx Method was used. In this procedure, for each binary pair, the total absolute pressure in a sample cell having a volume of 85 mL was measured at constant temperature for various binary compositions. These measurements were then reduced to equilibrium vapor and liquid compositions using the non-random two-liquid model (NRTL) equation. The vapor pressure measured versus the composition in the PTx sample cell for this binary system is shown in FIG. 1.

Azeotrope-like compositions of Z-1,1,1,4,4,4-hexafluoro-2-butene (Z-HFO-1336mzz) and Z-1-chloro-2,3,3,3-tetrafluoropropene (Z-HCFO-1224yd) at 31.8° C. were formed, as indicated by mixtures of about 1 to 22 mole % Z-1,1,1,4,4,4-hexafluoro-2-butene and about 78 to 99 mole % Z-1-chloro-2,3,3,3-tetrafluoropropene, and mixtures of about 93 to 99 mole % Z-1,1,1,4,4,4-hexafluoro-2-butene and about 1 to 7 mole % Z-1-chloro-2,3,3,3-tetrafluoropropene (See FIG. 1).

Substantially constant boiling, azeotrope-like compositions included the mixtures of Z-1,1,1,4,4,4-hexafluoro-2-butene (Z-HFO-1336mzz) and Z-1-chloro-2,3,3,3-tetrafluoropropene (Z-HCFO-1224yd) shown in Table 11A below (over this temperature range, the difference in dew point pressure and bubble point pressure of the composition at a particular temperature is less than or equal to 5 percent (based upon the bubble point pressure). Azeotrope-like compositions of 1-24 mole % and 62-99 mole % Z-HCFO-1224yd and 1-38 mole % and 76-99 mole % Z-HFO-1336mzz were are formed at temperatures ranging from about −40° C. to about 140° C. (over this temperature range, the difference in dew point pressure and bubble point pressure of the composition at a particular temperature is less than or equal to 3 percent (based upon the bubble point pressure)) (Table 11B).

TABLE 11A

| T (° C.) | % Z-HFO-1336mzz | % Z-HCFO-1224yd |
|---|---|---|
| −40 | 1-7 | 93-99 |
| −40 | 92-99 | 1-8 |
| −20 | 1-8 | 92-99 |
| −20 | 90-99 | 1-10 |
| 0 | 1-10 | 90-99 |
| 0 | 89-99 | 1-11 |
| 20 | 1-13 | 87-99 |
| 20 | 87-99 | 1-13 |
| 40 | 1-16 | 84-99 |
| 40 | 85-99 | 1-15 |
| 60 | 1-22 | 78-99 |
| 60 | 81-99 | 1-19 |
| 80 | 1-29 | 71-99 |
| 80 | 76-99 | 1-24 |
| 100 | 1-38 | 62-99 |
| 100 | 69-99 | 1-31 |
| 120 | 1-99 | 1-99 |
| 140 | 1-99 | 1-99 |

TABLE 11B

| T (° C.) | % Z-HFO-1336mzz | % Z-HCFO-1224yd |
|---|---|---|
| −40 | 1-5 | 95-99 |
| −40 | 95-99 | 1-5 |
| −20 | 1-5 | 95-99 |
| −20 | 95-99 | 1-5 |
| 0 | 1-7 | 93-99 |
| 0 | 94-99 | 1-6 |
| 20 | 1-8 | 92-99 |
| 20 | 92-99 | 1-8 |
| 40 | 1-11 | 89-99 |
| 40 | 91-99 | 1-9 |
| 60 | 1-14 | 86-99 |
| 60 | 89-99 | 1-11 |
| 80 | 1-19 | 81-99 |
| 80 | 87-99 | 1-13 |
| 100 | 1-23 | 77-99 |
| 100 | 84-99 | 1-16 |
| 120 | 1-29 | 71-99 |
| 120 | 81-99 | 1-19 |
| 140 | 1-38 | 62-99 |
| 140 | 76-99 | 1-24 |

Example 9: Z-HCFO-1224yd and Methyl Formate Azeotrope Compositions

To determine the relative volatility of the binary pair of Z-HCFO-1224yd and methyl formate, the PTx method described above in Example 8 was used. The pressure in a PTx cell of known volume was measured at constant temperature for various binary compositions. These measurements were then reduced to equilibrium vapor and liquid compositions in the cell using the NRTL equation.

Figure 2:
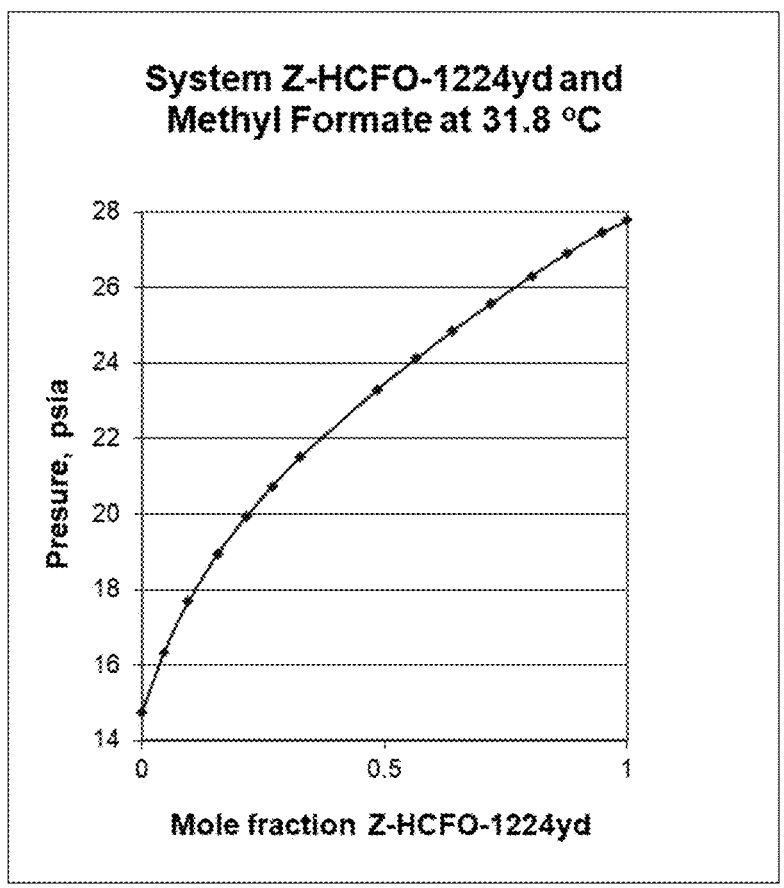
FIG. 2 shows the vapor pressure measured versus the composition in the PTx sample cell for the binary system of Z-HCFO-1224yd and methyl formate. The experimental data points are shown as solid points and the solid line is drawn from data calculated using the NRTL equation.

The pressures measured versus the compositions in the PTx cell for Z-HCFO-1224yd/methyl formate mixtures are shown in FIG. 2, which graphically illustrates the formation of azeotrope-like compositions of 1-3 mole % Z-HCFO-1224yd and 97-99 mole % methyl formate at 31.8° C. and a pressure of about 15 psia, and also illustrates the formation of azeotrope-like compositions of 64-99 mole % Z-HCFO-1224yd and 1-36 mole % methyl formate at 31.8° C. and pressures ranging from about 25 to 28 psia.

Azeotrope-like compositions of 1-99 mole % Z-HCFO-1224yd and 1-99 mole % methyl formate are formed at temperatures ranging from about −40° C. to about 140° C. (over this temperature range, the difference in dew point pressure and bubble point pressure of the composition at a particular temperature is less than or equal to 5 percent (based upon the bubble point pressure) (Table 12A). Azeotrope-like compositions of 1-99 mole % Z-HCFO-1224yd and 1-99 mole % methyl formate were are formed at temperatures ranging from about −40° C. to about 140° C. (over this temperature range, the difference in dew point pressure and bubble point pressure of the composition at a particular temperature is less than or equal to 3 percent (based upon the bubble point pressure)). At 20° C. azeotrope-like compositions of from 85 to 99 mole % Z-HCFO-1224yd and from 1 to 15 mole % methyl formate were formed. Azeotrope-like compositions are listed in Tables 12A-12B below.

TABLE 12A

| T (° C.) | % Z-HCFO-1224yd | % methyl formate |
|---|---|---|
| −40 | 90-99 | 1-10 |
| −20 | 88-99 | 1-12 |
| 0 | 84-99 | 1-16 |
| 20 | 1-2 | 98-99 |
| 20 | 78-99 | 1-22 |
| 40 | 1-4 | 96-99 |
| 40 | 70-99 | 1-30 |
| 60 | 1-13 | 87-99 |
| 60 | 60-99 | 1-40 |
| 80 | 1-18 | 82-99 |
| 80 | 49-99 | 1-51 |
| 100 | 1-99 | 1-99 |
| 120 | 1-99 | 1-99 |
| 140 | 1-99 | 1-99 |

TABLE 12B

| T (° C.) | % Z-HCFO-1224yd | % methyl formate |
|---|---|---|
| −40 | 93-99 | 1-7 |
| −20 | 92-99 | 1-8 |
| 0 | 89-99 | 1-11 |
| 20 | 85-99 | 1-15 |
| 40 | 79-99 | 1-21 |
| 60 | 1-3 | 97-99 |
| 60 | 72-99 | 1-28 |
| 80 | 1-9 | 91-99 |
| 80 | 64-99 | 1-36 |
| 100 | 1-12 | 88-99 |
| 100 | 56-99 | 1-44 |
| 120 | 1-18 | 82-99 |
| 120 | 46-99 | 1-54 |
| 140 | 1-99 | 1-99 |

Example 10: Z-HCFO-1224yd and
E-HCFO-1233zd Azeotrope Compositions

To determine the relative volatility of the binary pair of Z-HCFO-1224yd and E-HCFO-1233zd, the PTx method described above in Example 8 was used. The pressure in a PTx cell of known volume was measured at constant temperature for various binary compositions. These measurements were then reduced to equilibrium vapor and liquid compositions in the cell using the NRTL equation.

Figure 3:
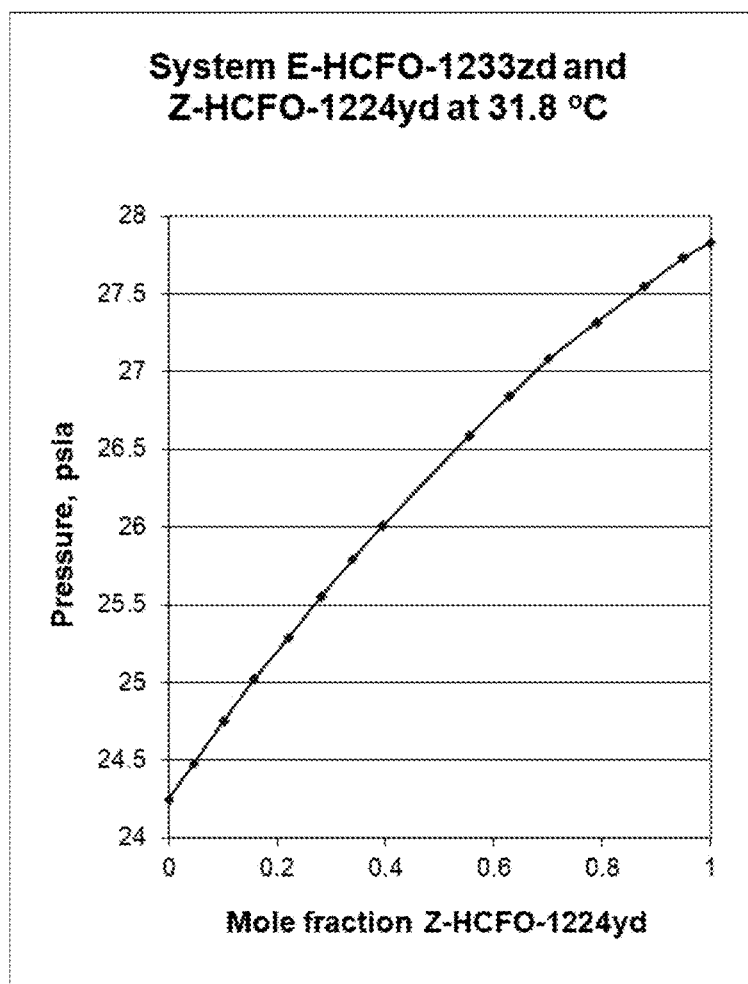
FIG. 3 shows the vapor pressure measured versus the composition in the PTx sample cell for the binary system of E-1-chloro-3,3,3-trifluoropropene (E-HCFO-1233zd) and Z-HCFO-1224yd. The experimental data points are shown as solid points and the solid line is drawn from data calculated using the NRTL equation.

The pressures measured versus the compositions in the PTx cell for E-1-chloro-3,3,3-trifluoropropene/Z-1-chloro-2,3,3,3-tetrafluoropropene mixtures are shown in FIG. 3 which graphically illustrates the formation of azeotrope-like compositions of 1-99 mole % E-1-chloro-3,3,3-trifluoropropene and 1-99 mole % Z-1-chloro-2,3,3,3-tetrafluoro-propene at 31.8° C. and pressures ranging from about 24 to 38 psia.

Azeotrope-like compositions of 1-99 mole % E-1-chloro-3,3,3-trifluoropropene and 1-99 mole % Z-1-chloro-2,3,3,3-tetrafluoropropene are formed at temperatures ranging from about −40° C. to about 140° C. (over this temperature range, the difference in dew point pressure and bubble point pressure of the composition at a particular temperature is less than or equal to 3 percent (based upon the bubble point pressure) (Table 13).

TABLE 13

| T (° C.) | % E-HCFO-1233zd | % Z-HCFO-1224yd |
|---|---|---|
| −40 | 1-99 | 1-99 |
| −20 | 1-99 | 1-99 |
| 0 | 1-99 | 1-99 |
| 20 | 1-99 | 1-99 |
| 40 | 1-99 | 1-99 |
| 60 | 1-99 | 1-99 |
| 80 | 1-99 | 1-99 |
| 100 | 1-99 | 1-99 |
| 120 | 1-99 | 1-99 |
| 140 | 1-99 | 1-99 |

Example 11: Z-HCFO-1224yd and
E-HFO-1336Mzz Azeotrope Compositions

To determine the relative volatility of the binary pair of Z-HCFO-1224yd and E-HFO-1336mzz, the PTx method described above in Example 8 was used. The pressure in a PTx cell of known volume was measured at constant temperature for various binary compositions. These measurements were then reduced to equilibrium vapor and liquid compositions in the cell using the NRTL equation.

Figure 4:
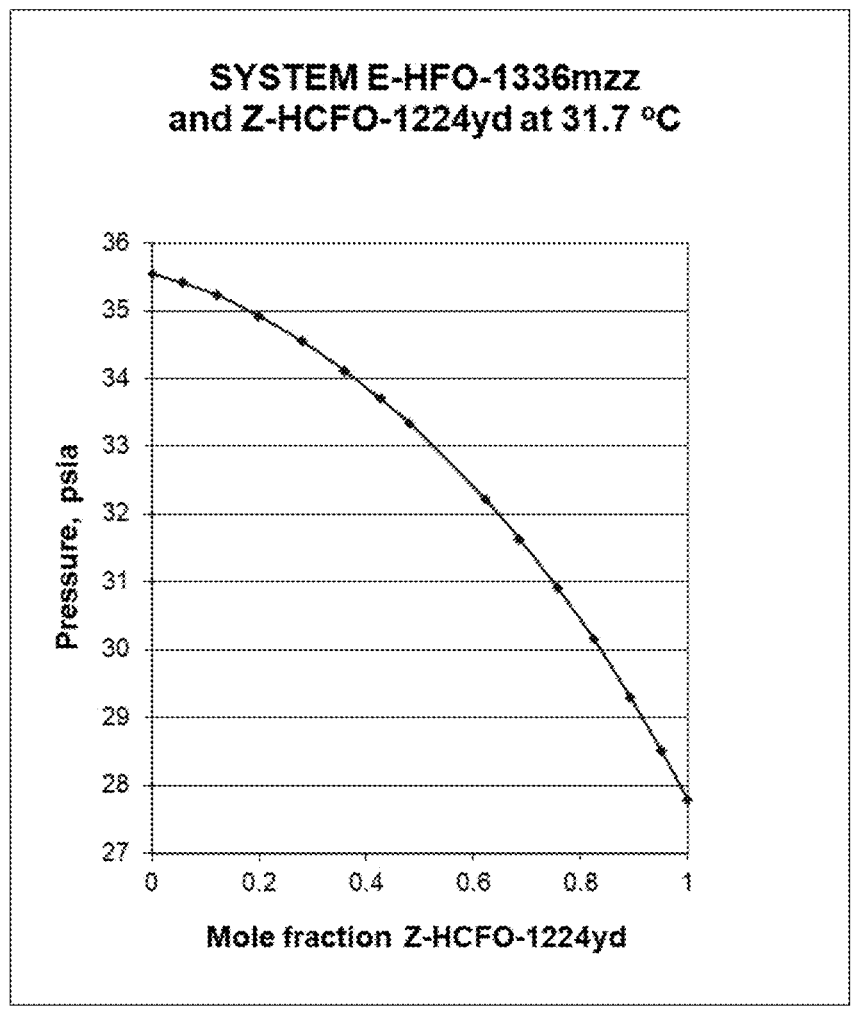
FIG. 4 shows the vapor pressure measured versus the composition in the PTx sample cell for the binary system of E-HFO-1336mzz and Z-HCFO-1224yd. The experimental data points are shown as solid points and the solid line is drawn from data calculated using the NRTL equation.

The pressures measured versus the compositions in the PTx cell for E-HFO-1336mzz/Z-HCFO-1224yd mixtures are shown in FIG. 4, which graphically illustrates the formation of azeotrope-like compositions of 1-99 mole % E-HFO-1336mzz and 1-99 mole % E-HCFO-1224yd at 31.7° C. and pressures ranging from about 28 to 36 psia.

Azeotrope-like compositions of 1-99 mole % E-HFO-1336mzz and 1-99 mole % Z-HCFO-1224yd are formed at temperatures ranging from about −40° C. to about 120° C. (over this temperature range, the difference in dew point pressure and bubble point pressure of the composition at a particular temperature is less than or equal to 5 percent (based upon the bubble point pressure) (Table 14A). Azeotrope-like compositions of 5-95 mole % E-HFO-1336mzz and 5-95 mole % Z-HCFO-1224yd are formed at temperatures ranging from about −40° C. to about 120° C. (over this temperature range, the difference in dew point pressure and bubble point pressure of the composition at a particular temperature is less than or equal to 3 percent (based upon the bubble point pressure) (Table 14B).

TABLE 14A

| T (° C.) | % E-HFO-1336mzz | % Z-HCFO-1224yd |
|---|---|---|
| −40 | 1-99 | 1-99 |
| −20 | 1-99 | 1-99 |
| 0 | 1-99 | 1-99 |
| 20 | 1-99 | 1-99 |
| 40 | 1-99 | 1-99 |
| 60 | 1-99 | 1-99 |

TABLE 14A-continued

| T (° C.) | % E-HFO-1336mzz | % Z-HCFO-1224yd |
|---|---|---|
| 80 | 1-99 | 1-99 |
| 100 | 1-99 | 1-99 |
| 120 | 1-99 | 1-99 |
| 140 | 1-99 | 1-99 |

TABLE 14B

| T (° C.) | % E-HFO-1336mzz | % Z-HCFO-1224yd |
|---|---|---|
| −40 | 1-16 | 84-99 |
| −40 | 59-99 | 1-41 |
| −20 | 1-27 | 73-99 |
| −20 | 41-99 | 1-59 |
| 0 | 1-99 | 1-99 |
| 20 | 1-99 | 1-99 |
| 40 | 1-99 | 1-99 |
| 60 | 1-99 | 1-99 |
| 80 | 1-99 | 1-99 |
| 100 | 1-99 | 1-99 |
| 120 | 1-99 | 1-99 |
| 140 | 1-99 | 1-99 |

Example 12: Z-HCFO-1224yd and E-1,1,1,4,4,5,5,5-Octafluoro-2-Pentene (E-HFO-1438Mzz) Azeotrope Compositions To determine the relative volatility of the binary pair of Z-HCFO-1224yd and E-1,1,1,4,4,5,5,5-octafluoro-2-pentene (E-HFO-1438mzz), the PTx method described above in Example 8 was used. The pressure in a PTx cell of known volume was measured at constant temperature for various binary compositions. These measurements were then reduced to equilibrium vapor and liquid compositions in the cell using the NRTL equation.

Figure 5:
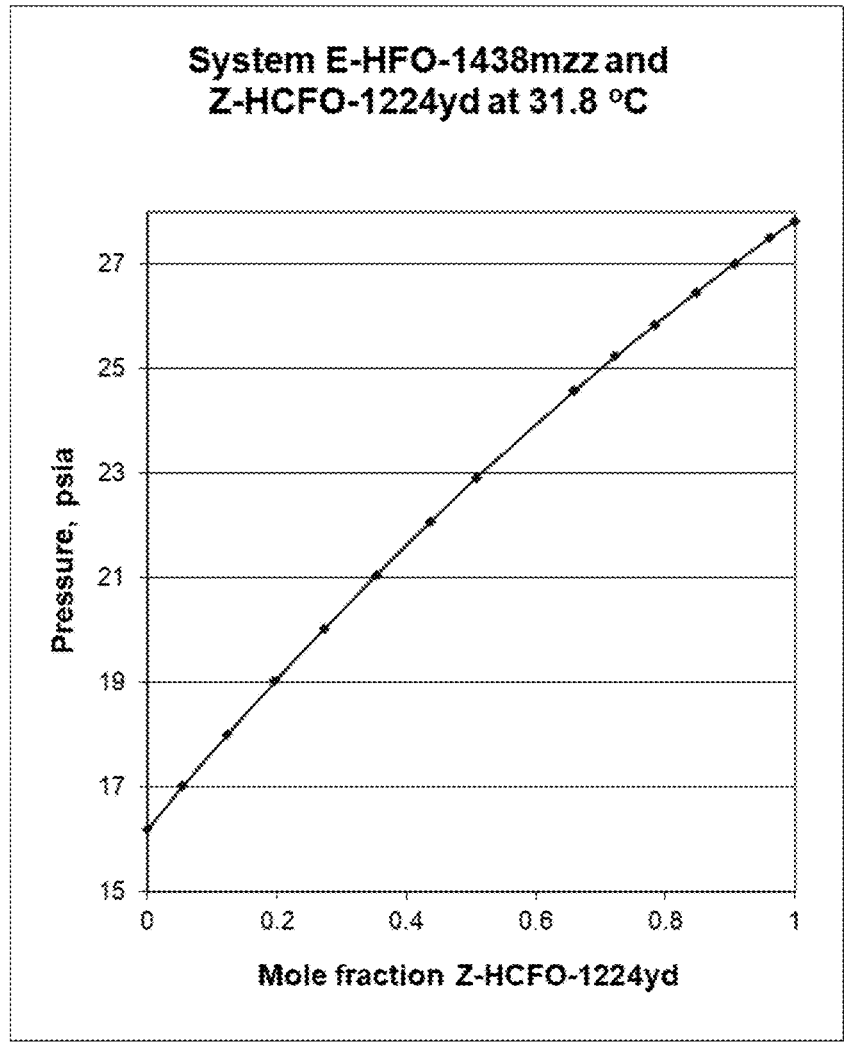
FIG. 5 shows the vapor pressure measured versus the composition in the PTx sample cell for the binary system of E-1,1,1,4,4,5,5,5-octafluoro-2-pentene (E-HFO-1438mzz) and Z-HCFO-1224yd. The experimental data points are shown as solid points and the solid line is drawn from data calculated using the NRTL equation.

The pressures measured versus the compositions in the PTx cell for E-1,1,1,4,4,5,5,5-octafluoro-2-pentene/Z-1-chloro-2,3,3,3-tetrafluoropropene mixtures are shown in FIG. 5, which graphically illustrates the formation of azeotrope-like compositions of 1-33 mole % E-1,1,1,4,4,5,5,5-octafluoro-2-pentene and 67-99 mole % Z-1-chloro-2,3,3,3-tetrafluoropropene at 31.8° C. and pressures ranging from about 25 to 28 psia, and also illustrates the formation of azeotrope-like compositions of 84-99 mole % E-1,1,1,4,4,5,5,5-octafluoro-2-pentene and 1-16 mole % Z-1-chloro-2,3,3,3-tetrafluoropropene at 31.8° C. and pressures ranging from about 16 to 19 psia.

Azeotrope-like compositions of 1-99 mole % E-1,1,1,4,4,5,5,5-octafluoro-2-pentene and 1-99 mole % Z-1-chloro-2,3,3,3-tetrafluoropropene are formed at temperatures ranging from about −40° C. to about 140° C. (over this temperature range, the difference in dew point pressure and bubble point pressure of the composition at a particular temperature is less than or equal to 5 percent (based upon the bubble point pressure) (Table 15A). Azeotrope-like compositions of 1-99 mole % E-1,1,1,4,4,5,5,5-octafluoro-2-pentene and 1-99 mole % Z-1-chloro-2,3,3,3-tetrafluoropropene are formed at temperatures ranging from about −40° C. to about 140° C. (over this temperature range, the difference in dew point pressure and bubble point pressure of the composition at a particular temperature is less than or equal to 3 percent (based upon the bubble point pressure) (Table 15B). At 20° C., azeotrope-like compositions of from 1 to 12 mole % and from 89 to 99 mole % Z-HCFO-1224yd and from 1 to 11 mole % and from 88 to 99 mole % E-1,1,1,4,4,5,5,5-octafluoro-2-pentene were formed.

TABLE 15A

| T (° C.) | % E-HFO-1438mzz | % Z-HCFO-1224yd |
|---|---|---|
| −40 | 1-6 | 94-99 |
| −40 | 89-99 | 1-11 |
| −20 | 1-8 | 92-99 |
| −20 | 87-99 | 1-13 |
| 0 | 1-12 | 88-99 |
| 0 | 84-99 | 1-16 |
| 20 | 1-18 | 82-99 |
| 20 | 79-99 | 1-21 |
| 40 | 1-29 | 71-99 |
| 40 | 70-99 | 1-30 |
| 60 | 1-99 | 1-99 |
| 80 | 1-99 | 1-99 |
| 100 | 1-99 | 1-99 |
| 120 | 1-99 | 1-99 |
| 140 | 1-99 | 1-99 |

TABLE 15B

| T (° C.) | % E-HFO-1438mzz | % Z-HCFO-1224yd |
|---|---|---|
| −40 | 1-3 | 97-99 |
| −40 | 94-99 | 1-6 |
| −20 | 1-5 | 86-95 |
| 20 | 92-99 | 1-8 |
| 0 | 1-7 | 93-99 |
| 0 | 91-99 | 1-9 |
| 20 | 1-11 | 89-99 |
| 20 | 88-99 | 1-12 |
| 40 | 1-17 | 83-99 |
| 40 | 84-99 | 1-16 |
| 60 | 1-26 | 74-99 |
| 60 | 78-99 | 1-22 |
| 80 | 1-40 | 60-99 |
| 80 | 68-99 | 1-32 |
| 100 | 1-99 | 1-99 |
| 120 | 1-99 | 1-99 |
| 140 | 1-99 | 1-99 |

Example 13: Z-HCFO-1224yd and HFC-245Eb Azeotropes and Azeotrope-Like Mixtures To determine the relative volatility of the binary pair of Z-HCFO-1224yd and HFC-245eb, the PTx method described above in Example 8 was used. The temperature in a PTx cell of known volume was measured at constant pressure for various binary compositions. These measurements were then reduced to equilibrium vapor and liquid compositions in the cell using the NRTL equation.

Figure 6:
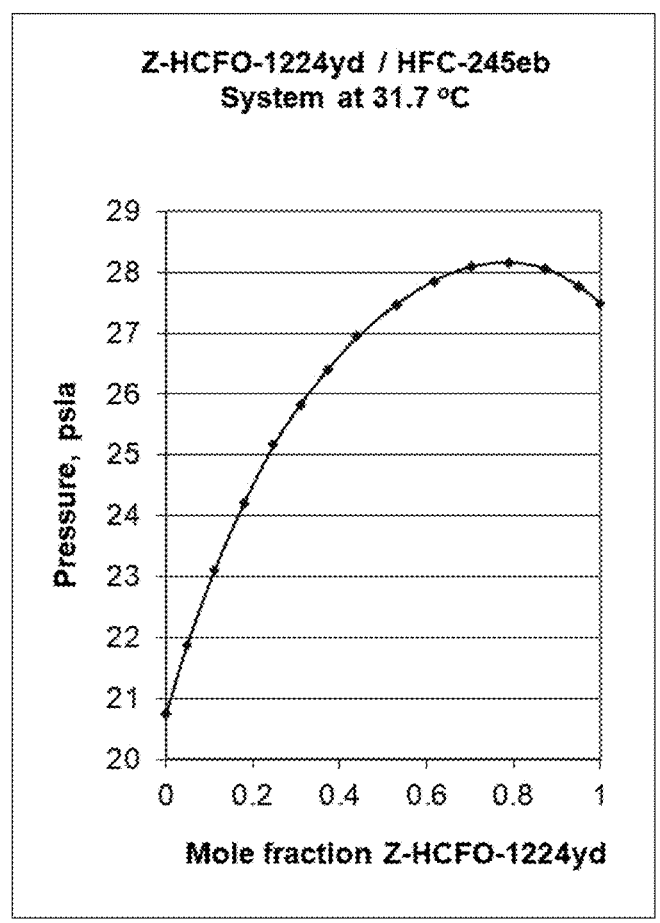
FIG. 6 shows the vapor pressure measured versus the composition in the PTx sample cell for the binary system of Z-HCFO-1224yd and HFC-245eb. The experimental data points are shown as solid points and the solid line is drawn from data calculated using the NRTL equation.

The temperatures measured versus the compositions in the PTx cell for Z-HCFO-1224yd/HFC-245eb mixtures are shown in FIG. 6, which graphically illustrates the formation of an azeotropic composition of Z-HCFO-1224yd and HFC-245eb as indicated by a mixture of about 78.8 mole % Z-HCFO-1224yd and 21.2 mole % HFC-245eb having the highest pressure over the range of compositions at about 31.7° C.

Azeotropic compositions are formed Z-HCFO-1224yd and HFC-245eb ranging from about 65.6 mole percent to about 86.7 mole percent Z-HCFO-1224yd and from about 34.4 mole percent to about 13.3 mole percent HFC-245eb (which form azeotrope compositions boiling at a temperature of from about −40° C. to about 130° C. and at a pressure of from about 0.98 psia (6.76 kPa) to about 333 psia (2296 kPa)).

At 20.0° C. and 18.8 psia (130 kPa) the azeotropic composition was 81.4 mole % Z-HCFO-1224yd and 18.6 mole % HFC-245eb. At 13.4° C. and atmospheric pressure (14.7 psia, 101 kPa) the azeotropic composition was 82.7 mole % Z-HCFO-1224yd and 17.3 mole % HFC-245eb. Azeotropic compositions are listed in Tables 16 and 17 below.

TABLE 16

| Temperature (° C.) | Pressure (psia) | Z-HCFO-1224yd (mole %) | HFC-245eb (mole %) |
|---|---|---|---|
| −40 | 0.98 | 0.86 | 0.14 |
| −30 | 1.84 | 0.87 | 0.13 |
| −20 | 3.23 | 0.87 | 0.13 |
| −10 | 5.37 | 0.86 | 0.14 |
| 0 | 8.48 | 0.85 | 0.15 |
| 10 | 12.87 | 0.83 | 0.17 |
| 20 | 18.84 | 0.81 | 0.19 |
| 30 | 26.75 | 0.79 | 0.21 |
| 31.75 | 28.37 | 0.79 | 0.21 |
| 40 | 37.02 | 0.77 | 0.23 |
| 50 | 50.09 | 0.74 | 0.26 |
| 60 | 66.46 | 0.72 | 0.28 |
| 70 | 86.71 | 0.70 | 0.30 |
| 80 | 111.45 | 0.68 | 0.32 |
| 90 | 141.40 | 0.67 | 0.33 |
| 100 | 177.37 | 0.66 | 0.34 |
| 110 | 220.34 | 0.66 | 0.34 |
| 120 | 271.53 | 0.66 | 0.34 |
| 130 | 332.68 | 0.67 | 0.33 |

TABLE 17

| Pressure (atm) | Azeotrope temp (° C.) | Z-HCFO-1224yd (mole %) | HFC-245eb (mole %) |
|---|---|---|---|
| 1 | 13.39 | 0.83 | 0.17 |
| 2 | 32.82 | 0.79 | 0.21 |
| 3 | 45.69 | 0.75 | 0.25 |
| 4 | 55.58 | 0.73 | 0.27 |
| 5 | 63.70 | 0.71 | 0.29 |
| 6 | 70.65 | 0.70 | 0.30 |
| 7 | 76.75 | 0.69 | 0.31 |
| 8 | 82.20 | 0.68 | 0.32 |
| 9 | 87.14 | 0.67 | 0.33 |
| 10 | 91.67 | 0.66 | 0.34 |
| 11 | 95.85 | 0.66 | 0.34 |
| 12 | 99.74 | 0.66 | 0.34 |
| 13 | 103.38 | 0.66 | 0.34 |
| 14 | 106.80 | 0.66 | 0.34 |
| 15 | 110.02 | 0.66 | 0.34 |
| 16 | 113.07 | 0.66 | 0.34 |
| 17 | 115.97 | 0.66 | 0.34 |
| 18 | 118.73 | 0.66 | 0.34 |
| 19 | 121.36 | 0.66 | 0.34 |
| 20 | 123.88 | 0.66 | 0.34 |
| 21 | 126.28 | 0.67 | 0.33 |
| 22 | 128.58 | 0.67 | 0.33 |
| 23 | 130.79 | 0.67 | 0.33 |
| 24 | 132.90 | 0.67 | 0.33 |
| 25 | 134.93 | 0.67 | 0.33 |
| 26 | 136.86 | 0.68 | 0.32 |
| 27 | 138.72 | 0.67 | 0.33 |
| 28 | 140.95 | 0.68 | 0.32 |
| 29 | 143.25 | 0.68 | 0.32 |
| 30 | 145.55 | 0.68 | 0.32 |
| 31 | 147.84 | 0.68 | 0.32 |

Additionally, azeotrope-like compositions containing Z-HCFO-1224yd and HFC-245eb are also formed. Azeotrope like compositions of 1-99 mole % Z-HCFO-1224yd and 99-1 mole % HFC-245eb are formed at temperatures ranging from about −40° C. to about 120° C. (over this temperature range, the difference in dew point pressure and bubble point pressure of the composition at a particular temperature is less than or equal to 5 percent (based upon the bubble point pressure) (Table 18A). Azeotrope like compositions of 1-99 mole % Z-HCFO-1224yd and 99-1 mole % HFC-245eb are formed at temperatures ranging from about −40° C. to about 120° C. (over this temperature range, the difference in dew point pressure and bubble point pressure of the composition at a particular temperature is less than or equal to 3 percent (based upon the bubble point pressure) (Table 18B). At 20° C. azeotrope-like compositions of from 1 to 9 mole % and from 58 to 99 mole % Z-HCFO-1224yd and from 1 to 42 mole % and from 91 to 99 mole % HFC-245eb were formed. Such azeotrope-like compositions exist around azeotropic compositions.

TABLE 18A

| T (° C.) | % Z-HCFO-1224yd | % HFC-245eb |
|---|---|---|
| −40 | 68-99 | 1-32 |
| −20 | 65-99 | 1-35 |
| 0 | 59-99 | 1-41 |
| 20 | 49-99 | 1-51 |
| 40 | 1-99 | 1-99 |
| 80 | 1-99 | 1-99 |
| 120 | 1-99 | 1-99 |

TABLE 18B

| T (° C.) | % Z-HCFO-1224yd | % HFC-245eb |
|---|---|---|
| −40 | 72-99 | 1-28 |
| −20 | 70-99 | 1-30 |
| 0 | 65-99 | 1-35 |
| 20 | 1-9 | 91-99 |
| 20 | 58-99 | 1-42 |
| 40 | 1-13 | 87-99 |
| 40 | 48-99 | 1-52 |
| 80 | 1-99 | 1-99 |
| 120 | 1-99 | 1-99 |

Example 14: Z-HCFO-1224yd and HCFO-1233xf Azeotropes and Azeotrope-Like Mixtures To determine the relative volatility of binary pair of Z-HCFO-1224yd and HCFO-1233xf, the PTx method described above in Example 8 was used. The temperature in a PTx cell of known volume was measured at constant pressure for various binary compositions. These measurements were then reduced to equilibrium vapor and liquid compositions in the cell using the NRTL equation.

Figure 7:
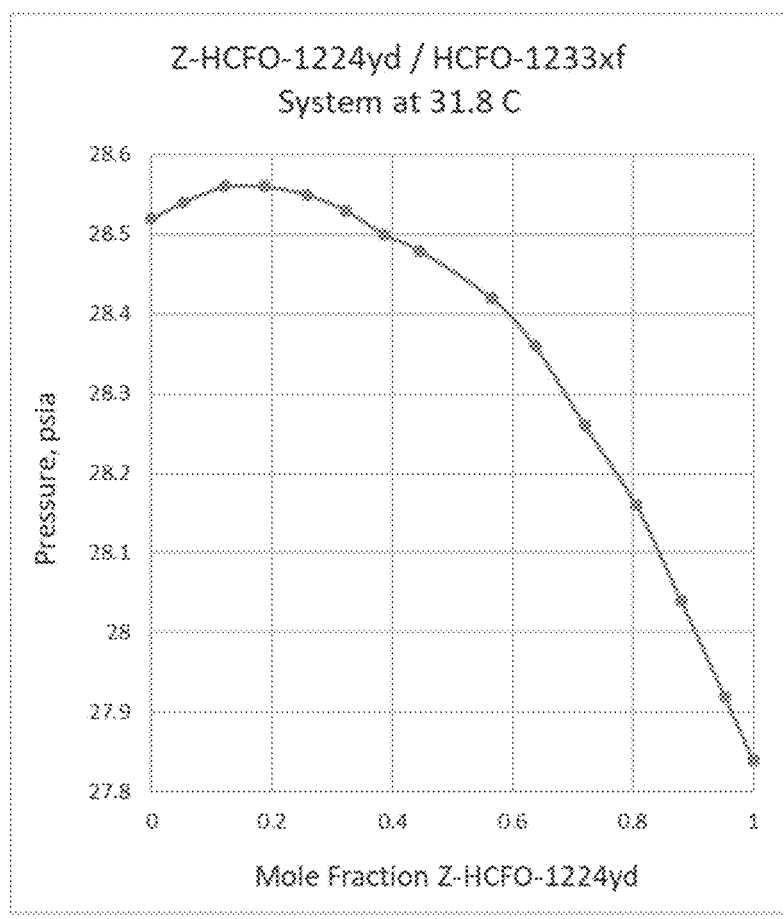
FIG. 7 shows the vapor pressure measured versus the composition in the PTx sample cell for the binary system of Z-HCFO-1224yd and HCFO-1233xf. The experimental data points are shown as solid points and the solid line is drawn from data calculated using the NRTL equation.
Figure 8:
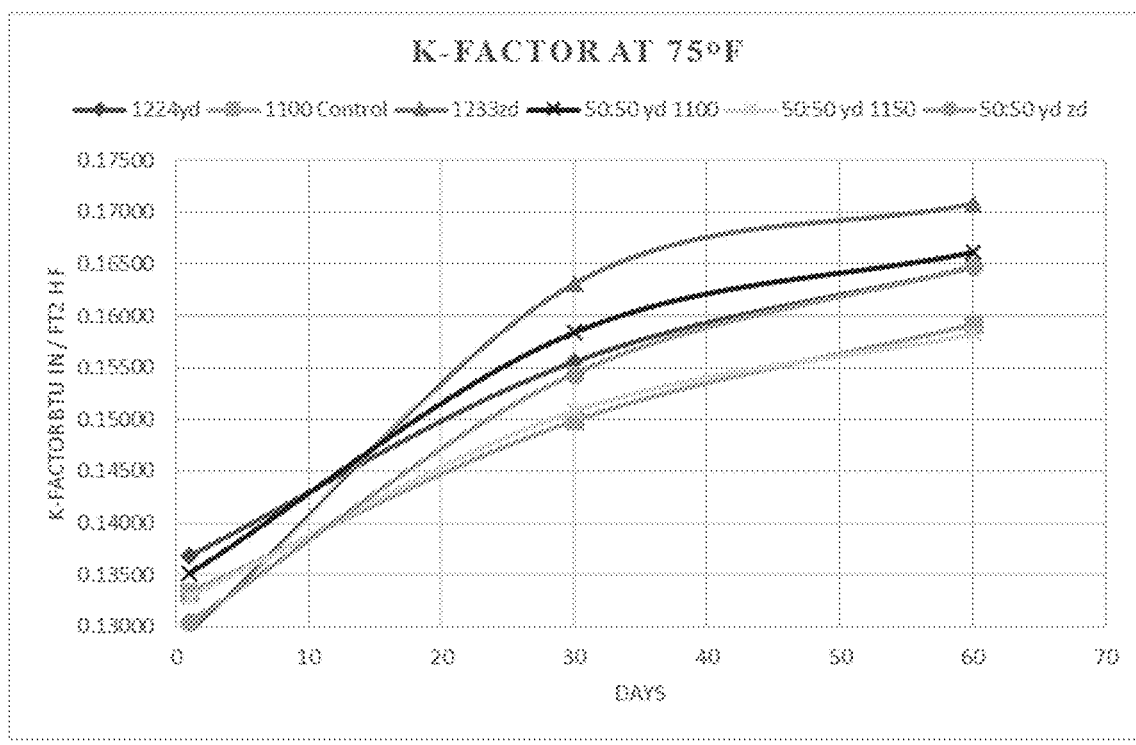
FIG. 8 shows K-factor at 75° F. as a function of time for the mixtures prepared according to the procedures described in Example 15.
Figure 9:
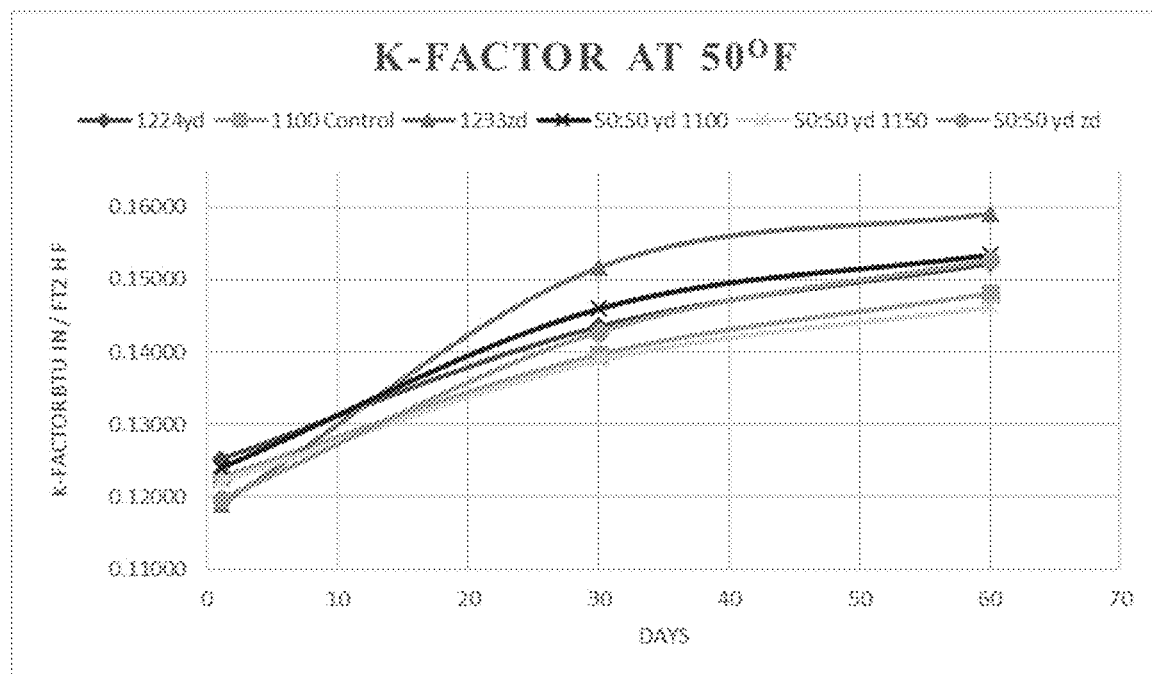
FIG. 9 shows K-factor at 50° F. as a function of time for the mixtures prepared according to the procedures described in Example 15.
Figure 10:
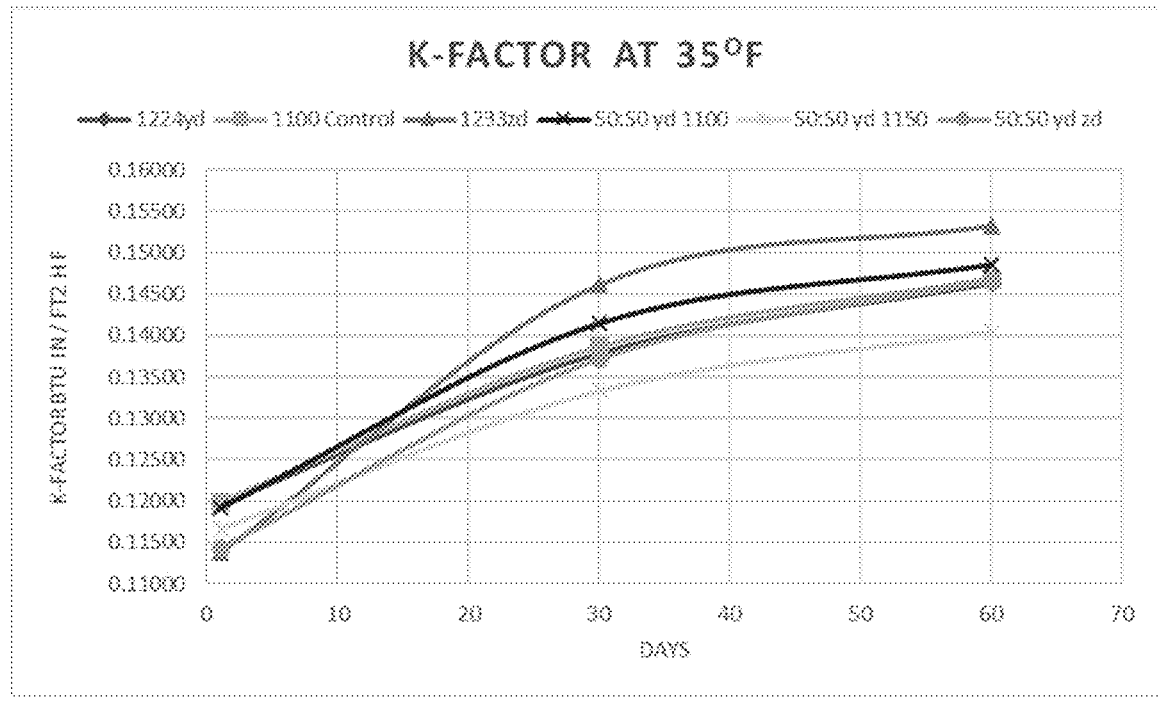
FIG. 10 shows K-factor at 35° F. as a function of time for the mixtures prepared according to the procedures described in Example 15.
Figure 11:
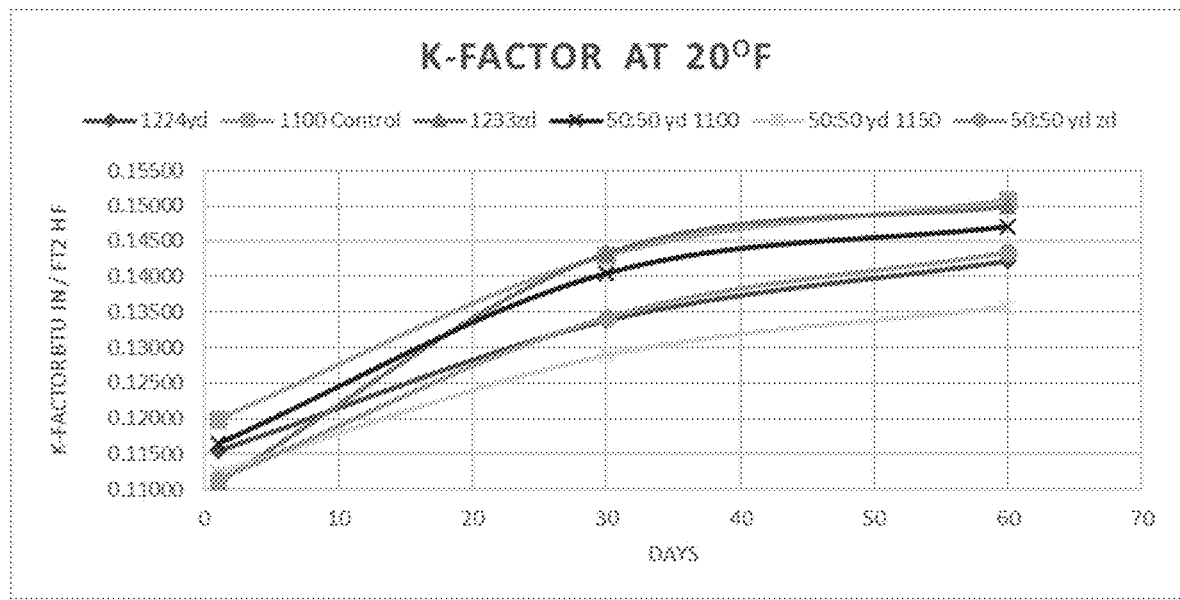
FIG. 11 shows K-factor at 25° F. as a function of time for the mixtures prepared according to the procedures described in Example 15.

The temperatures measured versus the compositions in the PTx cell for Z-HCFO-1224yd/HCFO-1233xf mixtures are shown in FIG. 7, which graphically illustrates the formation of an azeotropic composition of Z-HCFO-1224yd and HCFO-1233xf as indicated by a mixture of about 16 mole % Z-HCFO-1224yd and 84 mole % HCFO-1233xf having the highest pressure over the range of compositions at about 31.8° C.

Example 15: Enhanced Aged R-Values with HCFO-1224yd and HFO-1336Mzz-E Blends

A hand mix method was used to make foam samples in an 8"×8"×2.5" mold. The foams were cured overnight and cut to 6"×6"×1.5" and run in calibrated heat flow meter. The samples were run and value at each set point was considered to be the base line k-factor value. An exemplary hand mix method consisted of adding and mixing an appropriate amount of HCFO or HFO and water in the B-side (generic polyurethane B-side mixture). Then an appropriate amount of A-side (generic polyurethane A-side mixture) was mixed using a high-speed Arrowhead mixer at 4000 rpm for 1.5 s and the mixture was poured in the mold. The weight percentages of each blowing agent component used to prepare the foams are provided in Table 19 (weight percentages based on the total amount of A-side and B-side, combined), and 100:123 ratio of B-side:A-side was used to make the samples. Results of the heat analysis experiments are shown in Tables 20-24 and FIGS. 8-11.

TABLE 19

| Material | OH# | Control Wt % | A Wt % | B Wt % | C Wt % | D Wt % | E Wt % |
|---|---|---|---|---|---|---|---|
| Water | 6233 | 1.80% | 1.80% | 1.80% | 1.80% | 1.80% | 1.80% |
| HCFO-1224yd | 1 | 12.00% | 0 | 0 | 6.34% | 6.34% | 6.34% |
| HFO-1336mzz-Z | 1 | 0% | 14.00% | 0 | 7.00% | 0 | 0 |
| HFO-1336mzz-E | 1 | 0% | 0 | 0 | 0 | 7.00% | 0 |
| HCFO-1233zd-E | 1 | 0% | 0 | 14.00% | 0 | 0 | 7.00% |

TABLE 20

HCFO-1224yd (Control)

| Mean Temp (° F.) | Initial K-factor | 30 Day K-factor | 60 Day K-factor | 90 Day K-factor | 120 Day K-factor |
|---|---|---|---|---|---|
| 75 | 0.13680 | 0.15555 | 0.16465 | 0.16955 | 0.17300 |
| 50 | 0.12525 | 0.14360 | 0.15230 | NA | 0.16045 |
| 35 | 0.11960 | 0.13780 | 0.14625 | NA | 0.15435 |
| 20 | 0.11545 | 0.13375 | 0.14210 | NA | 0.14755 |

NA = data not available
K-factor shown in Btu · in/ft$^2$ · h · ° F.

TABLE 21

HFO-1336mzz-Z Control (Mixture A)

| Mean Temp (° F.) | Initial K-factor | 30 Day K-factor | 60 Day K-factor | 90 Day K-factor | 120 Day K-factor |
|---|---|---|---|---|---|
| 75 | 0.13335 | 0.14990 | 0.15915 | 0.16440 | 0.16760 |
| 50 | 0.12290 | 0.13970 | 0.14810 | NA | 0.15610 |
| 35 | 0.11995 | 0.13870 | 0.14695 | NA | 0.15445 |
| 20 | 0.12000 | 0.14295 | 0.15080 | NA | 0.15760 |

NA = data not available
K-factor shown in Btu · in/ft$^2$ · h · ° F.

TABLE 22

1233zd Control (Mixture B)

| Mean Temp (° F.) | Initial K-factor | 30 Day K-factor | 60 Day K-factor | 90 Day K-factor | 120 Day K-factor |
|---|---|---|---|---|---|
| 75 | 0.12950 | 0.16315 | 0.17085 | 0.17440 | 0.17630 |
| 50 | 0.11895 | 0.15165 | 0.15905 | NA | 0.16455 |
| 35 | 0.11380 | 0.14615 | 0.15325 | NA | 0.15885 |
| 20 | 0.11110 | 0.14325 | 0.15000 | NA | 0.15525 |

NA = data not available
K-factor shown in Btu · in/ft$^2$ · h · ° F.

TABLE 23

HCFO-1224yd + HFO-1336mzz-Z (Mixture C)

| Mean Temp (° F.) | Initial K-factor | 30 Day K-factor | 60 Day K-factor | 90 Day K-factor | 120 Day K-factor |
|---|---|---|---|---|---|
| 75 | 0.13520 | 0.15840 | 0.16610 | 0.17040 | 0.17355 |
| 50 | 0.12400 | 0.14600 | 0.15345 | NA | 0.16105 |
| 35 | 0.11915 | 0.14145 | 0.14855 | NA | 0.15580 |
| 20 | 0.11650 | 0.14040 | 0.14695 | NA | 0.15365 |

NA = data not available
K-factor shown in Btu · in/ft$^2$ · h · ° F.

TABLE 24

HCFO-1224yd + HFO-1336mzz-E (Mixture D)

| Mean Temp (° F.) | Initial K-factor | 30 Day K-factor | 60 Day K-factor | 90 Day K-factor | 120 Day K-factor |
|---|---|---|---|---|---|
| 75 | 0.13285 | 0.15085 | 0.15825 | NA | 0.16645 |
| 50 | 0.12220 | 0.13890 | 0.14625 | NA | 0.15430 |
| 35 | 0.11670 | 0.13330 | 0.14040 | NA | 0.14850 |
| 20 | 0.11255 | 0.12895 | 0.13575 | NA | 0.14380 |

NA = data not available
K-factor shown in Btu · in/ft$^2$ · h · ° F.

TABLE 25

HCFO-1224yd + HCFO-1233zd-E (Mixture E)

| Mean Temp (° F.) | Initial K-factor | 30 Day K-factor | 60 Day K-factor | 90 Day K-factor | 120 Day K-factor |
|---|---|---|---|---|---|
| 75 | 0.13045 | 0.15440 | 0.16475 | NA | NA |
| 50 | 0.11970 | 0.14275 | 0.15265 | NA | NA |
| 35 | 0.11435 | 0.13720 | 0.14665 | NA | NA |
| 20 | 0.11140 | 0.13415 | 0.14330 | NA | NA |

NA = data not available
K-factor shown in Btu · in/ft$^2$ · h · ° F.

As shown in the data of Tables 20-25, combining HFO-1336mzz-E with HCFO-1224yd, formed a synergistic combination which provided improved insulation performance across a wide range of temperatures. In addition, the effect was long lived and continued to provide improved insulation. At higher temperatures, the combination of HFO-1336mzz-Z and HCFO-1224yd also showed good results in comparison to the control and blends of HCFO-1233zd with HCFO-1224yd.

OTHER EMBODIMENTS

1. In some embodiments, the present application provides a composition comprising the compound Z-1-chloro-2,3,3,3-tetrafluoroprop-1-ene and one or more compounds selected from the group consisting of HFOs, HCFOs, HFCs, HFEs, HCFCs, CFCs, CO$_2$, olefins, hydrochloroolefins, chlorinated hydrocarbons, organic acids, alcohols, hydrocarbons, ethers, aldehydes, ketones, water, and others such as methyl formate, ethyl formate, formic acid, trans-1,2-dichloroethylene (DCE), carbon dioxide, 3,3,3-trifluoropropyne, cis-HFO-1234ze+HFO-1225yez; mixtures of these plus water; mixtures of these plus CO$_2$; mixtures of these plus trans-1,2-dichloroethylene; mixtures of these plus methyl formate; mixtures with cis-HFO-1234ze+CO$_2$; mixtures with cis-HFO-1234ze+HFO-1225yez+CO$_2$; and mixtures with cis-HFO-1234ze+HFC-245fa.

2. The composition of embodiment 1, wherein the additional compound comprises one or more compounds selected from the group consisting of trans-1,2-dichloroethylene; carbon dioxide; cis-HFO-1234ze; HFO-1225yez; low molecular weight alcohols; low global warming potential olefins; chlorofluorocarbons; ketones; aldehydes; organic acids; and alkanes.

3. The composition of embodiment 1 or 2, wherein the additional compound comprises one or more compounds selected from the group consisting of cis-HFO-1234ze; trans-HFO-1234ze; HFO-1234yf; Z-HFO-1225ye; E-HFO-1225ye; HFO-1225yc; E-HFO-1233zd; Z-HFO-1233zd; HFC-1233xf; E-HFO-1336ze, Z-HFO-1336ze, E-HCFO-1224yd; Z-HCFO-1224yd; E-$(CF_3)_2$CFCH=CHF; Z-$(CF_3)_2$CFCH=CHF; $(CF_3)_2$CFCH=$CF_2$; E-$CF_3$CHFC=CHF; Z-$CF_3$CHFC=CHF; HFO-1354myc; and $(C_2F_5)(CF_3)$C=$CH_2$.

4. The composition of any one of embodiments 1 to 3, wherein the additional compound comprises one or more compounds selected from the group consisting of HFC-245eb; HFC-245ca; HFC-227ea; HFC-236ea; HFC-236fa; HFC-134a; HFC-134; HFC-152a; HFC-32; HFC-125; HFC-143a; HFC-365mfc; HFC-161; and HFC-43-10mee.

5. The composition of any one of embodiments 1 to 4, wherein the additional compound comprises one or more compounds selected from the group consisting of $CHF_2$—O—$CHF_2$; $CHF_2$—O—$CH_2F$; $CH_2F$—O—$CH_2F$; $CH_2F$—O—$CH_3$; cyclo-$CF_2$—$CH_2$—$CF_2$—O; cyclo-$CF_2$—$CF_2$—$CH_2$—O; $CHF_2$—O—$CH_2$—$CHF_2$; $CF_3$—$CF_2$—O—$CH_2F$; $CHF_2$—O—CHF—$CF_3$; $CHF_2$—O—$CF_2$—$CHF_2$; $CH_2F$—O—$CF_2$—$CHF_2$; $CF_3$—O—$CF_2$—$CH_3$; $CHF_2$—CHF—O—$CHF_2$; $CF_3$—O—CHF—$CH_2F$; $CF_3$—CHF—O—$CH_2F$; $CF_3$—O—$CH_2$—$CHF_2$; $CHF_2$—O—$CH_2$—$CF_3$; $CH_2F$—$CF_2$—O—$CH_2F$; $CHF_2$—O—$CF_2$—$CH_3$; $CHF_2$—$CF_2$—O—$CH_3$; $CH_2F$—O—CHF—$CH_2F$; $CHF_2$—CHF—O—$CH_2F$; $CF_3$—O—CHF—$CH_3$; $CF_3$—CHF—O—$CH_3$; $CHF_2$—O—$CH_2$—$CHF_2$; $CF_3$—O—$CH_2$—$CH_2F$; $CF_3$—$CH_2$—O—$CH_2F$; HFE-7000; HFE-7100; and $CF_2H$—$CF_2$—$CF_2$—O—$CH_3$.

6. The composition of any one of embodiments 1 to 5, wherein the additional compound comprises one or more compounds selected from the group consisting of propane; butane; isobutane; neopentane; isopentane; cyclopentane; n-hexane; isohexane; and heptane.

7. The composition of any one of embodiments 1 to 6, wherein the additional compound comprises one or more compounds selected from the group consisting of dimethylether; methylethylether; diethyl ether; methylpropylether; methylisopropylether; ethylpropylether; ethylisopropylether; dipropylether; diisopropylether; dimethyloxymethane; diethoxymethane; dipropoxymethane; and dibutoxymethane.

8. The composition of any one of embodiments 1 to 7, wherein the additional compound comprises one or more compounds selected from the group consisting of formaldehyde; acetaldehyde; propanal; butanal; and isobutanal.

9. The composition of any one of embodiments 1 to 8, wherein the additional compound comprises one or more compounds selected from the group consisting of acetone; methylethylketone; and methylisobutylketone.

10. In some embodiments, the present application provides an azeotrope or azeotrope-like composition comprising Z-1-chloro-2,3,3,3-tetrafluoroprop-1-ene and one or more compounds selected from the group consisting of methyl formate, methyl ethyl ether, diethyl ether, cyclobutane, isopentane (2-methylbutane), ethylene oxide, Z-1,1,1,4,4,4-hexafluoro-2-butene (Z-HFO-1336mzz), E-1,1,1,4,4,4-hexafluoro-2-butene (Z-HFO-1336mzz), Z-1-chloro-3,3,3-trifluoropropene (Z-HCFO-1233zd), E-1-chloro-3,3,3-trifluoropropene (E-HCFO-1233zd), Z-1,1,1,4,4,5,5,5-octafluoro-2-pentene (Z-HFO-1439mzz), E-1,1,1,4,4,5,5,5-octafluoro-2-pentene (E-HFO-1439mzz), 1,1,1,2,3-pentafluoropropane (HFC-245eb), E-HFO-1234ye, Z-HFO-1234ye, Z-HFO-1234ze, HFO-1243yf, HFO-1336mcyf, E-HFO-1336ze, Z-HFO-1336ze, E-HFO-1438ezy, Z-HFO1438ezy, E-HFO-1438mzz, HCFO-1233xf, HFC-236ea, HFC-236fa, HFC-245fa, HFC-356mff, HFC-245ca, HFC-245ea, HCFC-123, CFC-11, CFC-114, HFE-236eaEbg, HFE-E347mmyl, and HFE-1-methoxyheptafluoropropane (hfe-7000).

11. The azeotrope or azeotrope-like composition of embodiment 10, wherein the composition is formed at a pressure of from about 0.98 psia (130 kPa) to about 333 psia (2296 kPa) or at a pressure of about 1 atm, 2 atm, 3 atm, 4 atm, 5 atm, 6 atm, 7 atm, 8 atm, 9 atm, 10 atm, 11 atm, 12 atm, 13 atm, 14 atm, 15 atm, 16 atm, 17 atm, 18 atm, 19 atm, 20 atm, 21 atm, 22 atm, 23 atm, 24 atm, 25 atm, 26 atm, 27 atm, 28 atm, 29 atm, 30 atm, or 31 atm.

12. The azeotrope or azeotrope-like composition of embodiment 10 or 11, wherein the composition is formed at a temperature of from about −40° C. to about 130° C.

13. The azeotrope-like composition of any one of embodiments 10 to 12, wherein the azeotrope-like composition consists essentially of (i) Z-1-chloro-2,3,3,3-tetrafluoroprop-1-ene (Z-HCFO-1224yd) and (ii) methyl formate.

14. The azeotrope-like composition of any one of embodiments 10 to 13, wherein the azeotrope-like composition consists essentially of (i) 1-99 mole % Z-1-chloro-2,3,3,3-tetrafluoroprop-1-ene (Z-HCFO-1224yd) and (ii) 1-99 mole % methyl formate at a temperature from −40° C. to about 140° C.

15. The azeotrope-like composition of any one of embodiments 10 to 14, wherein the azeotrope-like composition consists essentially of (i) 85-99 mole % Z-1-chloro-2,3,3,3-tetrafluoroprop-1-ene (Z-HCFO-1224yd) and (ii) 1-15 mole % methyl formate at 20° C.

16. The azeotrope-like composition of any one of embodiments 10 to 12, wherein the azeotrope-like composition consists essentially of (i) Z-1-chloro-2,3,3,3-tetrafluoroprop-1-ene (Z-HCFO-1224yd) and (ii) E-1-chloro-3,3,3-trifluoropropene (E-1233zd).

17. The azeotrope-like composition of any one of embodiments 10 to 12 and 16, wherein the azeotrope-like composition consists essentially of (i) 1-99 mole % Z-1-chloro-2,3,3,3-tetrafluoroprop-1-ene (Z-HCFO-1224yd) and (ii) 1-99 mole % E-1-chloro-3,3,3-trifluoropropene (E-1233zd) at a temperature from −40° C. to about 140° C.

18. The azeotrope-like composition of any one of embodiments 10 to 12, wherein the azeotrope-like composition consists essentially of (i) Z-1-chloro-2,3,3,3-tetrafluoroprop-1-ene (Z-HCFO-1224yd) and (ii) E-1,1,1,4,4,4-hexafluoro-2-butene (E-HFO-1336mzz).

19. The azeotrope-like composition of any one of embodiments 10 to 12 and 18, wherein the azeotrope-like composition consists essentially of (i) 1-99 mole % Z-1-chloro-2,3,3,3-tetrafluoroprop-1-ene (Z-HCFO-1224yd) and (ii) 1-99 mole % E-1,1,1,4,4,4-hexafluoro-2-butene (E-HFO-1336mzz) at a temperature from −40° C. to about 140° C.

20. The azeotrope-like composition of any one of embodiments 10 to 12, wherein the azeotrope-like composition consists essentially of (i) Z-1-chloro-2,3,3,3-tetrafluoroprop-1-ene (Z-HCFO-1224yd) and (ii) E-1,1,1,4,4,5,5,5-octafluoro-2-pentene (E-HFO-1438mzz).

21. The azeotrope-like composition of any one of embodiments 10 to 12 and 20, wherein the azeotrope-like composition consists essentially of (i) 1-99 mole % Z-1-chloro-2,3,3,3-tetrafluoroprop-1-ene (Z-HCFO-1224yd) and (ii) 1-99 mole % E-1,1,1,4,4,5,5,5-octafluoro-2-pentene (E-HFO-1438mzz) at a temperature from −40° C. to about 140° C.

22. The azeotrope-like composition of any one of embodiments 10 to 12, 20, and 21, wherein the azeotrope-like composition consists essentially of (i) 1-12 mole % and 89-99 mole % Z-1-chloro-2,3,3,3-tetrafluoroprop-1-ene (Z-HCFO-1224yd) and (ii) 1-11 mole % and 88-99 mole % E-1,1,1,4,4,5,5,5-octafluoro-2-pentene (E-HFO-1438mzz) at a temperature of 20° C.

23. The azeotrope-like composition of any one of embodiments 10 to 12, wherein the azeotrope-like composition consists essentially of (i) Z-1-chloro-2,3,3,3-tetrafluoroprop-1-ene (Z-HCFO-1224yd) and (ii) 2-chloro-3,3,3-trifluoropropene (HCFO-1233xf).

24. The azeotrope composition of any one of embodiments 10 to 12 and 23, wherein the azeotrope composition consists essentially of 16 mole % Z-1-chloro-2,3,3,3-tetrafluoroprop-1-ene (Z-HCFO-1224yd) and 84 mole % 2-chloro-3,3,3-trifluoropropene (HCFO-1233xf) at a temperature 31.8° C.

25. In some embodiments, the present application provides a process of forming a foam comprising:
(a) adding a foamable composition to a blowing agent; and,
(b) reacting the foamable composition under conditions effective to form a foam,
wherein the blowing agent comprises the composition of any one of embodiments 1 to 24.

26. In some embodiments, the present application further provides a process of forming a foam, comprising:
(a) adding a foamable composition comprising one or more thermoplastic polymers to a blowing agent; and
(b) processing the foamable composition under conditions effective to form a foam,
wherein the blowing agent comprises the composition of any one of embodiments 1 to 24.

27. The process of embodiment 26, wherein the process comprises extruding a mixture of the foamable composition and blowing agent.

28. The process of embodiment 26 or 27, wherein the blowing agent comprises Z-1-chloro-2,3,3,3-tetrafluoroprop-1-ene and Z-1,1,1,4,4,4-hexafluoro-2-butene.

29. The process of embodiment 28, wherein the blowing agent further comprises water.

30. The process of embodiment 26 or 27, wherein the blowing agent comprises Z-1-chloro-2,3,3,3-tetrafluoroprop-1-ene and E-1,1,1,4,4,4-hexafluoro-2-butene.

31. The process of embodiment 30, wherein the blowing agent further comprises water.

32. In some embodiments, the present application provides a foam formed by the process of any one of embodiments 25 to 31.

33. In some embodiments, the present application provides a foam comprising a polymer and the composition of any one of embodiments 1 to 24.

34. The foam of embodiment 32 or 33, wherein the blowing agent comprises Z-1-chloro-2,3,3,3-tetrafluoroprop-1-ene and Z-1,1,1,4,4,4-hexafluoro-2-butene.

35. The foam of any one of embodiments 32 to 34, wherein the blowing agent further comprises water.

36. The foam of any one of embodiments 32 to 35, wherein the foam exhibits a K-factor of from about 0.113 Btu·in/ft$^2$·h·° F. to about 0.158 Btu·in/ft$^2$·h·° F. at a temperature of about 20° F.

37. The foam of any one of embodiments 32 to 36, wherein the foam exhibits a K-factor of from about 0.116 Btu·in/ft$^2$·h·° F. to about 0.122 Btu·in/ft$^2$·h·° F. at a temperature of about 35° F.

38. The foam of any one of embodiments 32 to 37, wherein the foam exhibits a K-factor of from about 0.122 Btu·in/ft$^2$·h·° F. to about 0.165 Btu·in/ft$^2$·h·° F. at a temperature of about 50° F.

39. The foam of any one of embodiments 32 to 38, wherein the foam exhibits a K-factor of from about 0.132 Btu·in/ft$^2$·h·° F. to about 0.175 Btu·in/ft$^2$·h·° F. at a temperature of about 75° F.

40. The foam of embodiment 32 or 33, wherein the blowing agent comprises Z-1-chloro-2,3,3,3-tetrafluoroprop-1-ene and E-1,1,1,4,4,4-hexafluoro-2-butene.

41. The foam of any one of embodiments 32, 33, and 40, wherein the blowing agent further comprises water.

42. The foam of any one of embodiments 32, 33, 40, and 41, wherein the foam exhibits a K-factor of from about 0.111 Btu·in/ft$^2$·h·° F. to about 0.144 Btu·in/ft$^2$·h·° F. at a temperature of about 20° F.

43. The foam of any one of embodiments 32, 33, and 40 to 42, wherein the foam exhibits a K-factor of from about 0.115 Btu·in/ft$^2$·h·° F. to about 0.150 Btu·in/ft$^2$·h° F. at a temperature of about 35° F.

44. The foam of any one of embodiments 32, 33, and 40 to 43, wherein the foam exhibits a K-factor of from about 0.120 Btu·in/ft$^2$·h·° F. to about 0.156 Btu·in/ft$^2$·h·° F. at a temperature of about 50° F.

45. The foam of any one of embodiments 32, 33, and 40 to 44, wherein the foam exhibits a K-factor of from about 0.130 Btu·in/ft$^2$·h·° F. to about 0.168 Btu·in/ft$^2$·h·° F. at a temperature of about 75° F.

46. In some embodiments, the present application provides a process for producing cooling comprising;
(a) condensing the composition of any one of embodiments 1 to 24; and
(b) evaporating the composition in the vicinity of a body to be cooled.

47. In some embodiments, the present application provides a process for producing heating comprising:
(a) condensing the composition of any one of embodiments 1 to 24 in the vicinity of a body to be heated; and
(b) thereafter evaporating said composition.

48. In some embodiments, the present application provides a heat transfer system comprising a heat transfer medium, wherein the heat transfer medium comprises the composition of any one of embodiments 1 to 24.

49. In some embodiments, the present application provides a high temperature heat pump comprising a working fluid comprising a composition of any one of embodiments 1 to 24.

50. In some embodiments, the present application provides an aerosol product comprising a component to be dispensed and a propellant, wherein the propellant comprises the composition of any one of embodiments 1 to 24.

51. In some embodiments, the present application provides a method for extinguishing or suppressing a flame comprising dispensing the composition of any one of embodiments 1 to 24 at the flame.

52. In some embodiments, the present application provides a system for preventing or suppressing a flame comprising a vessel comprising the composition of any one of embodiments 1 to 24 and a nozzle to dispense the composition toward an anticipated or actual location of the flame.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims. It should be appreciated by those persons having ordinary skill in the art(s) to which the present invention relates that any of the features described herein in respect of any particular aspect and/or embodiment of the present invention can be combined with one or more of any of the other features of any other aspects and/or embodiments of the present invention described herein, with modifications as appropriate to ensure compatibility of the combinations. Such combinations are considered to be part of the present invention contemplated by this disclosure.

What is claimed is:

1. An azeotrope or azeotrope-like composition comprising Z-1-chloro-2,3,3,3-tetrafluoroprop-1-ene (Z-HCFO-1224yd) and one of methyl formate, or E-1,1,1,4,4,4-hexafluoro-2-butene (E-HFO-1336mzz).

2. The azeotrope or azeotrope-like composition of claim 1, wherein the azeotrope or azeotrope-like composition consists essentially of (i) Z-1-chloro-2,3,3,3-tetrafluoro-prop-1-ene (Z-HCFO-1224yd) and (ii) methyl formate.

3. The azeotrope or azeotrope-like composition of claim 2, wherein the azeotrope or azeotrope-like composition consists essentially of (i) 1-99 mole % Z-1-chloro-2,3,3,3-tetrafluoroprop-1-ene (Z-HCFO-1224yd) and (ii) 1-99 mole % methyl formate at a temperature from −40° C. to about 140° C.

4. The azeotrope or azeotrope-like composition of claim 3, wherein the azeotrope or azeotrope-like composition consists essentially of (i) 85-99 mole % Z-1-chloro-2,3,3,3-tetrafluoroprop-1-ene (Z-HCFO-1224yd) and (ii) 1-15 mole % methyl formate at 20° C.

5. The azeotrope or azeotrope-like composition of claim 1, wherein the azeotrope or azeotrope-like composition consists essentially of (i) Z-1-chloro-2,3,3,3-tetrafluoro-prop-1-ene (Z-HCFO-1224yd) and (ii) E-1,1,1,4,4,4-hexafluoro-2-butene (E-HFO-1336mzz).

6. The azeotrope or azeotrope-like composition of claim 5, wherein the azeotrope or azeotrope-like composition consists essentially of (i) 1-99 mole % Z-1-chloro-2,3,3,3-tetrafluoroprop-1-ene (Z-HCFO-1224yd) and (ii) 1-99 mole % E-1,1,1,4,4,4-hexafluoro-2-butene (E-HFO-1336mzz) at a temperature from −40° C. to about 140° C.

7. A foam comprising a polymer and the composition according to claim 1.

8. The foam of claim 7, wherein the blowing agent comprises Z-1-chloro-2,3,3,3-tetrafluoroprop-1-ene and Z-1,1,1,4,4,4-hexafluoro-2-butene.

9. The foam of claim 8, wherein the blowing agent further comprises water.

10. The foam of claim 9, wherein the foam exhibits a K-factor of from about 0.113 Btu·in/ft$^2$·h·° F. to about 0.158 Btu·in/ft$^2$·h·° F. at a temperature of about 20° F.

11. The foam of claim 9, wherein the foam exhibits a K-factor of from about 0.116 Btu·in/ft$^2$·h·° F. to about 0.122 Btu·in/ft$^2$·h·° F. at a temperature of about 35° F.

12. The foam of claim 9, wherein the foam exhibits a K-factor of from about 0.122 Btu·in/ft$^2$·h·° F. to about 0.165 Btu·in/ft$^2$·h·° F. at a temperature of about 50° F.

13. The foam of claim 9, wherein the foam exhibits a K-factor of from about 0.132 Btu·in/ft$^2$·h·° F. to about 0.175 Btu·in/ft$^2$·h·° F. at a temperature of about 75° F.

14. The foam of claim 7, wherein the blowing agent comprises Z-1-chloro-2,3,3,3-tetrafluoroprop-1-ene (Z-HCFO-1224yd) and E-1,1,1,4,4,4-hexafluoro-2-butene.

15. The foam of claim 14, wherein the foam exhibits a K-factor of from about 0.111 Btu·in/ft2·h·° F. to about 0.144 Btu·in/ft2·h·° F. at a temperature of about 20° F.

16. The foam of claim 14, wherein the foam exhibits a K-factor of from about 0.115 Btu·in/ft2·h·° F. to about 0.150 Btu·in/ft2·h·° F. at a temperature of about 35° F.

17. The foam of claim 14, wherein the foam exhibits a K-factor of from about 0.120 Btu·in/ft2·h·° F. to about 0.156 Btu·in/ft2·h·° F. at a temperature of about 50° F.

18. The foam of claim 14, wherein the foam exhibits a K-factor of from about 0.130 Btu·in/ft2·h·° F. to about 0.168 Btu·in/ft2·h·° F. at a temperature of about 75° F.

19. A process of forming a foam comprising:
(a) adding a foamable composition to a blowing agent; and,
(b) reacting the foamable composition under conditions effective to form a foam,
wherein the blowing agent comprises the composition according to claim 1.

20. A process of forming a foam, comprising:
(a) adding a foamable composition comprising one or more thermoplastic polymers to a blowing agent; and
(b) processing the foamable composition under conditions effective to form a foam,
wherein the blowing agent comprises the composition according to claim 1.

21. The process of claim 20, wherein the process comprises extruding a mixture of the foamable composition and blowing agent.

22. The process of claim 20, wherein the blowing agent comprises Z-1-chloro-2,3,3,3-tetrafluoroprop-1-ene and Z-1,1,1,4,4,4-hexafluoro-2-butene.

23. The process of claim 20, wherein the blowing agent comprises Z-1-chloro-2,3,3,3-tetrafluoroprop-1-ene (Z-HCFO-1224yd) and E-1,1,1,4,4,4-hexafluoro-2-butene.

24. A process for producing cooling comprising;
(a) condensing the composition according to claim 1; and
(b) evaporating the composition in the vicinity of a body to be cooled.

25. A process for producing heating comprising:
(a) condensing the composition according to claim 1 in the vicinity of a body to be heated; and
(b) thereafter evaporating said composition.

* * * * *